US008832980B2

(12) United States Patent
Hill

(10) Patent No.: US 8,832,980 B2
(45) Date of Patent: Sep. 16, 2014

(54) STRUCTURAL ASSEMBLY WITH A FLEXED, TIED PANEL

(75) Inventor: G. Roland Hill, Cheshire (GB)

(73) Assignee: Contra Vision Limited, Stockport (GB)

( * ) Notice: Subject to any disclaimer, the term of this patent is extended or adjusted under 35 U.S.C. 154(b) by 581 days.

(21) Appl. No.: 12/438,237

(22) PCT Filed: Aug. 21, 2007

(86) PCT No.: PCT/IB2007/003620

§ 371 (c)(1),
(2), (4) Date: Feb. 20, 2009

(87) PCT Pub. No.: WO2008/023275

PCT Pub. Date: Feb. 28, 2008

(65) Prior Publication Data

US 2010/0011641 A1 Jan. 21, 2010

Related U.S. Application Data

(60) Provisional application No. 60/891,306, filed on Feb. 23, 2007.

(51) Int. Cl.

| | |
|---|---|
| ***G09F 15/00*** | (2006.01) |
| ***G09F 17/00*** | (2006.01) |
| ***G09F 19/22*** | (2006.01) |
| ***G09F 15/02*** | (2006.01) |
| ***G09F 1/06*** | (2006.01) |
| ***G09F 1/10*** | (2006.01) |

(52) U.S. Cl.

CPC .. *G09F 1/06* (2013.01); *G06F 7/18* (2013.01); *G09F 19/22* (2013.01); *G09F 15/0062* (2013.01); *G09F 15/02* (2013.01); *G09F 1/065* (2013.01); *G09F 15/0068* (2013.01); *G09F 15/0025* (2013.01); *G09F 15/0043* (2013.01); *G09F 1/10* (2013.01); *G09F 15/0075* (2013.01)

USPC .......................................... 40/606.12; 40/603

(58) Field of Classification Search

None

See application file for complete search history.

(56) References Cited

U.S. PATENT DOCUMENTS

| | | | |
|---|---|---|---|
| 16,767 | A | 3/1857 | Worthen |
| 1,687,850 | A | 10/1928 | Shodron |

(Continued)

FOREIGN PATENT DOCUMENTS

| | | | |
|---|---|---|---|
| DE | 43 14 654 | A1 | 11/1994 |
| JP | 1263377 | | 10/1989 |

(Continued)

OTHER PUBLICATIONS

International Search Report from PCT/IB2006/003667, Jun. 22, 2007, 3 pages.

(Continued)

*Primary Examiner* — Joanne Silbermann

(74) *Attorney, Agent, or Firm* — Pillsbury Winthrop Shaw Pittman, LLP

(57) ABSTRACT

An assembly includes a flexurally deformed panel, which is connected to a membrane tie by a linear connector and is tied by the membrane tie to form a geometrically stable pre-stressed structure. More than one panel may be flexurally deformed and tied together in an assembly and more than one membrane tie may be present within an assembly. Panels are typically semi-rigid sheet materials, for example metal sheets, plastic sheets, or sheets of composite materials, such as glass or carbon fiber reinforced plastics or resins. Membrane tie members are typically flexible, for example plastic films, fabrics or nets or arrays of rods or cables. The assemblies have many different geometric forms and many different practical applications. Assemblies may be relatively large, for example demountable and reusable shelters or flat-pack point-of-purchase display assemblies, or may be relatively small, for example a photograph or postcard display system.

44 Claims, 130 Drawing Sheets

(56) References Cited

U.S. PATENT DOCUMENTS

| | | | |
|---|---|---|---|
| 1,762,363 | A | 6/1930 | Sergent |
| 2,160,724 | A | 5/1939 | Fletcher |
| 2,237,226 | A | 4/1941 | High |
| 2,287,370 | A | 6/1942 | Becker |
| 2,360,285 | A | 10/1944 | Sherman |
| D149,294 | S | 4/1948 | Newman |
| 2,611,427 | A | 9/1952 | Mais et al. |
| 2,862,322 | A | 12/1958 | Ziegler |
| 2,887,154 | A | 5/1959 | Morningstar |
| 2,911,038 | A | 11/1959 | Frommelt |
| 3,057,119 | A | 10/1962 | Kessler |
| 4,433,700 | A | 2/1984 | Dohet |
| 4,536,997 | A | 8/1985 | Heescher |
| 4,749,011 | A | 6/1988 | Rylander |
| D302,911 | S | 8/1989 | Pei-ai |
| 4,865,111 | A | 9/1989 | Perutz |
| D306,537 | S | 3/1990 | Swanson et al. |
| 4,979,554 | A | 12/1990 | Nelson |
| 4,991,813 | A | 2/1991 | Beaulieu |
| D325,307 | S | 4/1992 | Cojan |
| D328,206 | S | 7/1992 | Lewis |
| D340,533 | S | 10/1993 | Beaulieu et al. |
| D346,867 | S | 5/1994 | Montilla |
| 5,313,666 | A | 5/1994 | Bax et al. |
| D350,245 | S | 9/1994 | Branz et al. |
| D369,924 | S | 5/1996 | Werner et al. |
| 5,595,203 | A | 1/1997 | Espinosa |
| 5,619,816 | A | 4/1997 | Ellison |
| 5,716,033 | A | 2/1998 | Gibson |
| D395,968 | S | 7/1998 | Shappell |
| 5,826,358 | A | 10/1998 | DeSutter |
| 5,826,639 | A | 10/1998 | Miller |
| D405,628 | S | 2/1999 | Terrana et al. |
| D423,250 | S | 4/2000 | Wolff |
| 6,044,877 | A | 4/2000 | Bennet |
| 6,065,512 | A | 5/2000 | Munn, II |
| D427,809 | S | 7/2000 | Osborn et al. |
| 6,212,805 | B1 | 4/2001 | Hill |
| RE37,186 | E | 5/2001 | Hill |
| 6,276,084 | B1 | 8/2001 | Lanier |
| 6,293,037 | B1 | 9/2001 | Spada et al. |
| 6,311,709 | B1 | 11/2001 | Louie et al. |
| 6,722,069 | B1 | 4/2004 | Lanier |
| 2007/0051024 | A1 | 3/2007 | Fuchs |

FOREIGN PATENT DOCUMENTS

| | | |
|---|---|---|
| WO | WO 97/25213 | 7/1997 |
| WO | WO 98/13813 | 4/1998 |
| WO | WO 2005/031682 | 4/2005 |
| WO | 2007052156 | 5/2007 |

OTHER PUBLICATIONS

Notification of Written Opinion and Search Report, International Search Report and Written Opinion issued in PCT/IB2007/003620, Aug. 21, 2008, 12 pages.

Office Action for U.S. Appl. No. 13/490,134 dated Sep. 9, 2013.

Examination Report as issued for Australian Patent Application No. 2011250876, dated Sep. 5, 2013.

PRIOR ART Fig.2W

Fig.3D
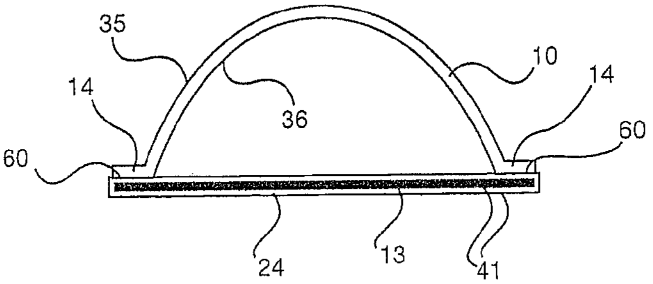
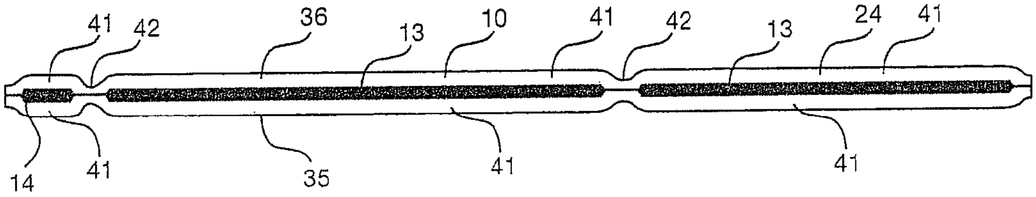
Fig.3E
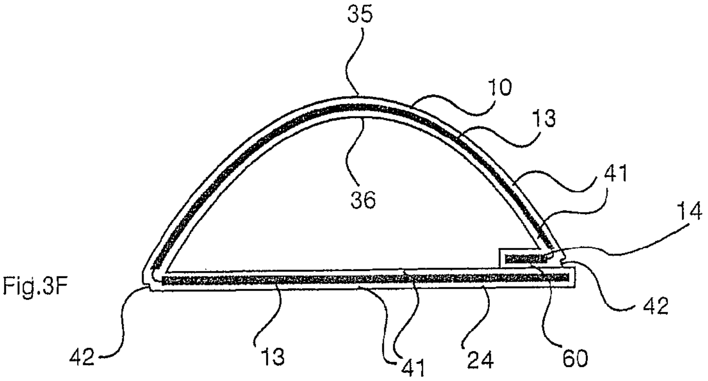
Fig.3F
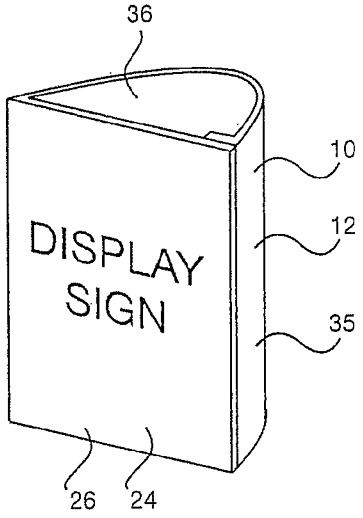
Fig.3G

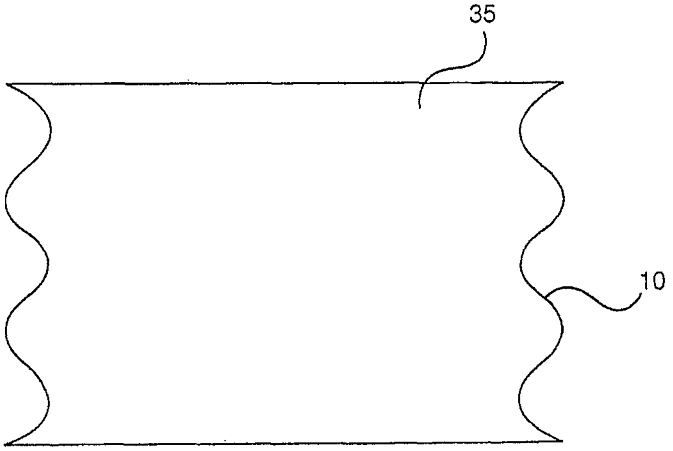
Fig.8A
Fig.8B
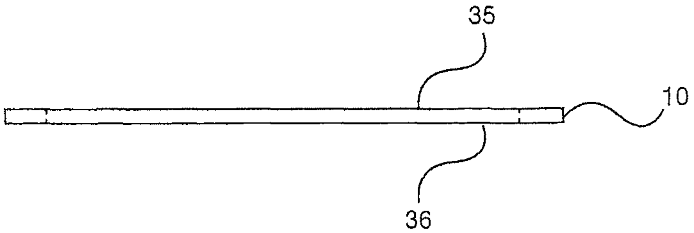
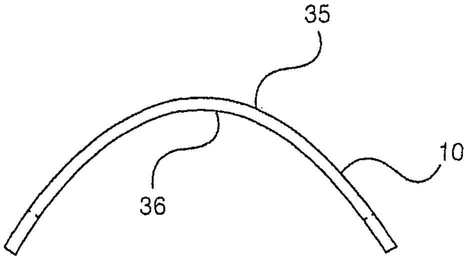
Fig.8C

A-A

Fig.14A
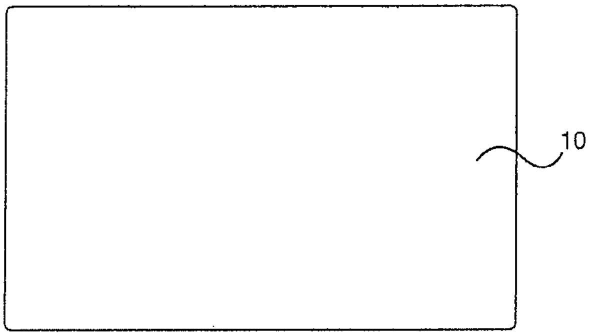
Fig.14B
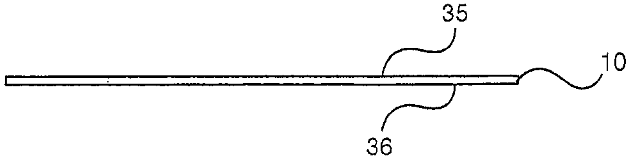
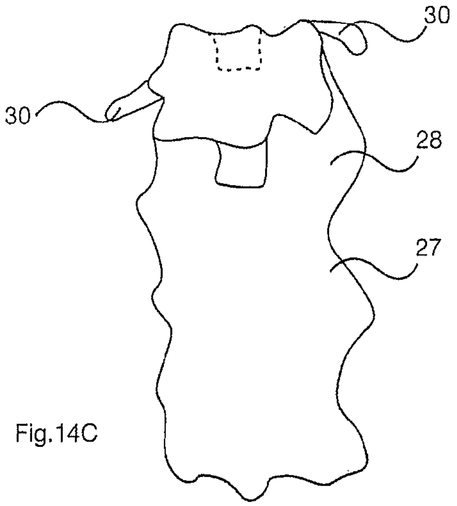
Fig.14C
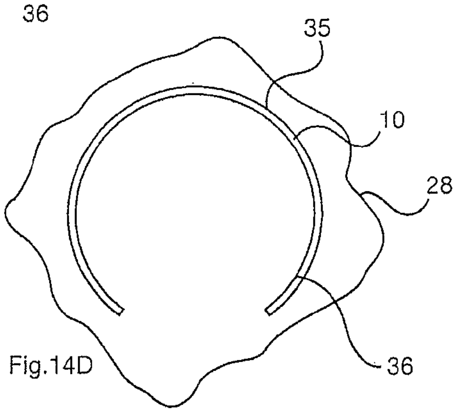
Fig.14D
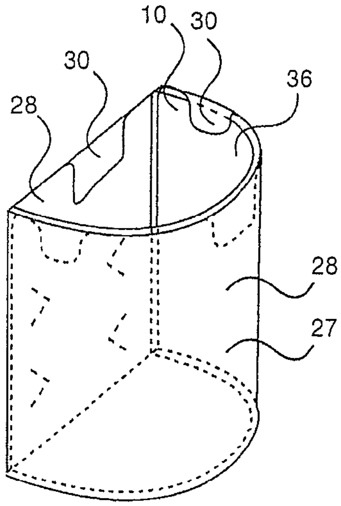
Fig.14E
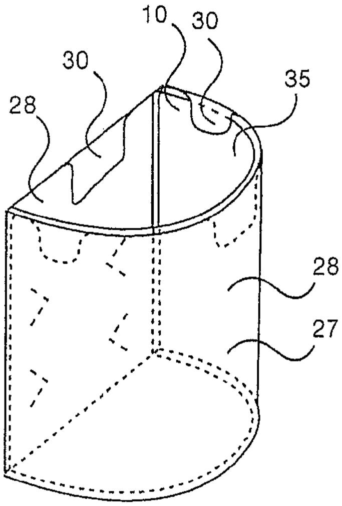
Fig.14F Fig.15D
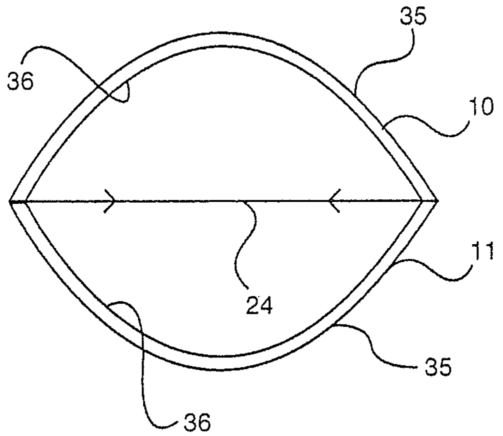
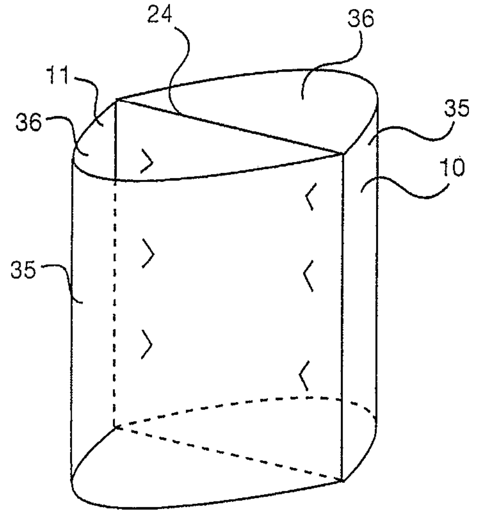
Fig.15E
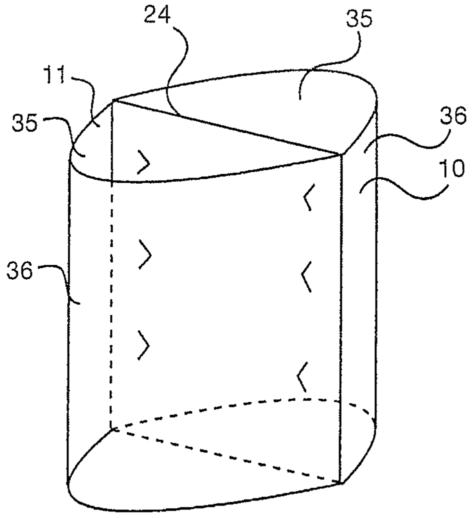
Fig.15F

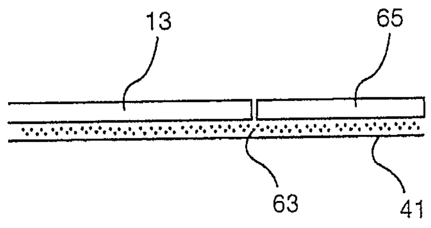
Fig.22V
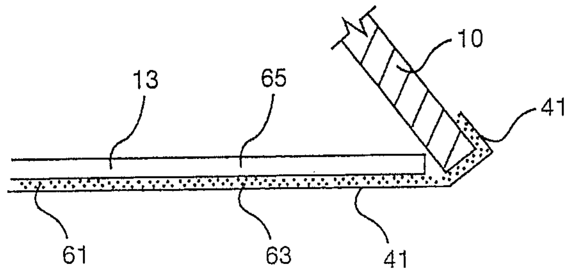
Fig.22W
Fig.22X
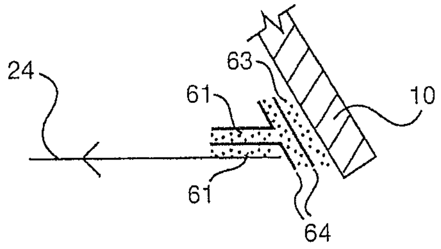
Fig.22Y
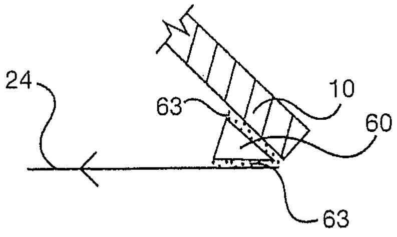

Fig.23D
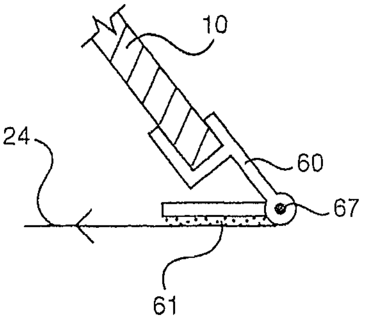
Fig.23E
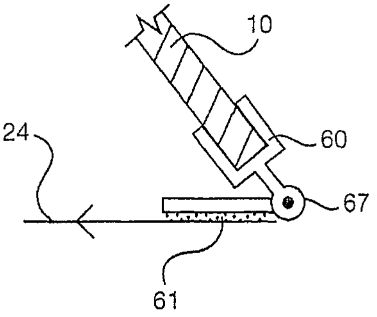
Fig.23F
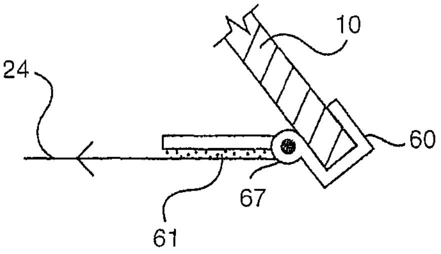
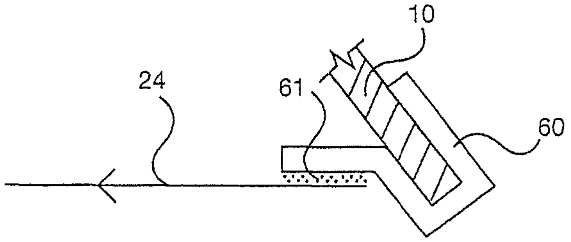
Fig.23G

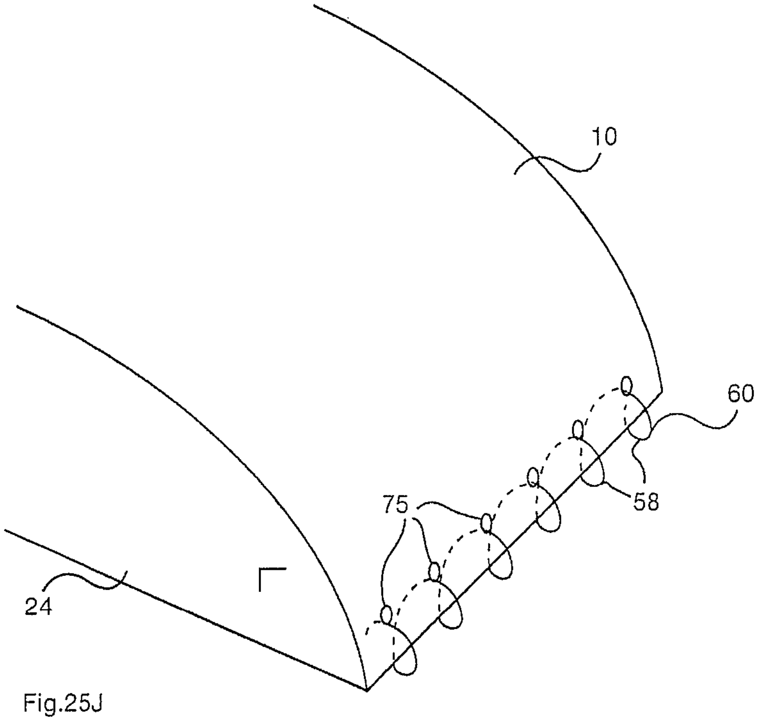
Fig.25J
Fig.25K
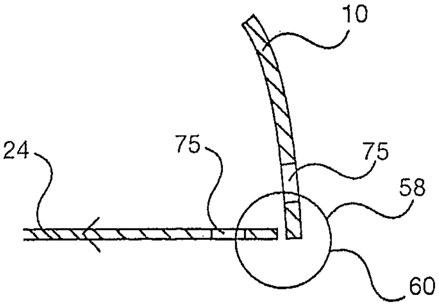

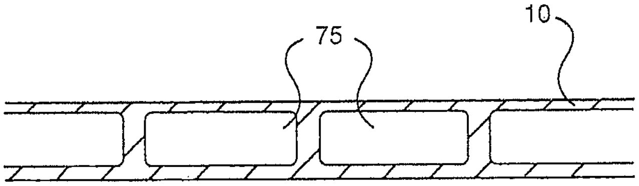
Fig.25L
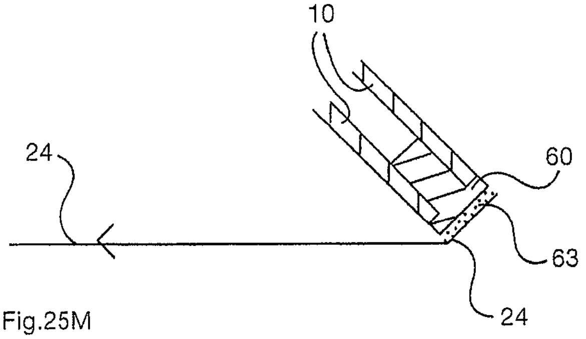
Fig.25M
Fig.25N
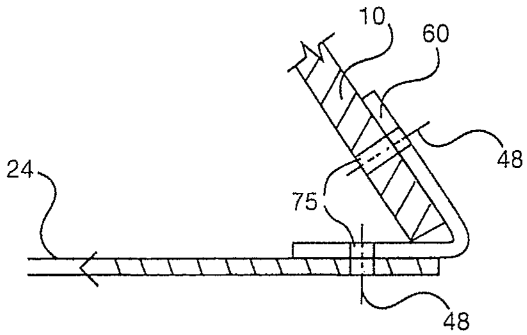

Fig.26G
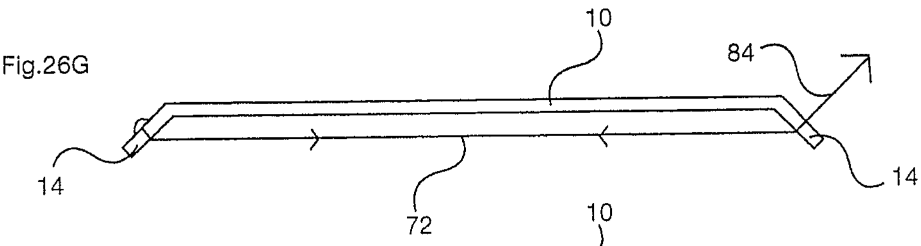
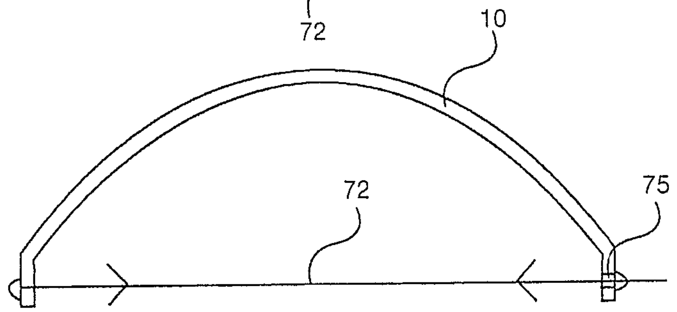
Fig.26H
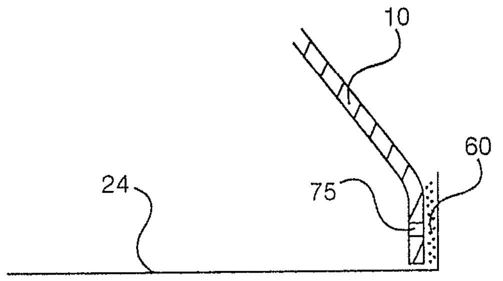
Fig.26J
Fig.26K
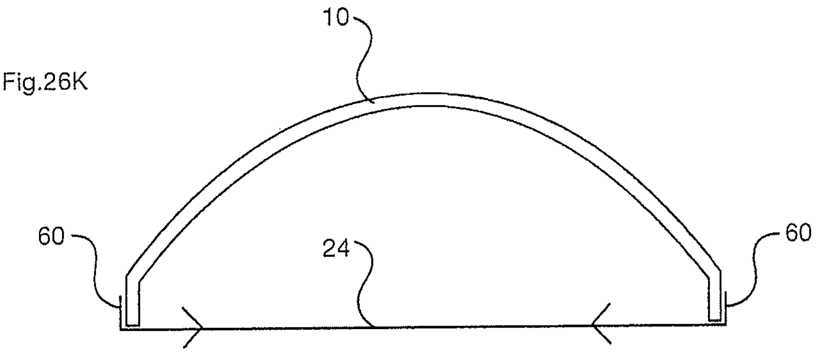

STRUCTURAL ASSEMBLY WITH A FLEXED, TIED PANEL

CROSS-REFERENCE TO RELATED APPLICATIONS

This application is the U.S. National Phase of PCT/IB2007/003620, filed Aug. 21, 2007, which in turn claims the benefit of PCT/IB2006/003667, filed Aug. 21, 2006, and U.S. Provisional Patent Application Ser. No. 60/831,306, titled "STRUCTURAL ASSEMBLY WITH A FLEXED, TIED PANEL" filed Feb. 23, 2007, the entire contents of all of which are incorporated by reference herein.

BACKGROUND

1. Field of the Invention

Embodiments of the present invention relate to structural systems or structures comprising a flexurally deformed panel.

2. Description of Related Art

Structural systems involving more than one panel connected together are commonplace, for example folded plate roofs, boxes, etc. Connecting two originally planar elements together, one of which is substantially deformed, is also known. For example, corrugated paper or card comprises a sheet of plane paper or card which is deformed by means of pressure, heat and water content (but not flexural stress) into a corrugated shape, for example of sinusoidal cross-section, and is then adhered by gluelines to one or two plane sheets of paper or card. However, in the case of corrugated paper or card, the corrugated element is typically deformed in a material state and under conditions such that, were it not attached to the one or more planar sheets, it would still be corrugated in repose. Corrugated plastic constructions, such as Correx® a trademark of Kaysersberg Plastics, a part of D S Smith (UK) Ltd. are made by extrusion, not flexural deformation of the core.

Tied members which are deformed within the elastic range are also known, for example the common bow for projecting arrows, which typically comprises a substantially linear member of wood or a laminate of several materials, which is flexurally deformed and tied at each end by the string of the bow.

Point-of-purchase display devices are also known in which a substantially vertical filmic display is tensioned by one or more bowed linear prop members, typically fixed to and flexed between a heavy base, to which the bottom of the display film is also attached, and a cross-member at the top of the display panel. The bowed prop members are made slightly longer than the display film and are flexurally deformed to induce tension in the display film to keep it flat or plane. A heavy base is required for lateral stability of these systems.

Panels flexed and restrained between two points of a relatively very rigid member are also known, for example, flexed acrylic or other plastic sheets within some light fittings.

British Patent Application No. 8510775 "Constructional Member of Variable Geometry" (Hill and Higgins) discloses substantially linear members comprising interlocked, substantially linear components that can be flexurally deformed and fixed in their deformed geometry by means of discrete mechanical fixings.

In the field of building structures, tied arches and vaults are known, as are flitch beams, slabs, arches and vaults with prestressed ties. Curved and tied building structures are disclosed in U.S. 16,767, U.S. Pat. No. 1,687,850, U.S. Pat. No. 1,762,363, U.S. Pat. No. 1,963,060, U.S. Pat. No. 2,237,226, U.S. Pat. No. 2,287,370, U.S. Pat. No. 2,360,285, U.S. Pat. No. 3,057,119, U.S. Pat. No. 4,536,997 and U.S. Pat. No. 5,595,203.

U.S. Pat. No. 4,865,111 and U.S. Pat. No. 4,979,554 disclose flexed, tied panels forming the ends of a display system.

U.S. Pat. No. 6,311,709 discloses a self-erecting, collapsible fabric dome structure comprising resiliently flexible wire.

U.S. Pat. No. 5,313,666 discloses a flexed panel facial sunshield apparatus.

U.S. Pat. No. 2,160,724 and U.S. Pat. No. 2,862,322 both disclose opaque displays in an assembly comprising an opaque curved card element and a plane element which is "D" shaped on plan, to provide a stable display assembly. The curved and plane components are connected by means of folded card tabs, which will inevitably open up in use and cause reduction of any tension in the plane element. U.S. Pat. No. 5,619,816 discloses a flexed display assembly with string ties. U.S. Pat. No. 6,276,084 and U.S. Pat. No. 6,772,069 disclose means of restraining a display panel in a curved shape.

U.S. Pat. No. 4,749,011 and U.S. Pat. No. 6,065,512 disclose a flexed panel for opening up a flexible bag.

Zips to join two pieces of plastic together are known. U.S. Pat. No. 6,540,085 (Davies) discloses plastic zips comprising teeth attached to side panels and a sliding connector, the side panels typically being heat bonded to a plastic film material being joined.

BRIEF SUMMARY OF THE INVENTION

According to one or more embodiments of the present invention, an assembly comprises a panel, a membrane tie, and a linear connector, the panel being flexurally deformed from an initial geometry and restrained in a flexurally deformed geometry by the membrane tie and the linear connector.

According to one or more embodiments of the present invention, an assembly comprises:

a panel;

a tie; and a display sign, said display sign being applied to or forming a part of said panel and/or said tie, said display sign facing in one display direction, said panel being flexurally deformed in one direction of curvature from an initial geometry and restrained in a flexurally deformed geometry by the tie, and wherein the one direction of curvature of the panel is reversible to form a reverse flexed panel assembly such that said display sign or another display sign is facing in said one display direction.

According to one or more embodiments of the present invention, an assembly typically comprises:

a panel;

a membrane tie; and a pull-apart linear connector, the panel being flexurally deformed in one direction of curvature from an initial geometry and restrained in a flexurally deformed geometry by the membrane tie and the pull-apart linear connector, and wherein the one direction of curvature of the panel is reversible to form a reverse flexed panel assembly.

According to one or more embodiments of the present invention, there is a method of reversing the curvature of a panel within an assembly, said assembly typically comprising a flexurally deformed panel and a tie, said method comprising the steps of:

(i) flexurally deforming said panel in one direction of curvature from an initial geometry, (ii) restraining said panel in a flexurally deformed geometry by a tie, (iii) subsequently releasing said panel by releasing said tie, said panel forming a residual panel geometry having residual curvature in said one direction of curvature.

(iv) flexurally deforming said panel in the opposite direction of curvature to said one direction of curvature, and (v) restraining said panel in a reverse flexed geometry by said tie or another tie.

Embodiments of the invention can have many different geometric forms and many different practical applications. Assemblies may be relatively large, for example demountable and reusable shelters or flat-pack point-of-purchase display assemblies, or may be relatively small, for example a photograph or postcard display system, or extremely small, for example an element of a small spring mechanism.

Components of one or more embodiments of the invention typically are packable and transportable flat, to be assembled remote from the point of manufacture.

A "panel" typically has two plane parallel surfaces and is relatively thin in relation to its overall size. The thickness or minimum dimension of a panel is typically less than one tenth and preferably less than one twentieth and more preferably less than one fiftieth and even more preferably less than one hundredth and even more preferably less than five thousandths of its overall length. Panels are typically semi-rigid in that they may be flexurally deformed through an angle of at least 10° and preferably through 20° and more preferably 90° and even more preferably 180° within the short term, substantially elastic range of the panel parent material or composite material, such that they will substantially regain their original geometry if released immediately after flexure. Panel materials have a stress/strain curve with a substantially elastic range, such as steel, or are materials which 'creep' with time under load, such as plastic materials which exhibit nonlinear viscoelastic behavior of creep and/or relaxation upon sustained loading. Panels may be of any shape, for example square, rectangular, triangular, circular, petal shaped (sometimes referred to as petaloid or petalate) or any free-form, irregular shape. A panel is optionally of uniform thickness or tapered or otherwise of varying thickness throughout its area. Panel materials are optionally grossly deformed in the initial geometry, for example by the creation of "plastic hinges" in which a material is locally deformed beyond its elastic range, in some materials referred to as folds or creases, before the initially grossly deformed panel is flexurally deformed within its substantially elastic range according to one or more embodiments of the invention. A panel optionally is of initial single or double (bi-axial) curvature before being flexurally deformed. Such panels are pre-folded or pre-curved in their initial geometry, in order to achieve the desired final, flexurally deformed geometry. Examples of panel materials, typically semi-rigid sheets, for example of plastics materials, are acrylic, polycarbonate, polyester, copolyester, acetate, polyvinyl chloride (PVC) or composite materials, for example glass fibre reinforced or carbon fibre reinforced plastics or resins, or metals, for example steel, stainless steel or aluminum, rubber, rubber compounds, synthetic rubber such as neoprene, or laminates, for example paper or card laminated to a single plastic laminating film or encapsulated by two plastic laminating films, for example of polyethelene, polyester, polypropylene, nylon or pvc, for example either cold-laminated using pressure-sensitive adhesive or hot-laminated using heat-activated adhesive, or so-called "stressed skin" panels comprising two outer layers and an inner cellular or foamic cores, for example aluminum stressed skin panels as used in aircraft construction, or natural materials or processed natural materials, for example timber boards, plywood or chipboard. Optionally, the panel member is of substantially greater flexural stiffness than the membrane tie member. Panels are optionally opaque, translucent or transparent or partially transparent and/or partially translucent, for example see-through graphic panels according to U.S. RE37,186 or U.S. Pat. No. 6,212,805. A panel can typically support its own weight on one edge. A panel according to one or more embodiments of the present invention is capable of being flexurally deformed in opposite directions. Typically, this reversible flexure of the panel is to overcome the effects of viscoelastic creep and/or stress relaxation behavior over time, which reduces the bending and tensile stresses in the panel and tie respectively, thereby reducing the structural performance of an assembly. Upon dismantling an assembly, there is typically residual curvature in one direction and the panel is typically flexed in the opposite direction in a "reverse flexed panel assembly".

A "reversible panel" is a panel, the direction of curvature of which can be reversed in successive functional assemblies. Many examples of reversed panel functional assemblies are given in the figures and their descriptions herein. A "reversible panel edge stiffener" provides a stiffening restraint to a tied edge to a panel and optionally an increased compression capacity of a tied edge to resist a compressive force applied in line with or parallel to the tied edge and provides a "reverse flexed panel assembly" of the same geometry as the initial assembly geometry.

A "reverse flexed panel assembly" is an assembly in which a panel has been flexed in the opposite direction to its direction of curvature in the immediately preceding construction of an assembly comprising the same or a different tie member.

A "tie" is a tensile member of an assembly which restrains a flexed panel in a flexurally deformed, curved state.

A "linear tie" is a tie that is linear in form, for example a wire, rod, cable, spun twine, string, thread or rope or a monofilament or a bound cluster of rods or monofilaments. A linear tie typically connects two spaced apart points on a panel.

A "membrane tie" is a tie in the form of a membrane, for example a flexible plastic film material, for example of polyester, copolyester, acrylic, polycarbonate, PVC or polyethylene, or a thin sheet of metal, for example of steel, stainless steel or aluminum, or a thin sheet of plywood or paper or card or a fabric, including woven and non-woven fabric, or a laminate, for example paper or card encapsulated by two plastic films, for example of polyester, polypropylene, nylon or pvc, either cold-laminated using pressure-sensitive adhesive or hot-laminated using heat-activated adhesive. Membrane tie members are optionally nets or grids, such as square, triangular, hexagonal or other reticulated nets, or perforated materials, for example perforated steel, aluminum or plastic materials, the perforations being optionally punch-perforated or laser-perforated. A membrane tie typically connects two spaced apart straight or curved lines or loci on a panel.

Membrane ties are optionally of super elastic materials, for example rubber elastic or wound elastic material or elasticated fabric material, for example to create assemblies with large deformation and restitution capabilities. Membrane ties are optionally of hybrid construction, for example filmic ties may have cable or fiber reinforcing elements within them and/or around their perimeter, to add strength where required. Linear elements, for example open rings of cable, are optionally used to distribute the load in membrane ties, for example at discrete connection points to a panel, where there are points of stress concentration. The term "membrane tie" also includes an array of linear elements. A linear element includes a rod, for example of steel or plastic, a cable, such as a steel cable, wire, a rope, string, a monofilament, for example a polyester filament, or a spun natural or artificial fiber, for example thread, twine or a polyester multi-filament fiber. Linear elements of a membrane tie are preferably spaced at less than twenty times the thickness of the panel. Membrane ties are optionally plane, which may be referred to as planar ties, or be curved in one direction, of so-called single curvature, for example as a single curve or, as another example, in a multiple curve, for example in the form of a sinusoidal wave in cross-section, the primary tie function (direction of tensile stress) typically being perpendicular to such curvature or membrane ties are optionally of double or biaxial curvature. Membrane ties are optionally opaque, translucent or transparent, or partially transparent or translucent, for example vision control panels according to U.S. RE37,186 or U.S. Pat. No. 6,212,805.

A "tubular membrane tie" is a type of membrane tie and is typically a flexible membrane in the form of a tube which surrounds the outer surface of the flexurally deformed panel. Typically, the tubular membrane tie is more flexible than the panel.

A "web tie" is typically a membrane tie which is connected to a single continuous curved line or locus in a flexed panel. Optionally, the web tie is more flexible that the panel.

Definitions related to flexibility vary in different arts. Stiffness can be regarded as the inverse of flexibility. For the purpose of this invention, the Flexural Stiffness at one end of an elastic member of uniform cross-section which is pin-jointed at both ends:

$$\text{Flexural Stiffness}=EI/L$$

where E is the Modulus of Elasticity

I is the second moment of area (Moment of Inertia)

L is the effective length

The Flexural Rigidity of a member cross-section is considered to be:

$$\text{Flexural Rigidity}=EI$$

For a rectangular cross-section, such as is commonly selected for the panel and/or a filmic membrane tie, $$I=ht^3/12$$

where h is the width and t is the thickness of the member.

Typical values for the Modulus of Elasticity ($kN/mm^2$) of some of the materials which may be used for the present invention are:

| | |
|---|---|
| Pvc | 2.4-3.0 |
| Acrylic | 2.7-3.2 |
| PTFE | 0.3-0.6 |
| Polycarbonate | 2.2-4.0 |
| Nylon | 2.0-3.5 |
| Rubber | 0.002-0.1 |
| Neoprene | 0.7-2.0 |

Preferably the Flexural Rigidity of a membrane tie is less than the Flexural Rigidity of the panel, more preferably less than one hundredth of the Flexural Rigidity of the panel and even more preferably less than one thousandth of the Flexural Rigidity; of the panel.

A "linear connector" typically connects a side or edge of a panel to a side or edge of a membrane tie. The term "linear connector" includes an adhesive layer or "glueline", a weld or a pre-formed element, for example of plastics or metal, for example an extruded aluminum or plastics "profiled section" or a cold-formed steel section or any novel or known mechanical fixing such as a piano hinge, restraints utilizing friction, or interlocking closure systems, such as VELCRO®, a trademark of Velcro Industries B.V. or Dual Lock™ a trademark of 3M, and zips of any type. In order to connect a semi-rigid sheet of plastic to a plastic film by means of a zip, a transition tape or intermediate tape between the semi-rigid sheet and the side panel of the zip is typically required. The transition tape can be bonded by heat-activated adhesive, pressure-sensitive adhesive or solvent adhesive. Some connection details will be described which have been devised specifically for one or more embodiments of the invention. A linear connector may comprise frictional, magnetic or electrostatic force. A linear connector is optionally discontinuous, for example a plurality of discrete areas of adhesive material, or a layer of adhesive material with a plurality of discrete areas of adhesive material, or a layer of adhesive material with a plurality of areas without adhesive material, a line of discrete spot welds or rivets. The term "linear connector" includes a cable, for example in a ring or loop, which distributes localised stress, for example of the connection of a membrane tie to a corner of a panel. Preferably the linear connector has a direct bond to an elongate area of the panel and/or an elongate area of a membrane tie, the bond for example being provided by a weld or an adhesive layer, a magnetic force or an electrostatic force. Preferably, the direct bond covers an elongate area substantially parallel to an edge of the panel and/or membrane tie, of a width preferably not less than 3 mm and more preferably not less than 10 mm. Optionally, the linear connector is transparent, for example of extruded polycarbonate. A tubular membrane tie can be considered to have a frictional linear connector between a part of its surface and the corresponding adjacent concave surface of the flexed panel, or be considered not to comprise a linear connector but to restrain the panel by means of "wrap-around" tension in the tubular membrane tie.

A "point connector", sometimes referred to as a "node connector" or "nodal connector" is a connector at a point at which a linear tie is connected to a panel, for example a button or washer, for example of metal, plastic or rubber, or a tied knot or toggle at the end of a linear connector made of string or a screwthread and nut at the end of a rod linear connector. Optionally, a tie connects two points or loci on a panel indirectly, via a "spaced connector" or "spacing element" in an assembly.

A "pull-apart connector" comprises a substantially continuous linear connector that enables a panel and a membrane tie to be separated by only using pulling apart forces in substantially opposing directions. For example, pull-apart linear connectors include the types of linear connectors illustrated in FIGS. 16G and H, FIGS. 23A-24EE, 25C, 25E-25G and 25M. Pull-apart linear connectors also include the types of adhesive linear connectors illustrated in FIGS. 21A-22Y, in which an adhesive layer comprises a "removable pressure-sensitive adhesive". A "removable pressure-sensitive adhesive" is an adhesive that can be removed from one surface of the panel and/or membrane tie without transfer of the adhesive onto the panel and/or membrane tie. Pull-apart point connectors include the button and slot connector of FIGS. 18A and B.

The ease or degree of reversibility of the direction of flexure of a panel can be classified and sub-classified as, for example:

1st degree: an assembly comprising a "pull-apart connector", which may be sub-classified as having either:
(i) no adhesive, or
(ii) removable adhesive.

2nd degree: an assembly comprising a connector requiring rotation of a part of the connector through a maximum of 90° in order to convert it into a pull-apart connector, for example the rotation of a toggle in a point connector, for example as illustrated in FIGS. 18C and D.

3rd degree: an assembly comprising a connector requiring rotation of a part of the connector through more than 90°, for example a nut of a bolted connector.

4th degree: any assembly comprising a connector requiring substantial force cutting to separate the panel and the tie, for example comprising a permanent adhesive or welded connection.

A "transparent material" in the context of this invention is "water clear" or tinted and allows through vision such that:

(i) if a transparent material comprises two plane, parallel sides, it is possible for an observer on one side of the transparent material to focus on objects located directly in contact with or spaced from the other side of the transparent material, and/or (ii) if a transparent material is laminated to an object comprising 10 point indicia, the indicia are clearly legible.

A transparent material is preferably optically clear with a Reflection Optical Density (ROD) of less than 1.0, preferably less than 0.5.

The connection of the panel to the tie preferably approximates to what is referred to in the art of structural engineering as a pinned joint or pinned connection, having a bending moment resistance approximating to or tending towards zero.

In a first embodiment of the invention, a rectangular, plane panel, for example a semi-rigid acrylic sheet, is flexurally deformed about one axis and the two opposite edges parallel to this axis are spaced apart and connected by a linear tie member. For example, a semi-rigid acrylic sheet is tied by means of a flexible string with a toggle at each end threaded through a hole adjacent to the centre of each opposing edge of the panel. The resultant structural assembly is dimensionally stable, for example if placed on a horizontal support surface with one of the flexurally curved edges resting on the horizontal support surface, or with the four corners of the panel resting on individual supports or a horizontal support surface. The direction of curvature of the panel is easily reversible and retied by the same string by removing one toggle from one hole, pulling it through to react against the other side of the panel by the other hole, reversing the flexure of the panel and pushing the other toggle through the one hole.

In a second embodiment of the invention, a rectangular, plane panel, for example a semi-rigid acrylic sheet, is flexurally deformed about one axis and the two opposite edges parallel to this axis are spaced apart and connected by a membrane tie member. For example, a semi-rigid acrylic sheet is flexed and tied by a polyester film material, typically of much lower flexural stiffness than the panel. The panel and the membrane tie are typically connected by a linear connector, for example an adhesive layer between the plastic sheet and the plastic film along the two opposite sides. Alternatively, for example, the flexurally deformed or "flexed" panel is a plywood sheet flexed and then tied by another, typically thinner, plywood sheet. In the case of the plywood assembly, for example, a steel angle is connected by screws or gluelines to the plywood panel and the plywood membrane tie. The resultant structural assemblies are dimensionally stable, for example if placed on a horizontal support surface with one of the flexurally curved edges resting on the horizontal support surface, or with the four corners of the panel resting on individual supports or a horizontal support surface. Alternatively, the four corners of such an assembly can be supported on four elevated level supports. For example, the plywood assembly forms a novel form of tied barrel vault roof, an efficient structural roofing system, especially if the open ends of the structure are closed by a "shear diaphragm" stiffening members, for example of further sheets of plywood, which help to maintain the dimensional stability of the structure upon subsequent "dead loading" of any other constructional materials or "live loading", for example of people on the roof formed by the tied, flexurally deformed panel. The direction of curvature is reversible, the ease of reversibility depending on the nature of the linear connector or connectors.

In a third embodiment of the invention, a rectangular plane panel, for example a semi-rigid acrylic sheet, is flexurally deformed about one axis and a tubular membrane tie surrounds the flexed panel and maintains the panel's flexurally deformed geometry by tension in the tubular membrane tie. The tubular membrane tie preferably extends beyond the edges of the flexed panel and is optionally sealed at one end, for example in the form of a bag, or is optionally sealed at both ends.

In a fourth embodiment of the invention, a rectangular, plane panel, for example a semi-rigid acrylic sheet, is flexurally deformed about one axis and a web tie in the form of a membrane is typically connected along the length of at least one of the curved edges or alternatively is connected along another curved locus of the panel. The web tie is in tension to retain the panel in its desired geometry.

Such structural assemblies may be referred to as "tied, flexurally deformed panel" or "tied, flexed panel" structures. They also may be referred to as "flat-pack, curved structures". A principal advantage of one or more embodiments of the invention is that the structural assembly is typically fabricated from planar and optionally linear components which can be easily manufactured and subsequently processed, for example printed with a design. The components can be packaged flat or rolled, and can be transported more easily and economically than 3 dimensional structural members that are pre-formed (for example cast concrete structures or conventional steelwork structural members) and can be assembled temporarily, semi-permanently or permanently at sites remote from the component manufacturing site or sites. One or more temporary or semi-permanent embodiments of the invention can be designed to be dismantled easily and re-used or be transported conveniently to recycling or waste disposal centers. Optionally, the assembly is intended to be efficiently stored flat in one location and used occasionally in that one location, for example a podium or display assembly used for occasional public events held in the one location, to be dismantled and stored flat between such events.

The flexed panel or panels and tensioned membrane tie or tie members combine to provide a structural assembly that is typically more stable and has more load-bearing capability than the individual members or the same elements combined in their non-flexed or non-tensioned state. The direction of flexure of a panel is reversible in a reverse flexed panel assembly of typically greater stability and load-bearing capability then the initially constructed assembly.

Panels are typically plane before being flexed for the first time within an assembly and typically have sufficiently high in-plane tensile strength so as not to be conformable to accommodate double curvature. However, a variety of geometric shapes can be achieved by single curvature of plane panels, for example a variety of single curves or repetitive or varied wave shapes can be achieved, as well as a variety of "shell" structures.

Transparent panels and tie membranes are used, for example, to make transparent or partially transparent display assemblies with no independent framing or other such obstruction to through vision. Such assemblies are, in particular, suited to support or comprise one-way vision or other see-through vision control panels, for example as disclosed in U.S. RE37,186 or U.S. Pat. No. 6,212,805. Optionally, linear connector or connectors are also transparent, for example comprising transparent gluelines or transparent profiled sections, for example of clear, extruded polycarbonate.

Assemblies according to one or more embodiments of the present invention are optionally designed to be of variable geometry, typically by enabling the tie member or members to be altered in length, for example by means of tie rods that can be varied in length, for example by means of a turnbuckle, or wound elastic tie members that can be further wound or un-wound. The capability to amend the geometry of an assembly has many potential benefits, for example from minor adjustments to accommodate tolerances or errors in building construction, to substantial changes in geometry, for example to amend the effective area of a tied, flexed panel, for example acting as a sail on a boat or wind-powered electricity generating device.

Assemblies according to one or more embodiments of the present invention are optionally extremely flexible, to allow substantial deflection under load, such deflection being reversible if both the panel and tie elements are not loaded beyond their short-term elastic range. In structural engineering terms, assemblies according to one or more embodiments of the invention typically have a very high Coefficient of Restitution after short-term loading, even those incorporating viscoelastic, plastic materials. A membrane tie member optionally performs a rebound or trampoline function, taking advantage of the stored energy and elastic deformation capability of a suitably designed assembly according to one or more embodiments of the invention. Such properties are useful in the manufacture of many products, from very small spring assemblies to sprung platforms, for example as may be used in "bouncy castles". One or more embodiments of the invention are optionally used to create energy through changing, repeated flexure of a panel and tensile strain of a membrane tie member, for examples if an embodiment of the invention comprises materials which create an electric current upon flexure, for example buoys at sea are capable of being illuminated by wave action upon an assembly of an embodiment of the invention comprising such flexurally activated material.

Additional elements are optionally used to adapt a tied, flexed panel assembly. For example, further ties or infill material such as flexible foam are used to make a tied, flexed panel assembly into a shock absorbing structure. While most tied, flexed panel structures will be designed to perform within their short-term elastic range, they are optionally designed to 'fail', for example by the creation of plastic hinges in a panel, as part of an impact absorption system, for example on a vehicle or as 'buffers' or in safety or security barriers.

Assemblies according to one or more embodiments of the present invention are optionally combined "tiled" or otherwise used together, for example a canopy structure can be replicated to produce a building or canopy of a larger size within a required maximum roof profile height.

The ability to use lightweight materials and transport components flat or in roll form means one or more embodiments of the invention can be efficiently packaged and transported by air, sea or land to remote locations and assembled to fulfil needs on a temporary or permanent basis, for example enclosures or other protective structures against sun, wind, sand, precipitation or other natural elements.

Depending primarily on the size of panel member, the flexural deformation of the panel is achieved by purely manual means or requires mechanical means of deforming the panel before being tied to form a stable, tied, flexed panel assembly. For example, temporary clamps can be applied to a panel or holes, slots or recesses may be formed in a panel to enable temporary ties to pull the panel into an "intermediate panel geometry" before attaching the more permanent tie member(s). Optional mechanical assistance in deforming panels includes, for example, scissor mechanisms or a ratchet cable device, typically lever operated, for example a Tirfor™ "grip hoist" by the Tractel Group, USA. Scissor mechanisms, akin to a scissor lift, typically comprise two parallel members which can be moved towards or away from each other but which typically maintain the parallel relationship of the panel sides being drawn together. Flexure is optionally achieved by means of one or more tie straps, which are placed around the panel, initial deflection induced manually or, for example, by a friction buckle or ratchet device, the straps being successively tightened until the required intermediate panel geometry is obtained. After fixing the tie in place and applying any linear or point connector or connectors, the panel is released, transferring the tensile force to the membrane tie, then any temporary restraints are removed, to leave the finished tied, flexurally deformed assembly.

Optionally, clamps enable an eccentric tie force to be applied to the panel, for example by means of a cable, to initiate and then complete flexure. Flexural deformation is optionally assisted by the provision of a temporary framework or jig to restrain the panel in an "intermediate panel geometry". The final tied, flexurally deformed geometry results from the linear, membrane or web tie member taking up its tension force, typically allowing some "relaxation" from the "intermediate panel geometry" into the "tied, flexurally deformed panel geometry" of the finished assembly.

In some embodiments, some initial and/or intermediate flexural deformation is optionally achieved by differential heating or cooling of the two principal surfaces of the panel.

An assembly optionally comprises a means of edge stiffening, for example the edge of the panel being permanently deformed, for example by an acrylic panel subjected to hot wire bending, or one or more stiffening members being inserted into the assembly.

Assemblies optionally comprise both a linear tie and a membrane tie or optionally comprise a linear tie, a membrane tie and a web tie or optionally comprise a membrane tie and a web tie. For example, a simple enclosure comprises a flexed acrylic sheet tied by a membrane tie, for example of polyethene acting also as a ground sheet, with end panels optionally acting as web ties, for example of canvas or woven polyester, the web ties optionally reinforced by a linear tie, for example of nylon rope sewn into a bottom edge seam of the web tie and connected to corners of the panel.

Temporary enclosures manufactured according to one or more embodiments of the invention have a number of potential advantages over prior art enclosures, for example purely fabric tent enclosures, for example in providing a sheltered observation post with clarity of vision through a transparent flexed panel, for example a clear, transparent polycarbonate sheet. Conversely, vision into the shelter can be a desirable benefit, for example for security reasons, by the human eye or camera. Panel or membrane tie members of the assembly optionally comprise so-called vision control products, for example one-way vision products, for example as disclosed in U.S. RE37,186, for example if a good view out of an enclosure is required in conjunction with obscuration of vision into the enclosure.

Assemblies according to one or more embodiments of the present invention encompass a wide range of size, from large building structures, down to very small scale structures, for example panels of less than 1 mm overall width contained within tubes of less than 1 mm diameter, for example to form a mass of low density, high porosity, sprung elements, for example as an energy absorbing medium.

Additional and/or alternative advantages and salient features of one or more embodiments of the invention will become apparent from the following detailed description, which, taken in conjunction with the annexed drawings, disclose preferred embodiments of the invention.

BRIEF DESCRIPTION OF THE DRAWINGS

All the figures are diagrammatic, not to scale and typically not in the correct proportion of thickness of members in relation to their overall dimensions. In numbering the figures, the suffix letter characters I, O, II and OO have been omitted. Referring now to the drawings which form a part of this original disclosure:

FIGS. 2F-J are perspectives of assemblies with a vertical membrane tie.

FIG. 2W is a perspective of a prior art acrylic display assembly.

FIG. 2AA is a perspective of an assembly comprising a flexed panel with a concave curved edge and a membrane tie display panel.

FIG. 2BB is a perspective of an assembly comprising a flexed panel with a concave curved edge which has been reverse flexed and another membrane tie display panel.

FIG. 2CC is a plan of a panel with two inwardly curved edges.

FIG. 2DD is a perspective of an assembly comprising a panel with two inwardly curved edges.

FIG. 2EE is a perspective of a reverse flexed panel assembly comprising a panel with two inwardly curved edges.

FIG. 2FF is a perspective of an assembly comprising a panel with two outwardly curved edges.

FIG. 2GG is a perspective of a reverse flexed panel assembly comprising a panel with two outwardly curved edges.

FIG. 2HH is a plan of an assembly with a removable display sign and a backing insert.

FIG. 2JJ is a plan of a reverse flexed panel assembly with a removable display sign and a backing insert.

FIG. 2KK is a plan of an assembly with two removable display signs and a backing insert.

FIG. 2MM is a plan of a panel comprising three legs.

FIG. 2NN is a perspective of an assembly comprising a flexed panel comprising three legs.

FIG. 2PP is a perspective of a reverse flexed assembly comprising a flexed panel comprising three legs.

FIG. 10 E is an elevation showing a tied, flexurally deformed petaloid panel.

FIG. 10 F is a plan of the assembly of FIG. 10E.

FIG. 11F is a perspective of the mobile of FIG. 11E but with each flexed panel having been reversed in curvature.

FIG. 12A is a plan of a corrugated panel.

FIG. 12B is an edge elevation of a corrugated panel.

FIG. 12C is a cross-section of a tied, flexed corrugated panel.

FIG. 12D is a perspective of a tied, corrugated panel assembly.

FIG. 12E is a perspective of a table comprising a tied, corrugated panel.

FIG. 12F is a perspective of a reverse flexed panel assembly of FIG. 12D.

FIG. 12G is a reverse flexed panel assembly of FIG. 12E.

FIG. 13A is a plan of a panel.

FIG. 13B is an edge elevation of a panel.

FIG. 13C is an edge elevation of a flexed panel.

FIG. 13D is a perspective of a tubular membrane tie.

Figure 13A:
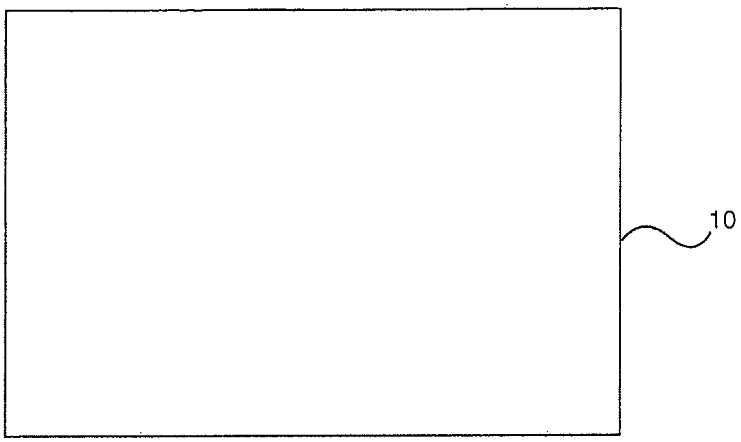
Figure 13B:
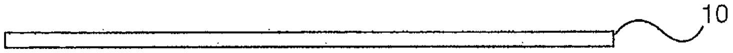
Figure 13C:
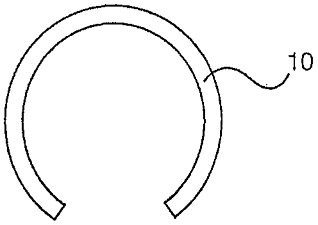
Figure 13D:
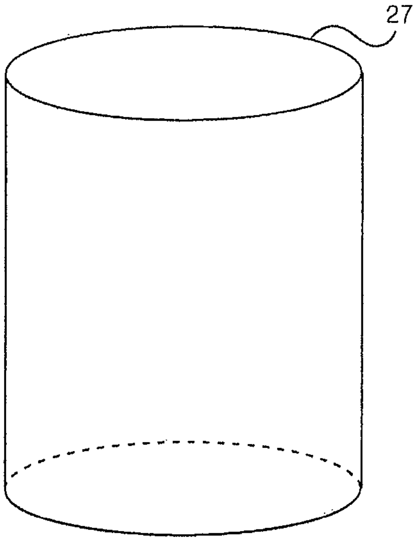
Figure 13E:
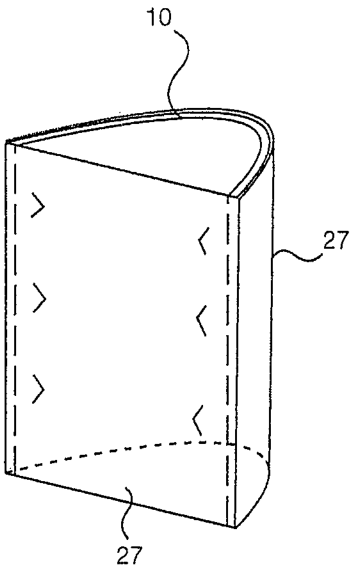

FIG. 13E is a perspective of a flexed panel within a tubular membrane tie.

Figure 13F:
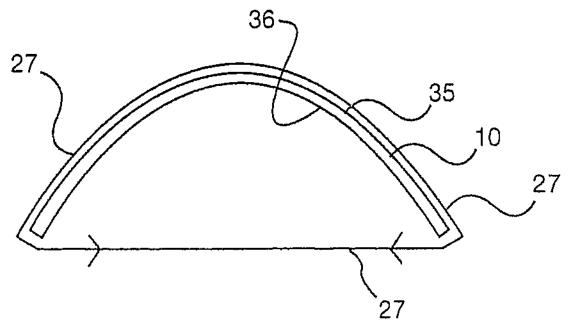

FIG. 13F is a diagrammatic cross-section of a flexed panel within a tubular membrane tie.

Figure 13G:
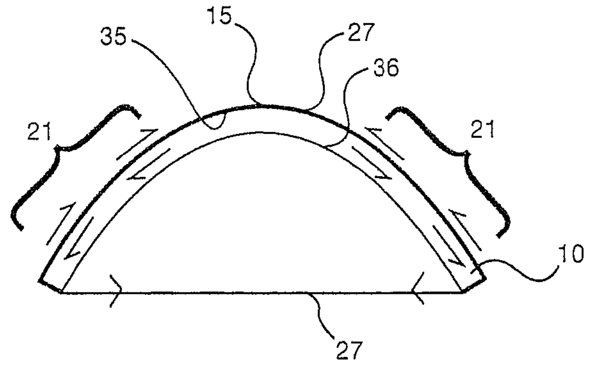

FIG. 13G is a diagrammatic cross-section of a flexed panel within a tubular membrane tie indicating frictional forces.

Figure 13H:
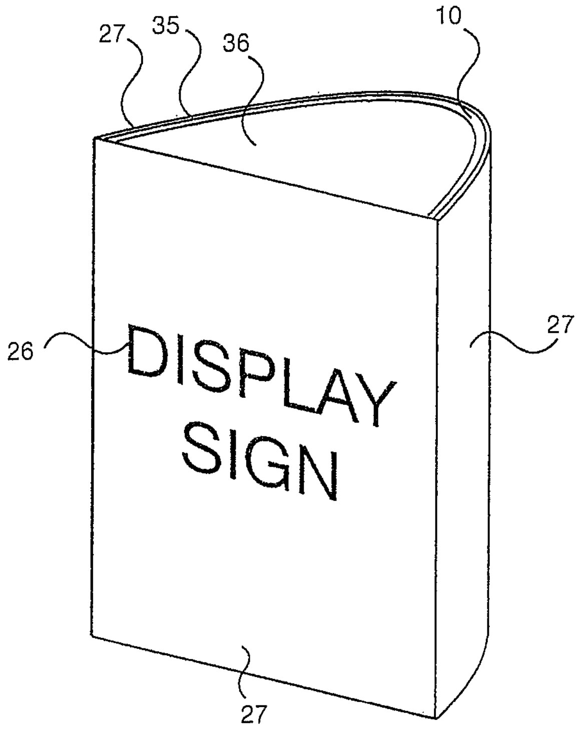

FIG. 13H is a perspective of an assembly comprising a tubular membrane tie which comprises a display sign.

Figure 13J:
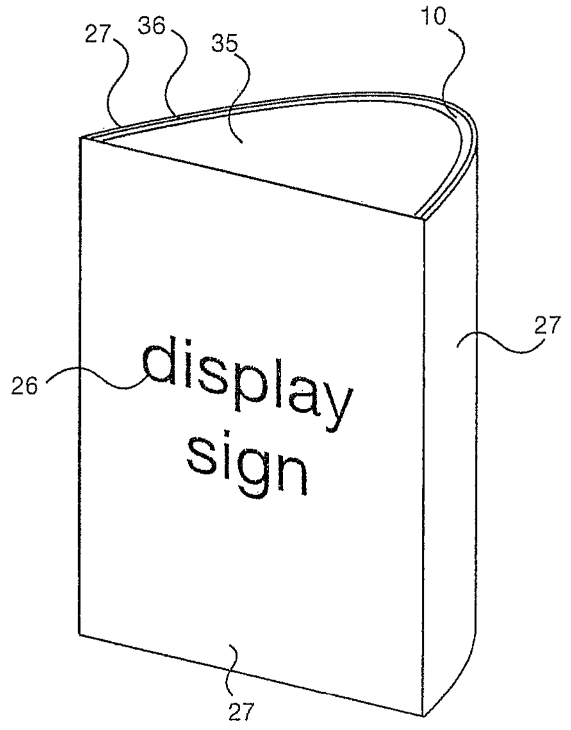

FIG. 13J is a reverse flexed panel assembly comprising a tubular membrane tie which comprises a display sign.

Figure 13K:
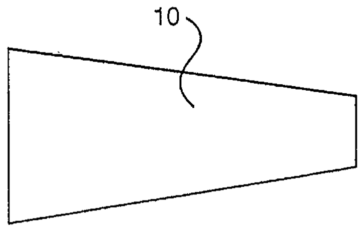

FIG. 13K is a perspective of a flexed panel within a tapered tubular membrane tie.

Figure 13L:
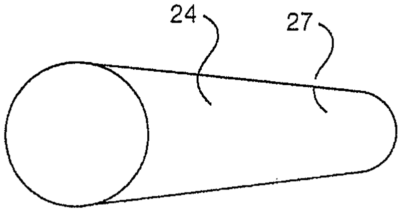

FIG. 13L is a perspective of a windsock assembly.

Figure 13M:
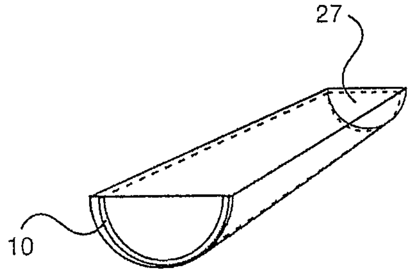

FIG. 13M is an elevation of a packaging assembly comprising a tubular membrane tie.

Figure 13N:
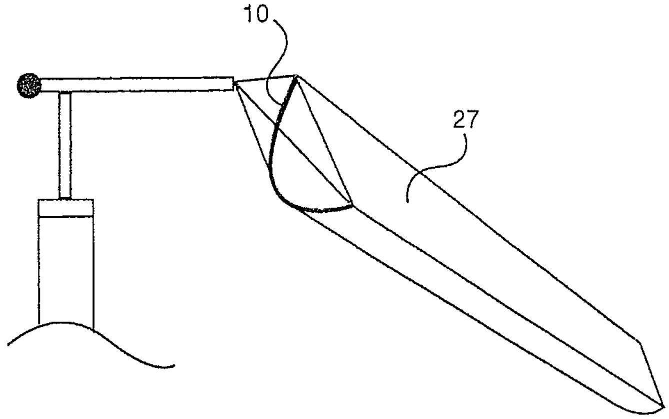

FIG. 13N is a perspective of a packaging assembly comprising a tubular membrane tie.

Figure 13P:
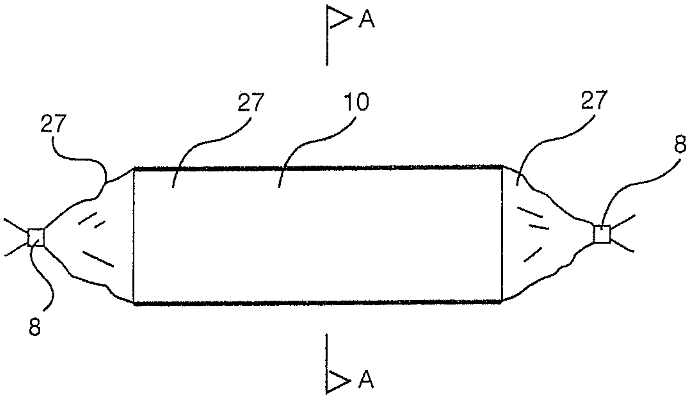

FIG. 13P is an elevation of a packaging assembly comprising a tubular membrane tie.

Figure 13Q:
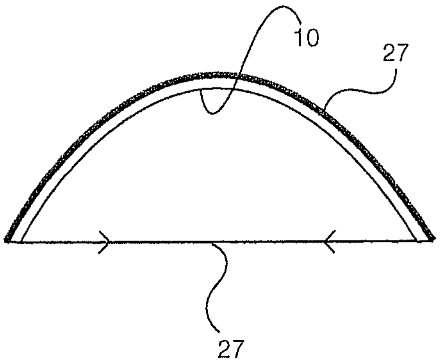

FIG. 13Q is a cross-section of a packaging assembly comprising a tubular membrane tie.

Figure 13R:
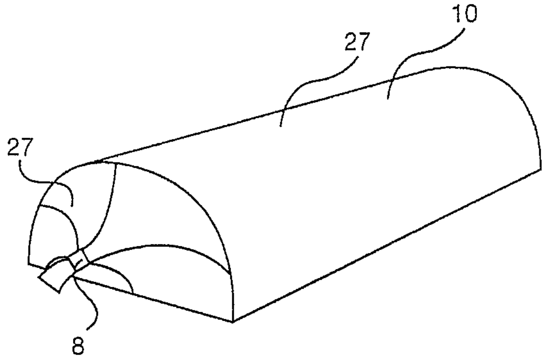

FIG. 13R is a perspective of a packaging assembly comprising a tubular membrane tie.

Figure 13S:
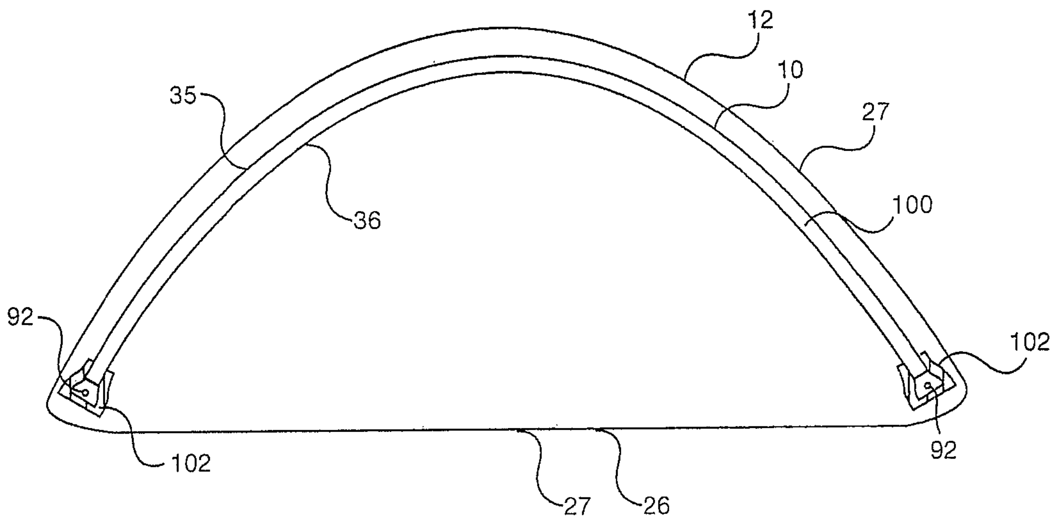

FIG. 13S is a cross-section through an assembly comprising a tubular membrane tie and an edge-lit flexurally deformed panel.

Figure 13T:
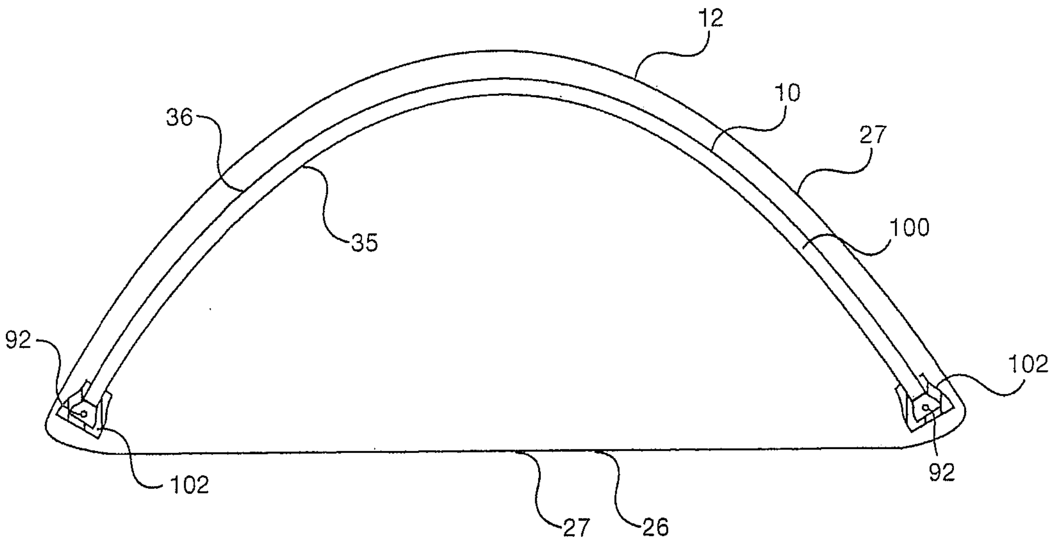

FIG. 13T is a cross-section through a reverse flexed panel assembly comprising a tubular membrane tie and an edge-lit flexurally deformed panel.

Figure 13U:
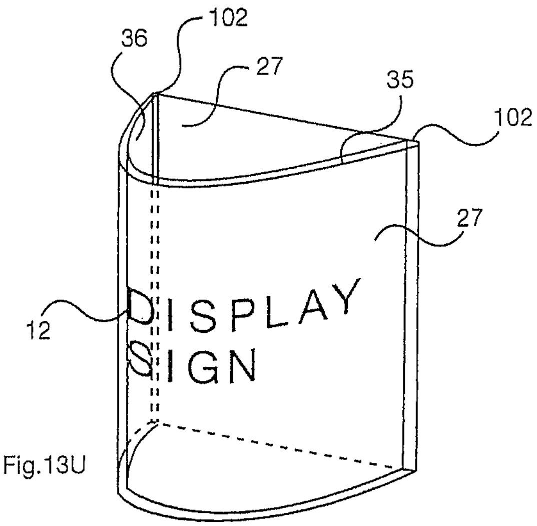

FIG. 13U is a perspective of an assembly comprising a tubular membrane tie comprising a display sign which is illuminated by an edge-lit flexurally deformed panel.

Figure 13V:
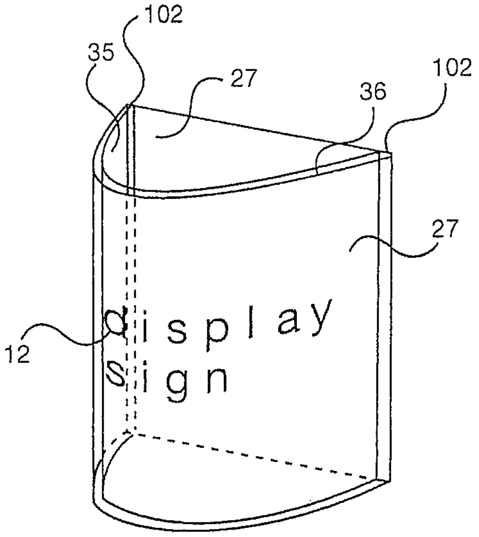

FIG. 13V is a perspective of a reverse flexed panel assembly comprising a tubular membrane tie bearing another display sign which is illuminated by an edge-lit flexurally deformed panel.

Figure 13W:
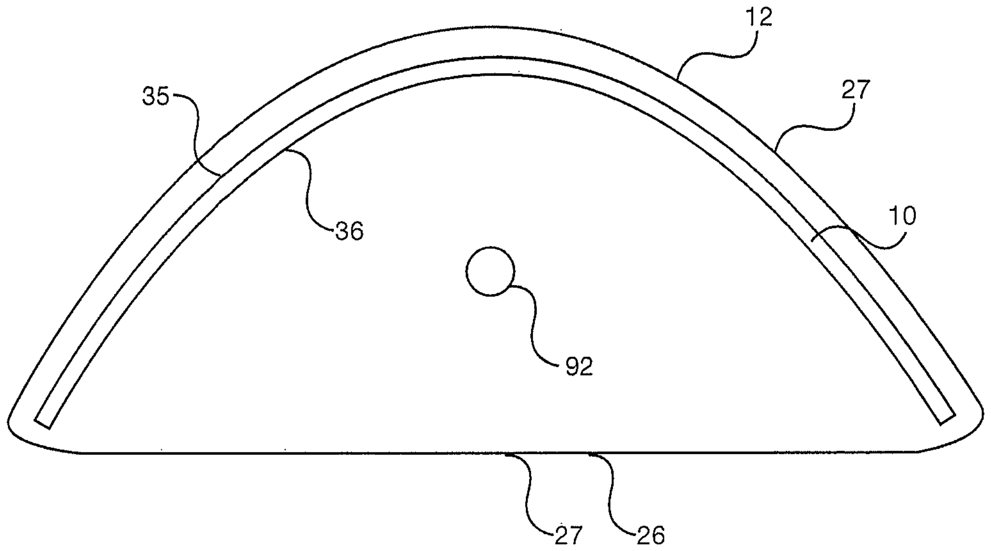

FIG. 13W is a diagrammatic cross-section of an assembly comprising a tubular membrane tie comprising a display sign which is illuminated by a light source within the assembly.

Figure 13X:
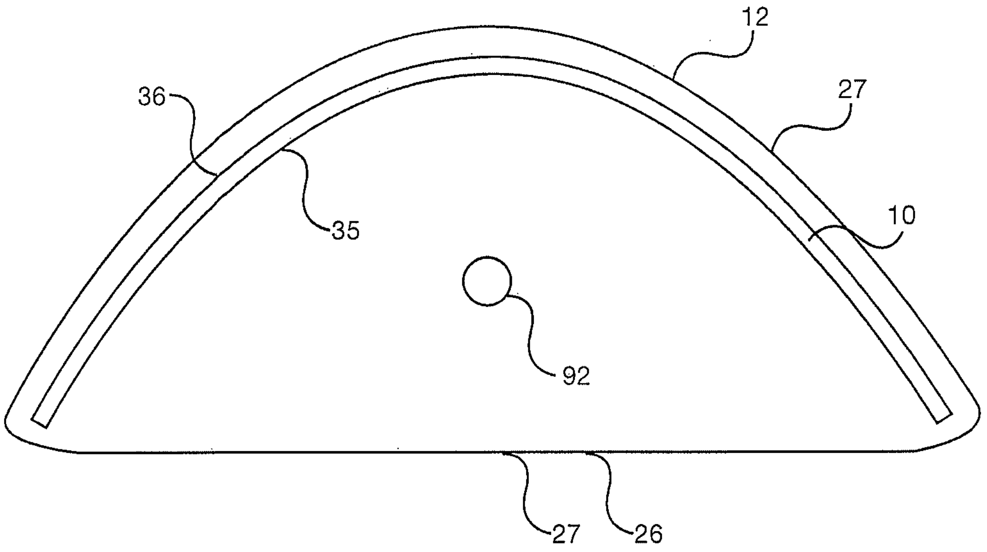

FIG. 13X is a diagrammatic cross-section of a reverse flexed panel assembly comprising a tubular membrane tie comprising a display sign which is illuminated by a light source within the assembly.

Figure 13Y:
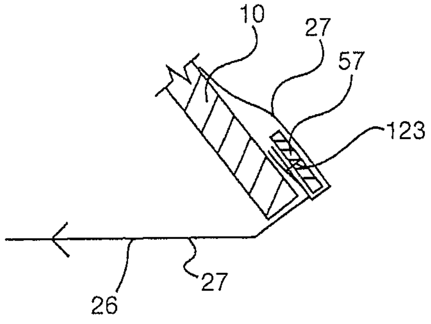

FIG. 13Y is a cross-section of a device for locating a tubular membrane tie in relation to a panel edge.

Figure 13Z:
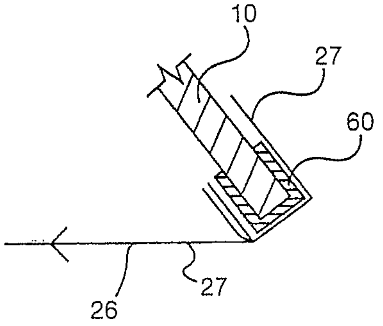
Figure 13A:
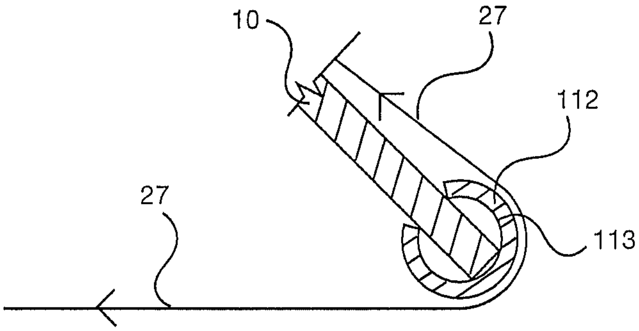
Figure 13B:
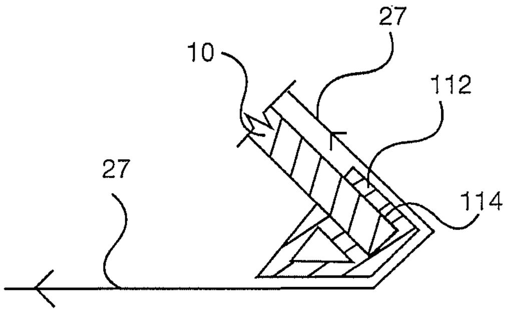
Figure 13C:
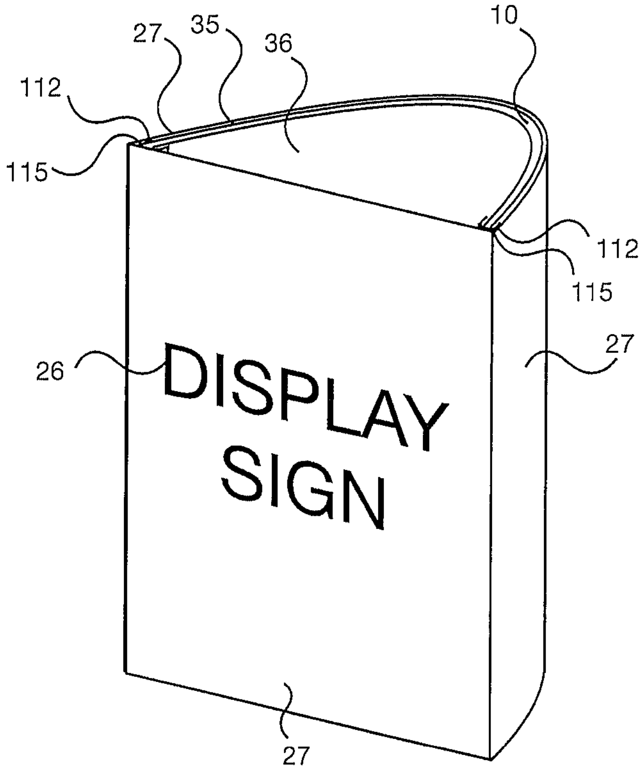
Figure 13D:
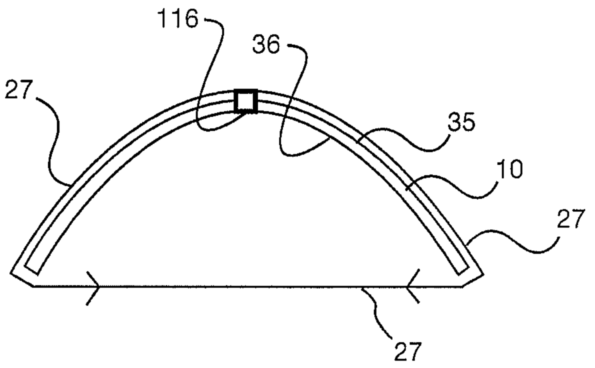
Figure 13E:
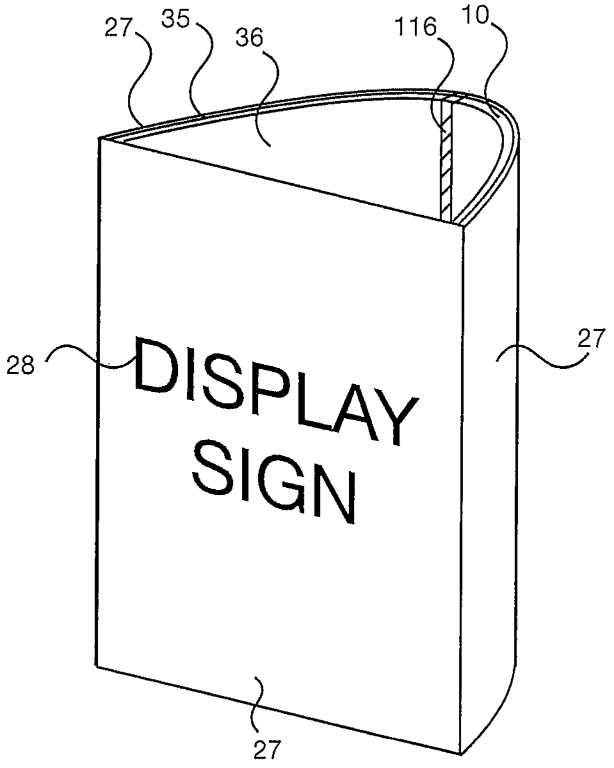
Figure 13F:
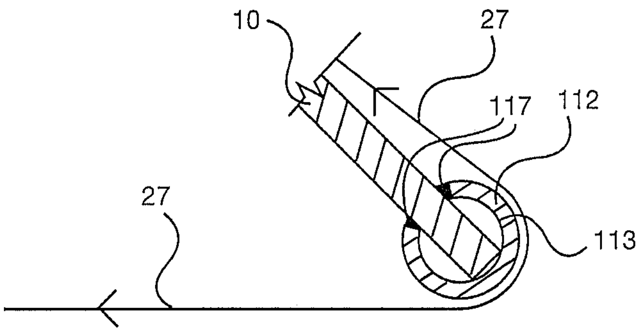

FIG. 13Z is a cross-section of a device for locating a tubular membrane tie in relation to a panel edge and acts as a linear connector.

FIGS. 13AA and 13BB are cross-sections through a reversible panel edge stiffener.

FIG. 13CC is a perspective of an assembly comprising a tubular membrane tie.

FIG. 13DD is a cross-section through an assembly with an elastic tape tensioning device.

FIG. 13EE is a perspective of an assembly with an elastic tape tensioning device.

FIG. 13FF is a cross-section through a split tube reversible panel edge stiffener.

FIG. 14A is a plan of a panel.

FIG. 14B is an edge elevation of a panel.

FIG. 14C is a perspective of a flexible bag.

FIG. 14D is a cross-section through a flexible bag containing a flexed panel.

FIG. 14E is a perspective of a bin-bag assembly.

FIG. 14F is a perspective of a reverse flexed panel assembly forming a bin-bag.

Figure 14G:
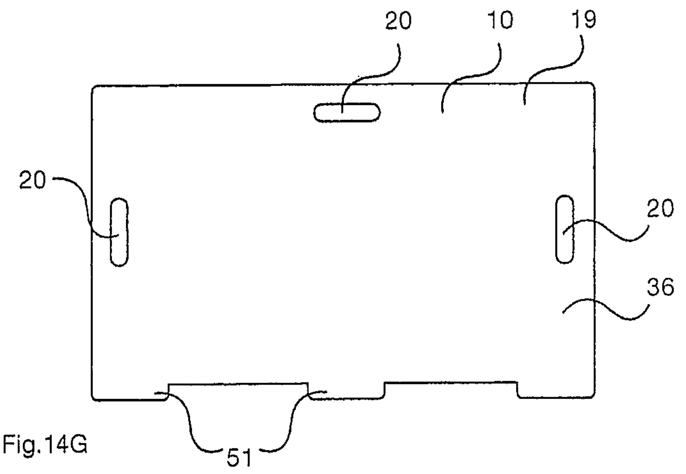

FIG. 14G is a plan of a panel comprising slots and protruding "feet".

Figure 14H:
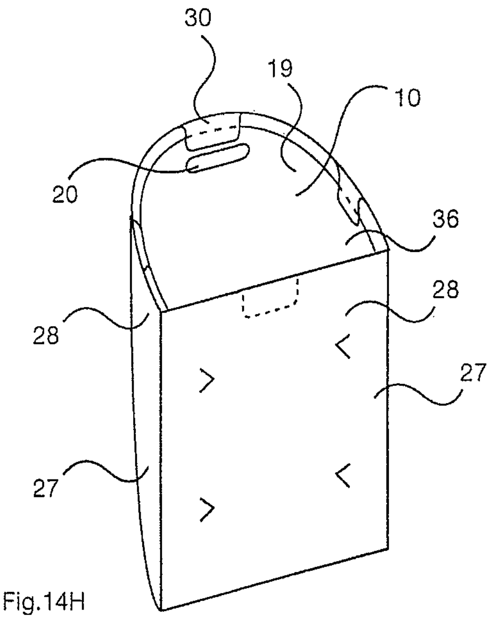

FIG. 14H is a perspective of a bin-bag assembly.

Figure 14J:
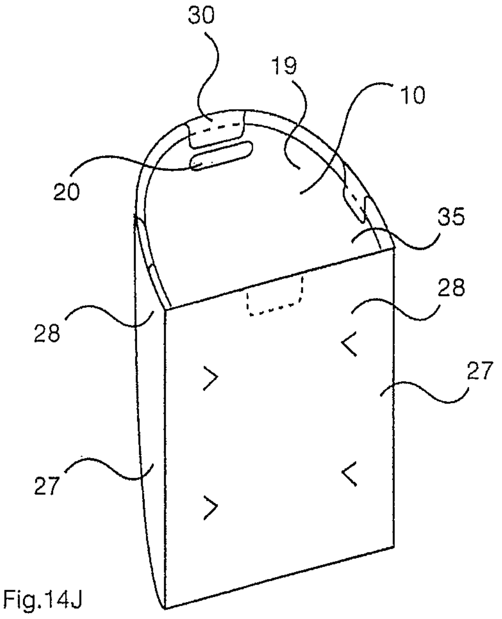

FIG. 14J. is a perspective of a reverse flexed panel assembly forming a bin-bag.

Figure 14K:
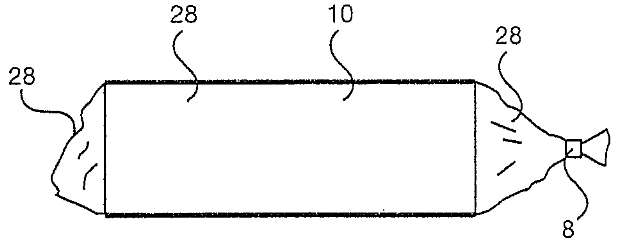

FIG. 14K is an elevation of a packaging assembly comprising a flexible bag.

Figure 15A:
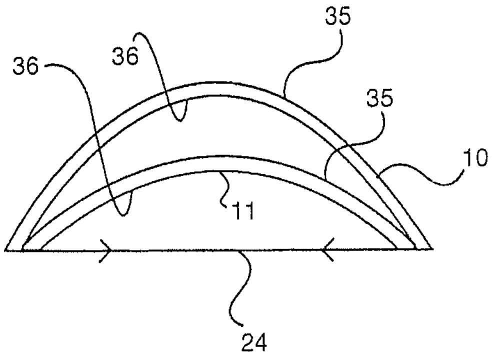

FIG. 15A is a cross-section through an assembly comprising two flexed panels.

Figure 15B:
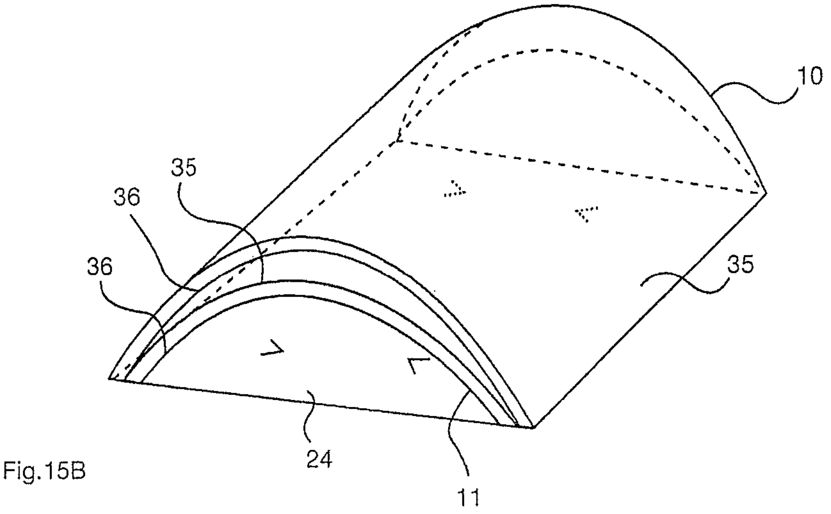

FIG. 15B is a perspective of an assembly comprising two flexed panels.

Figure 15C:
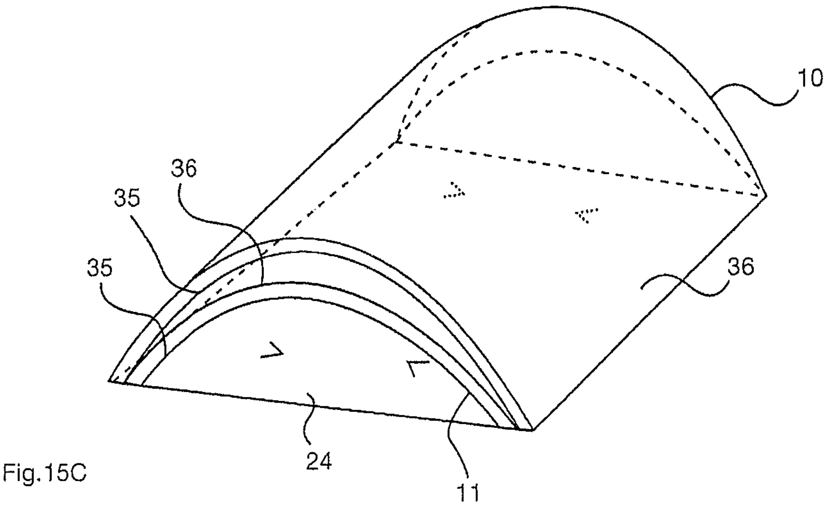

FIG. 15C is a perspective of a reversed flexed panel assembly comprising two flexed panels.

FIG. 15D is a cross-section through an assembly with two flexed panels and a mutual membrane tie.

FIG. 15E is a perspective of an assembly with two flexed panels and a mutual membrane tie.

FIG. 15F is a perspective of a reverse flexed panel assembly with two flexed panels and a mutual membrane tie.

Figure 15G:
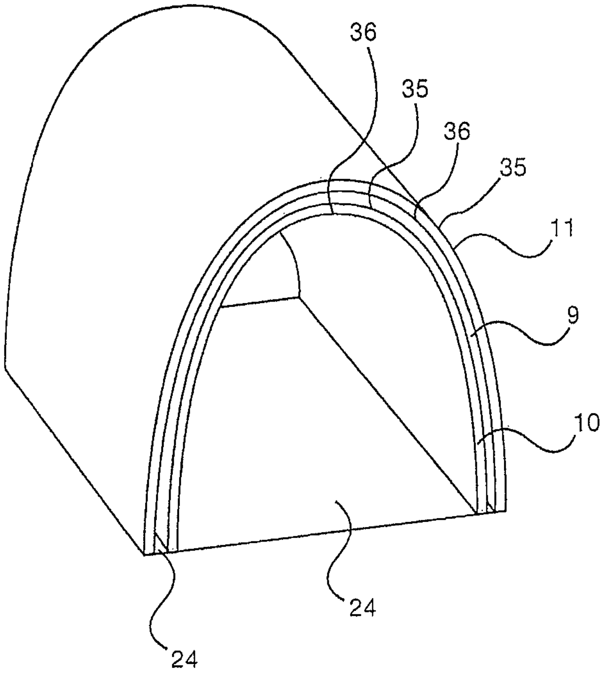

FIG. 15G is a perspective of an assembly comprising two tied, flexed panels.

Figure 15H:
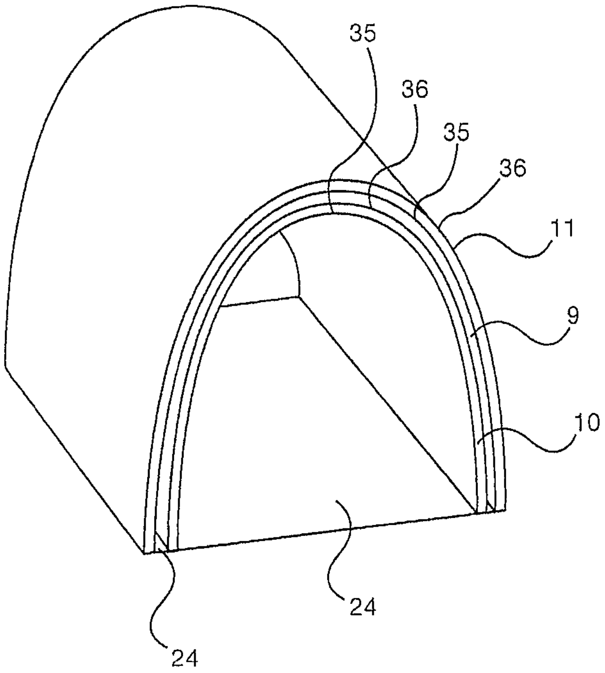

FIG. 15H is a perspective of a reverse flexed panel assembly comprising two tied, flexed panels.

Figure 16A:
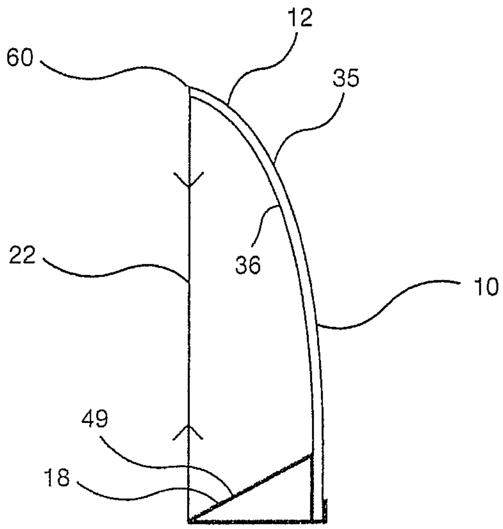

FIG. 16A is a cross-section through an assembly comprising a panel display sign, two linear ties and a base spacing element.

FIG. 16 B is a perspective of the assembly of FIG. 16A.

Figure 16B:
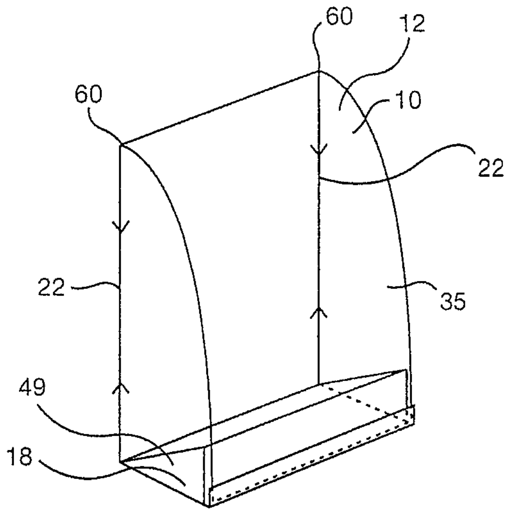
Figure 16C:
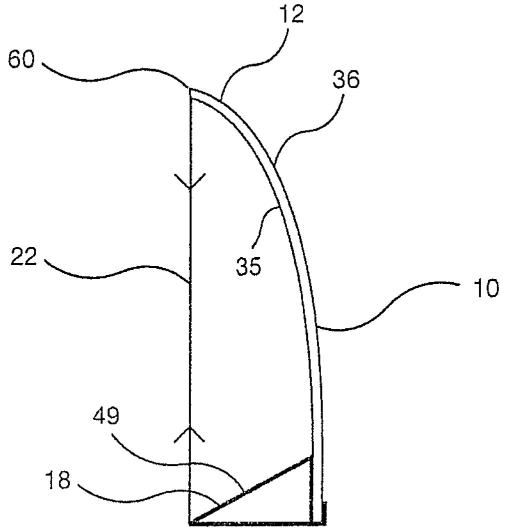

FIG. 16C is a cross-section through a reverse flexed panel assembly of FIG. 16A.

Figure 16D:
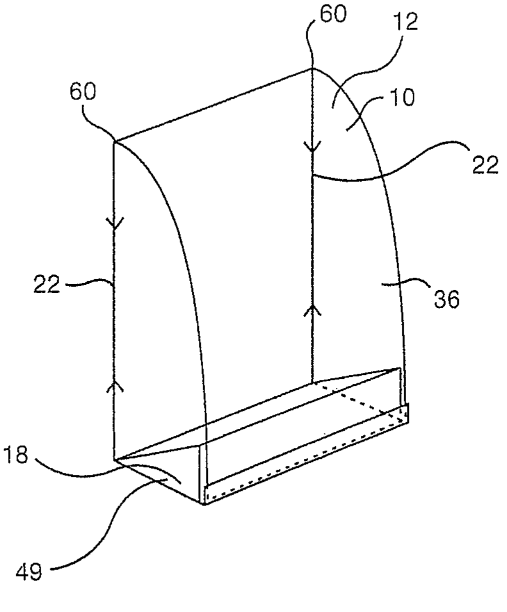

FIG. 16D is a perspective of a reverse flexed panel assembly of FIG. 16B.

Figure 16E:
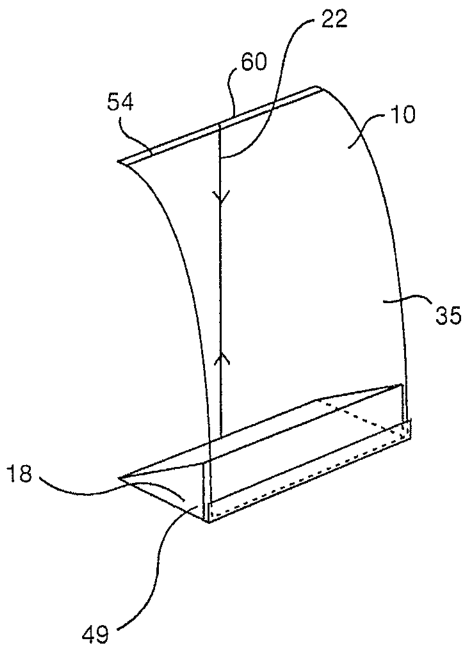

FIG. 16E is a perspective of an assembly comprising a panel display sign, a single linear tie and a base spacing element.

Figure 16F:
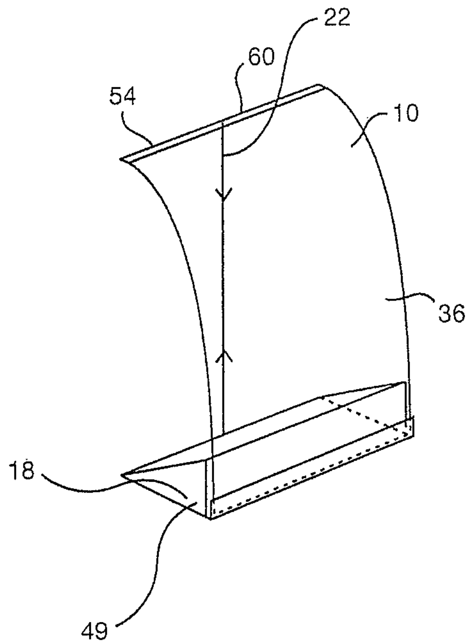

FIG. 16F is a reverse flexed panel assembly of FIG. 16E.

FIG. 16G-K are cross-sections through alternative top members to the assemblies illustrated in FIGS. 16E and F.

Figure 17A:
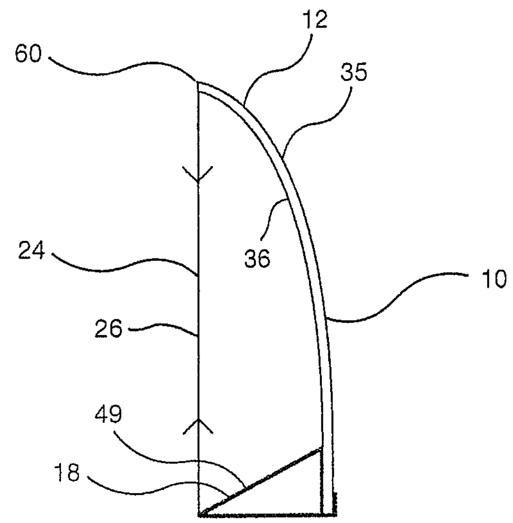

FIG. 17A is a cross-section through an assembly comprising a membrane tie display sign and a base spacing element.

Figure 17B:
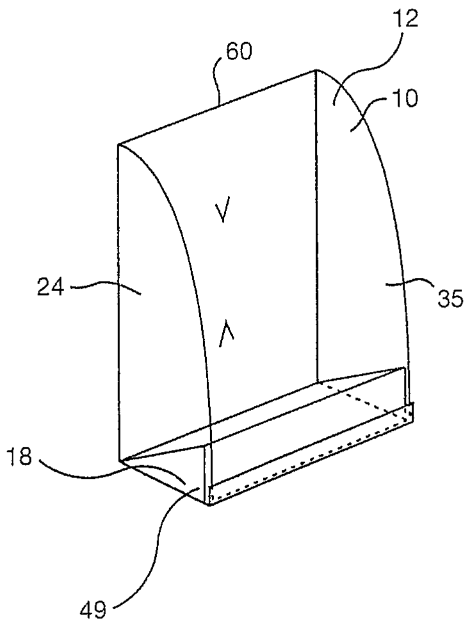

FIG. 17B is a perspective of the assembly of FIG. 17A.

Figure 17C:
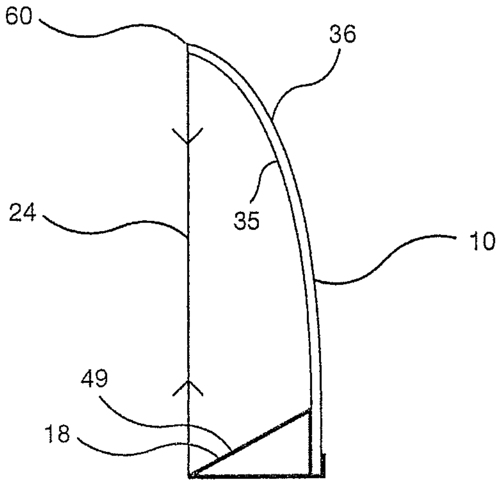

FIG. 17C is a cross-section of a reverse flexed panel assembly of FIG. 17A.

Figure 17D:
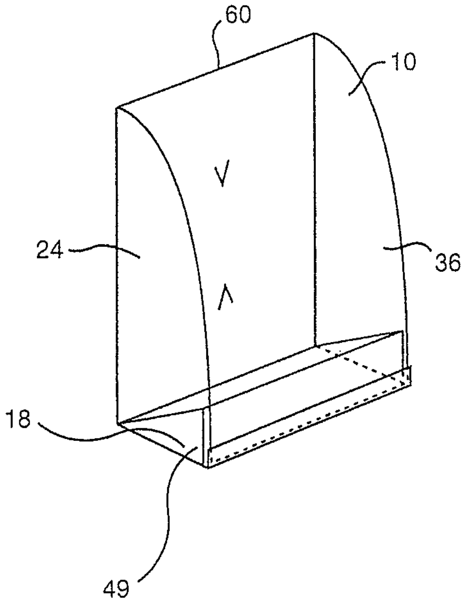

FIG. 17D is a perspective of a reverse flexed panel assembly of FIG. 17B.

Figure 17E:
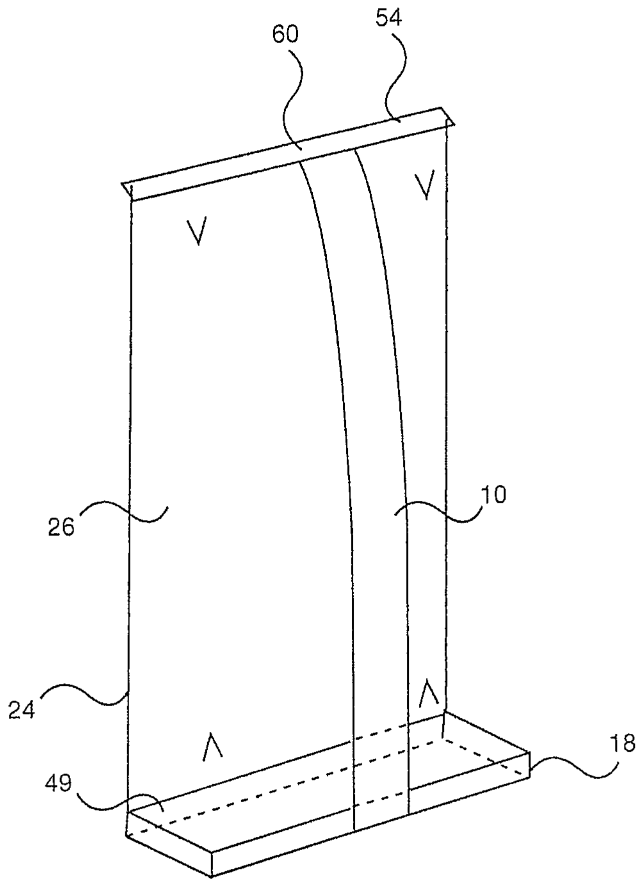

FIG. 17E is an assembly comprising a membrane tie display panel and a flexed panel of narrower width with a base spacing element.

Figure 18A:
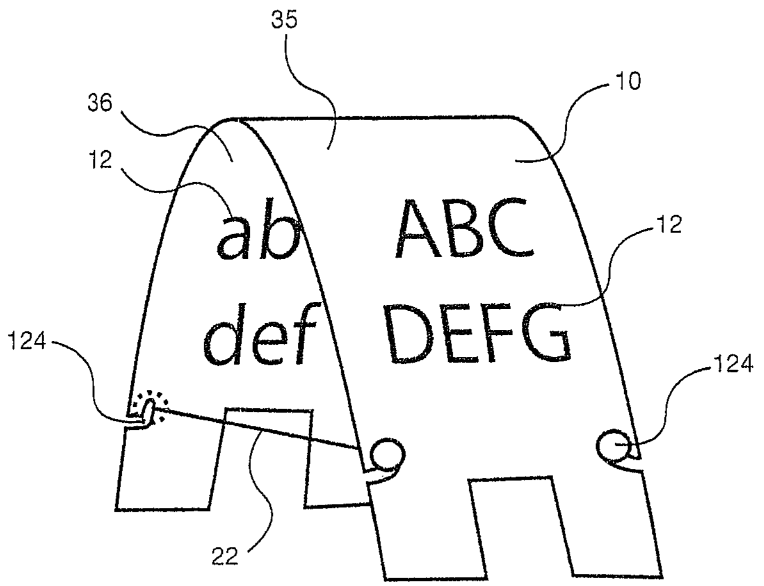

FIG. 18A is a perspective of an assembly comprising a floor-mounted sign with two linear ties with "button" point connectors.

Figure 18B:
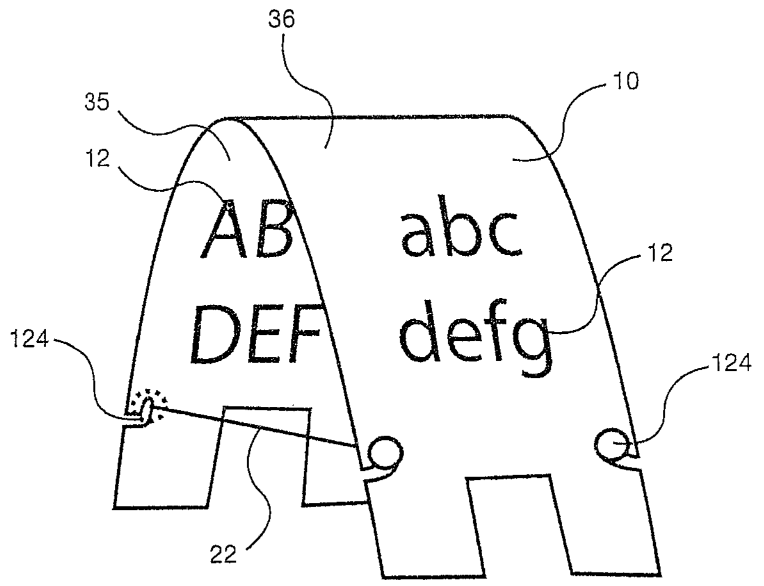

FIG. 18B is a reverse flexed panel assembly comprising a floor-mounted sign with two linear ties with "button" point connectors.

Figure 18C:
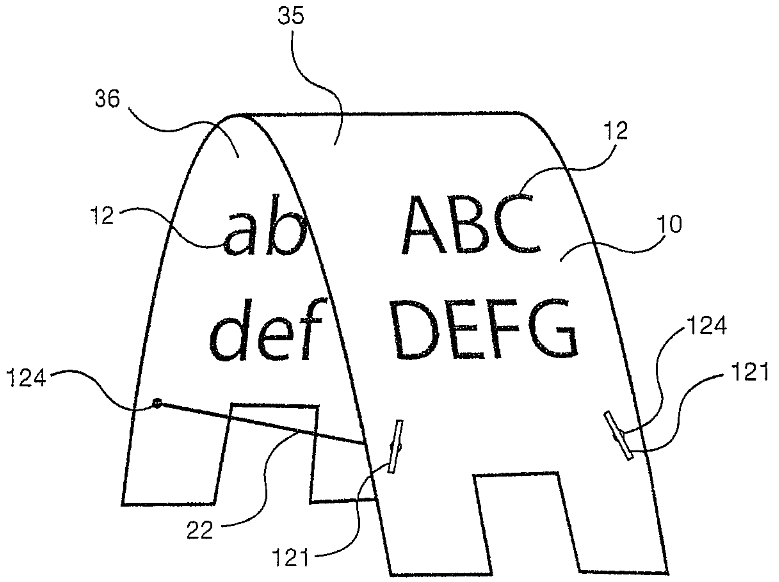

FIG. 18C is a perspective of an assembly comprising a floor-mounted sign with two linear ties with toggle point connectors.

FIGS. 18D-G are sequential cross-sections showing reversal of flexure of a floor-mounted sign with two linear ties with toggle point connectors.

Figure 18D:
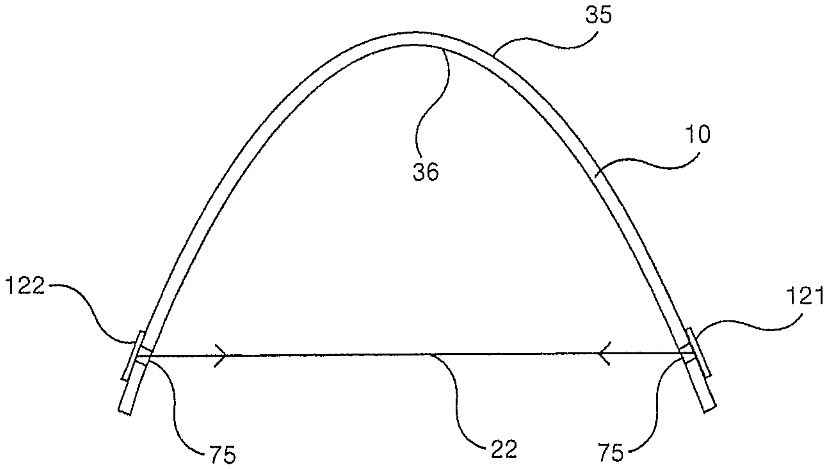
Figure 18E:
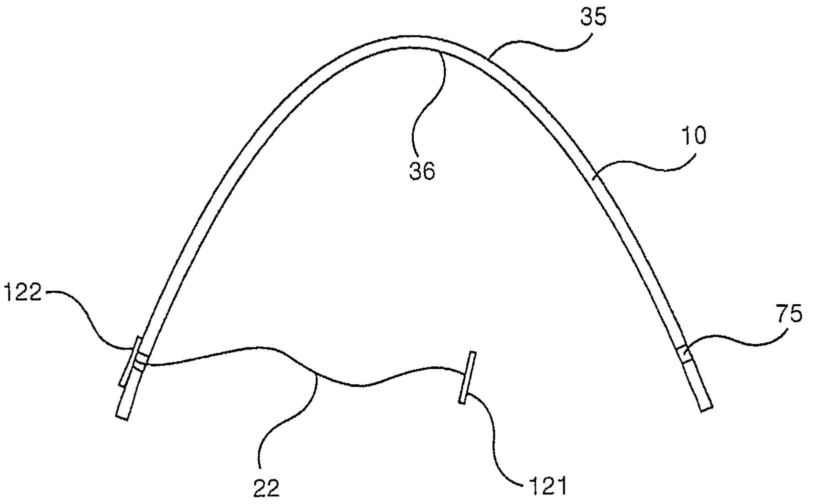
Figure 18F:
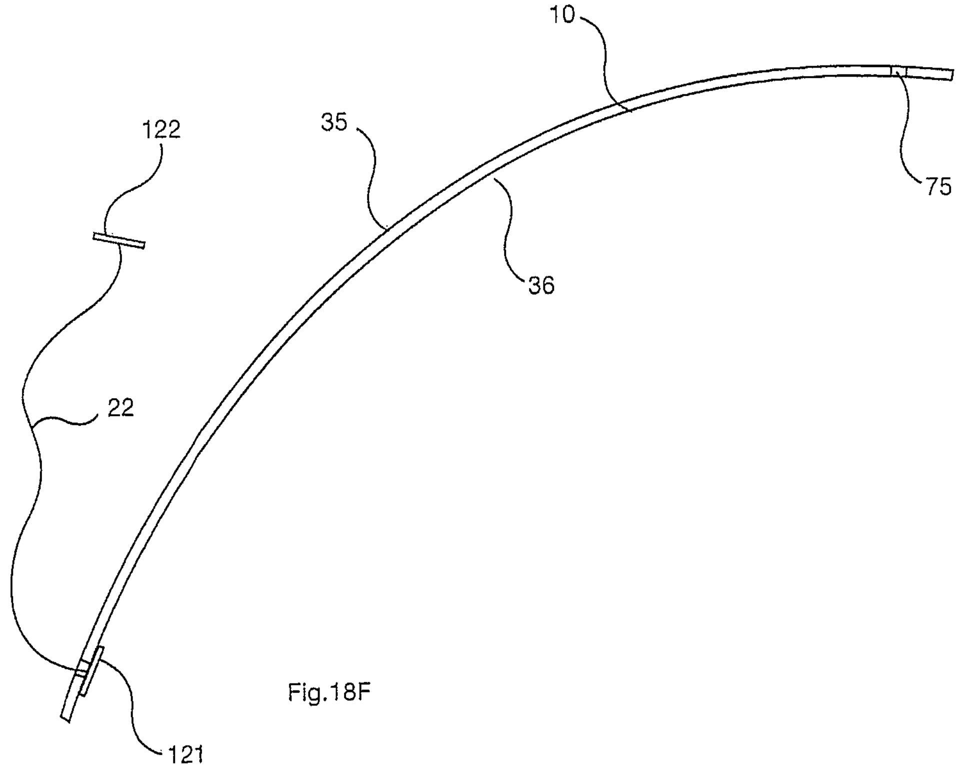
Figure 18G:
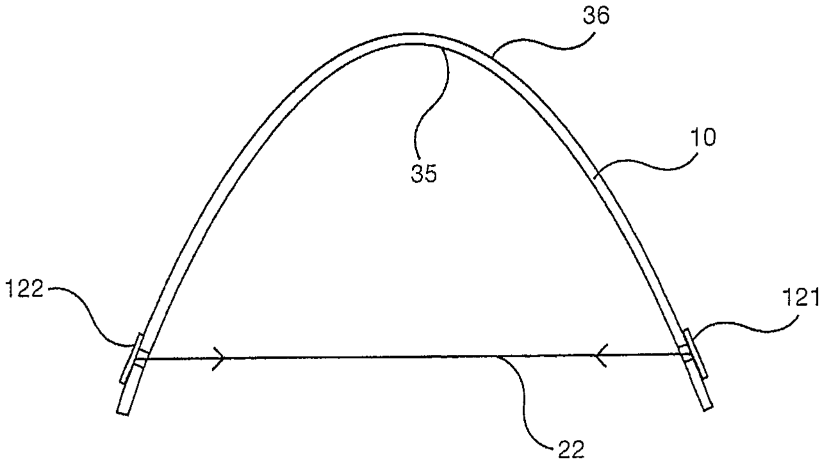
Figure 18H:
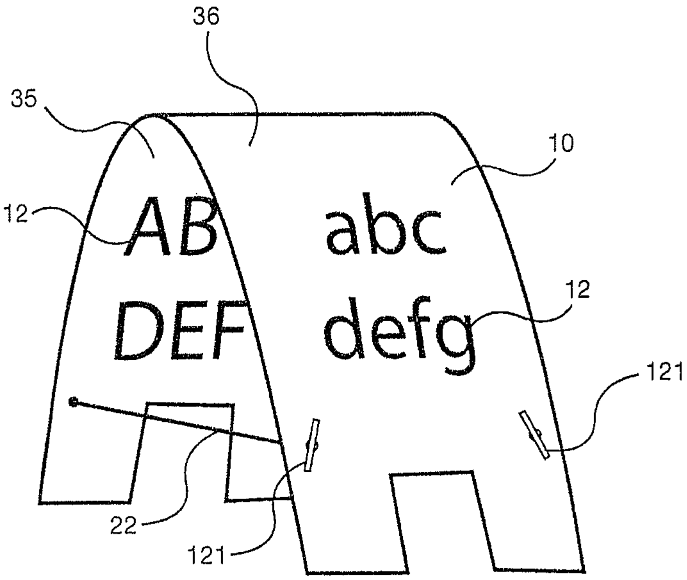

FIG. 18H is a perspective of a reverse flexed panel assembly of FIG. 18C.

Figure 18J:
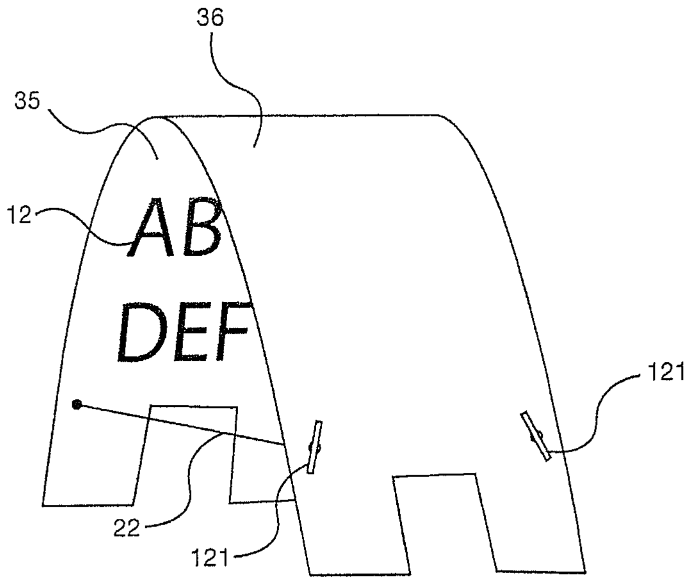

FIG. 18J is a perspective of a floor-mounted sign with an unimaged side.

Figure 18K:
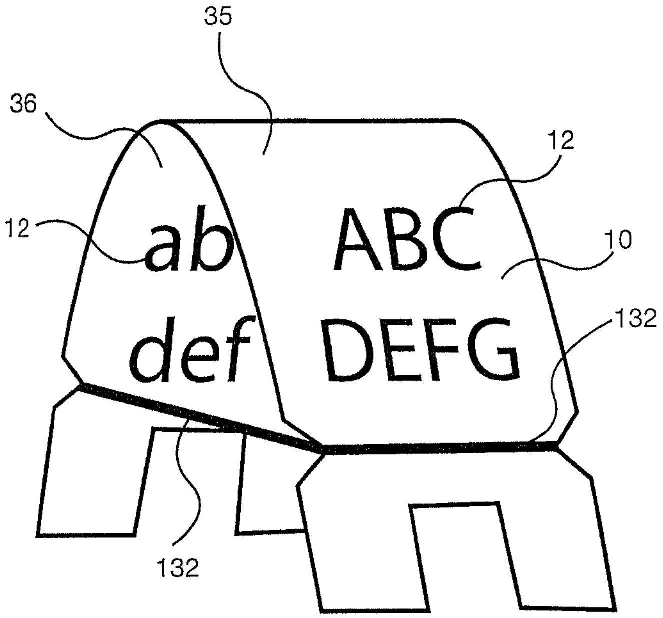
Figure 18L:
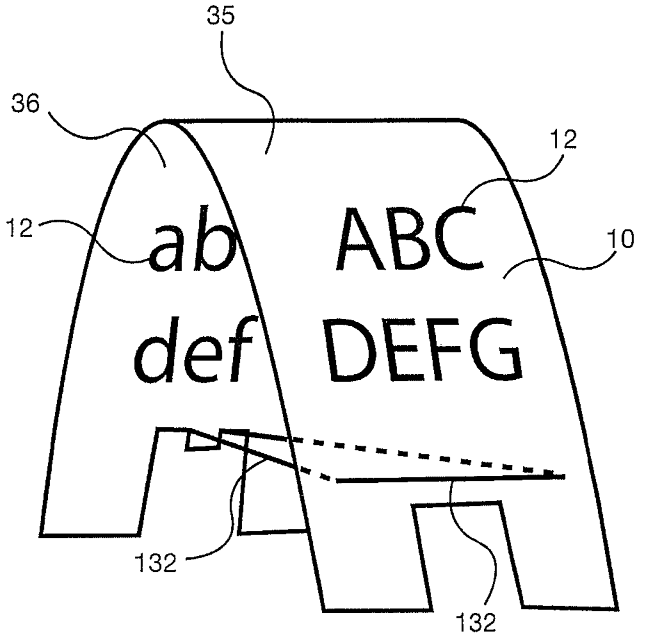
Figure 18M:
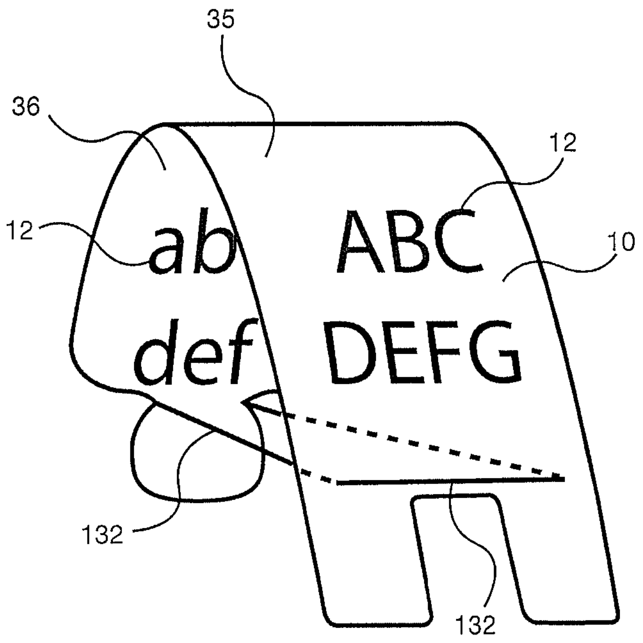

FIGS. 18K-18M are perspective views of floor-mounted signs with imaged sides.

Figure 19A:
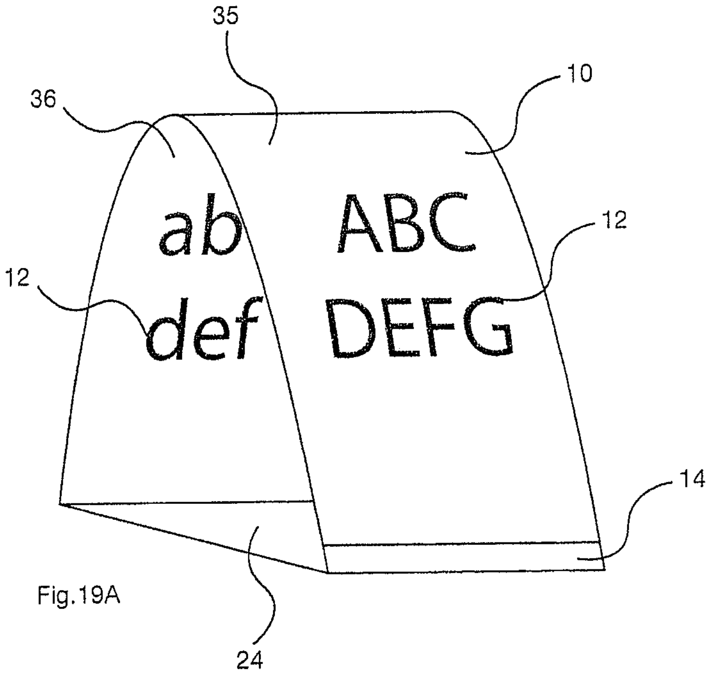

FIG. 19A is a perspective of a floor-mounted sign with a membrane tie.

Figure 19B:
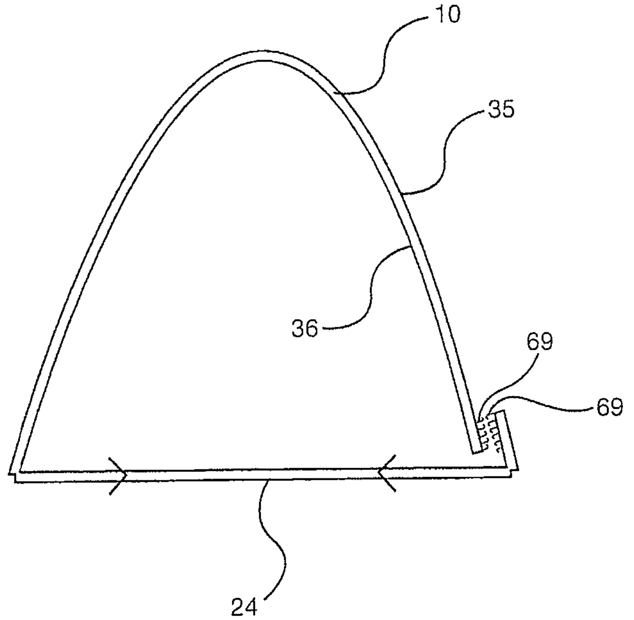

FIG. 19B is a cross-section through a floor-mounted sign with a membrane tie.

Figure 19C:
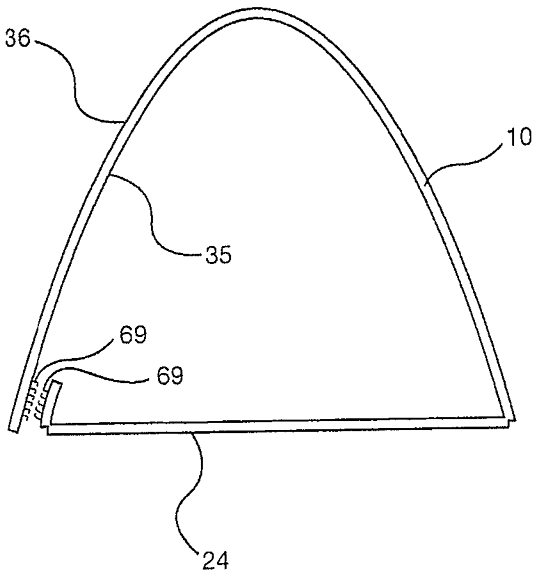

FIG. 19C is a cross-section through a reverse flexed panel assembly of FIG. 19B.

Figure 19D:
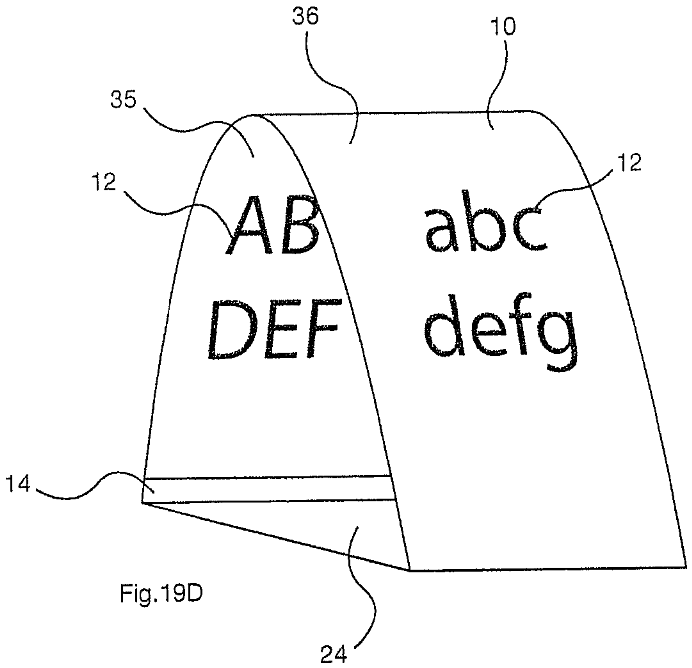

FIG. 19D is a perspective of a reverse flexed panel assembly of FIG. 19A.

Figure 19E:
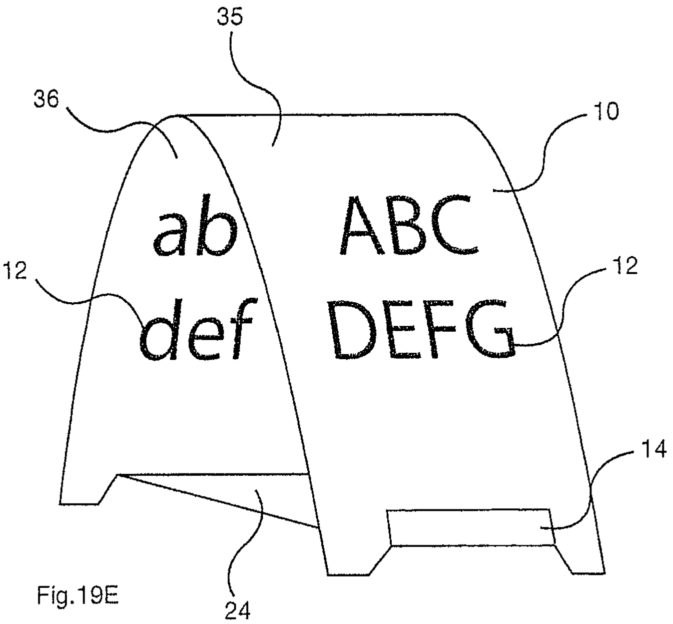

FIG. 19E is a perspective of a floor-mounted sign with a raised membrane tie.

Figure 19F:
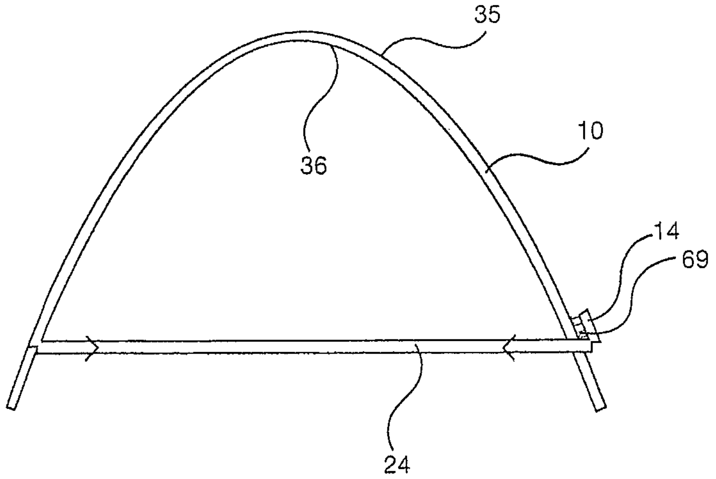

FIG. 19F is a cross-section through a floor-mounted sign with a raised membrane tie.

Figure 19G:
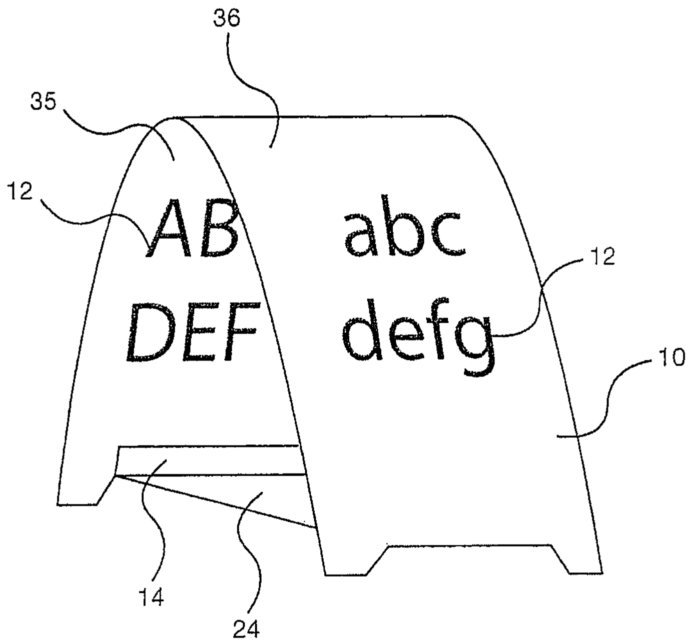

FIG. 19G is a perspective of a reverse flexed panel assembly forming a floor-mounted sign with a raised membrane tie.

Figure 19H:
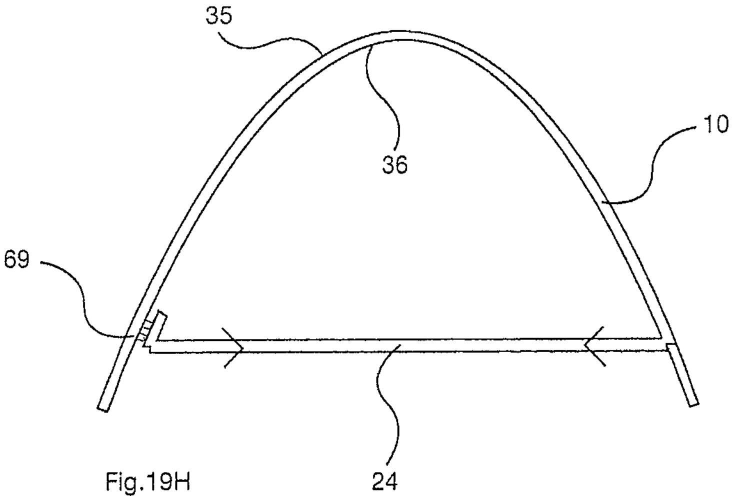

FIG. 19H is a cross-section through a reverse flexed panel assembly forming a floor-mounted sign with a raised membrane tie.

Figure 19J:
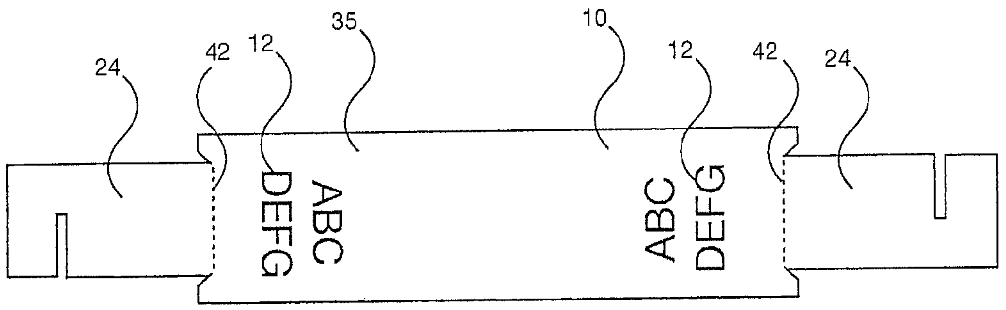

FIG. 19J is a plan of a panel for a floor-mounted sign with an integral interlocking membrane tie.

Figure 19K:
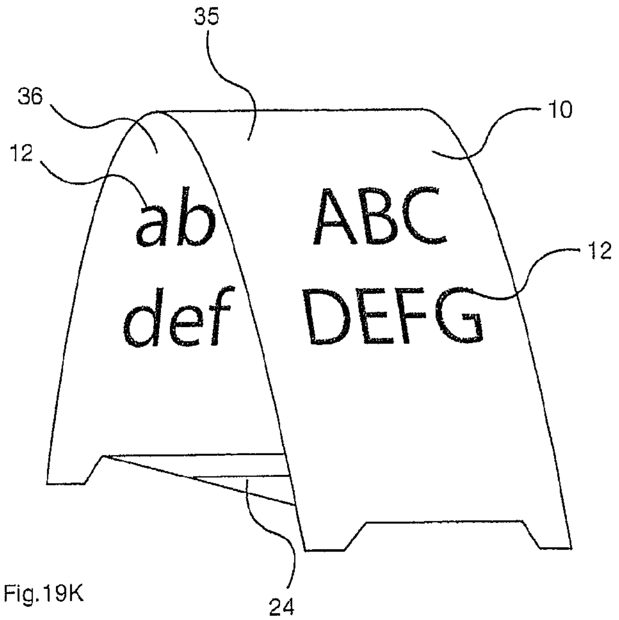

FIG. 19K is a perspective of the assembly of FIG. 19J.

Figure 19L:
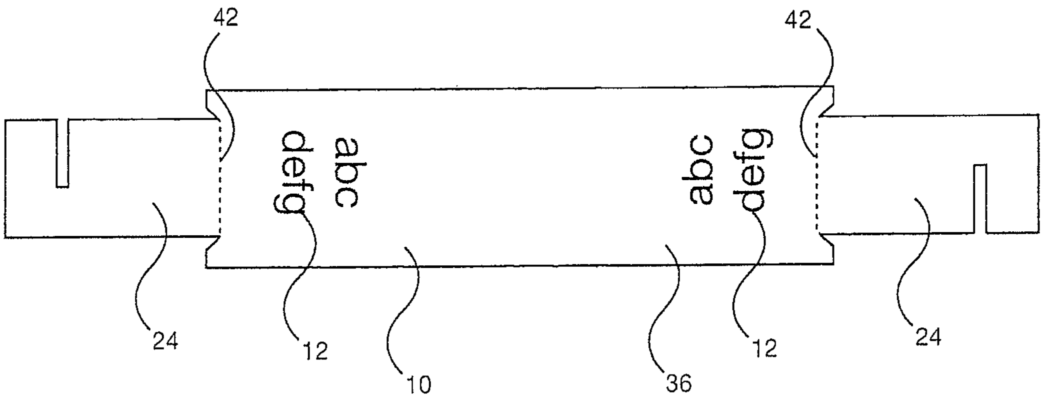

FIG. 19L is a plan of the other side of the panel of FIG. 19J.

Figure 19M:
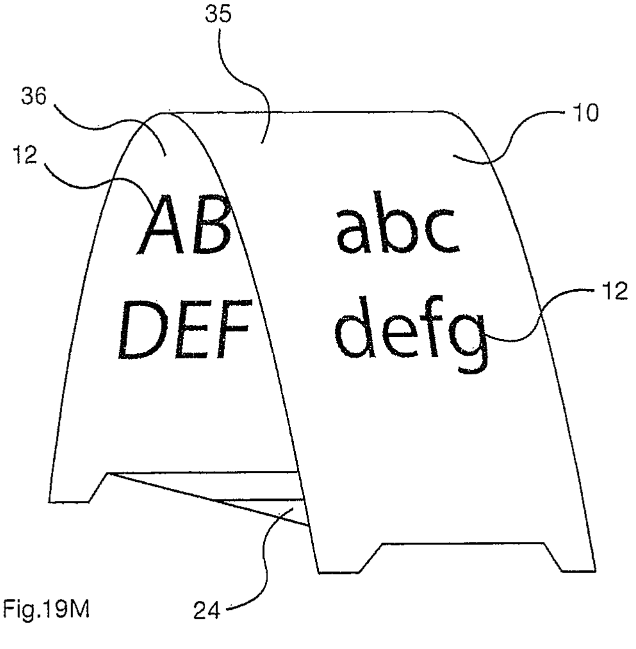

FIG. 19M is a perspective of a reverse flexed panel assembly of FIG. 19K.

Figure 19N:
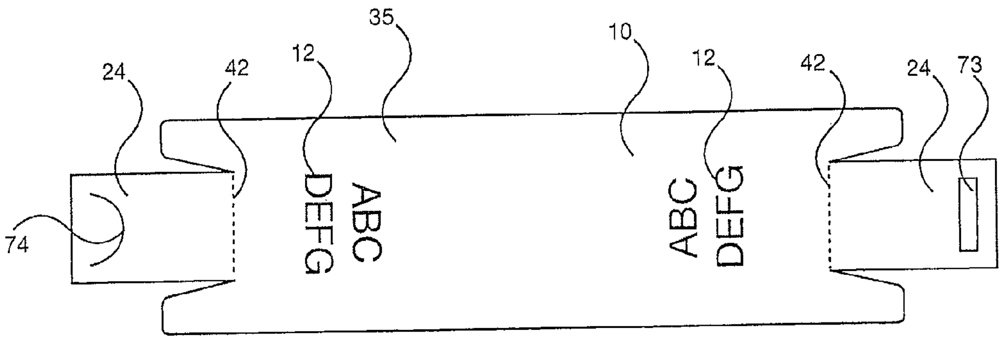

FIG. 19N is a plan of a panel for a floor-mounted sign with an integral interlocking membrane tie.

Figure 19P:
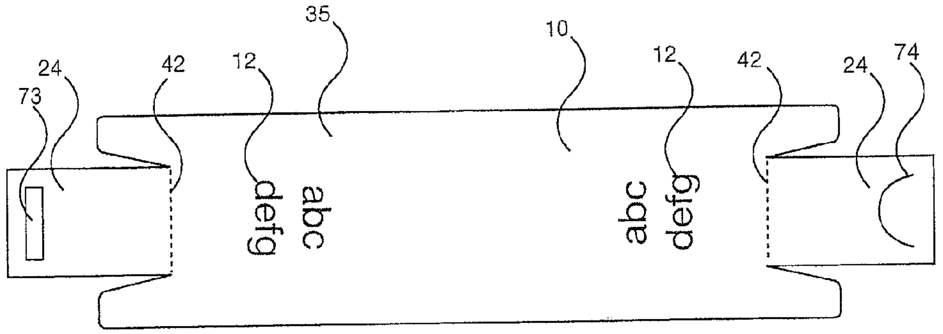

FIG. 19P is a plan of the other side of the panel of FIG. 19N.

Figure 19Q:
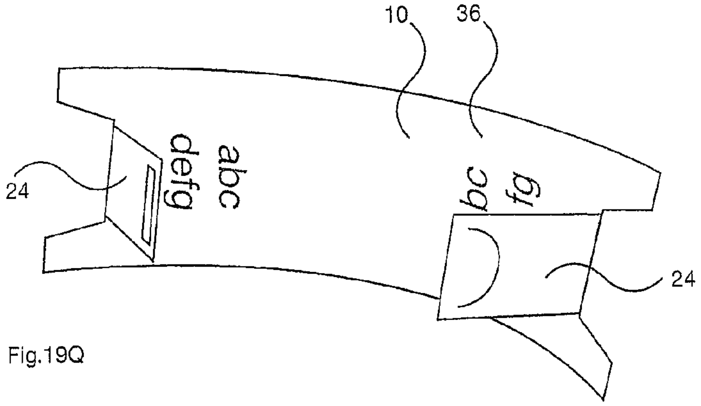

FIG. 19Q is a perspective of the panel during flexure and folding of the membrane tie elements.

Figure 19R:
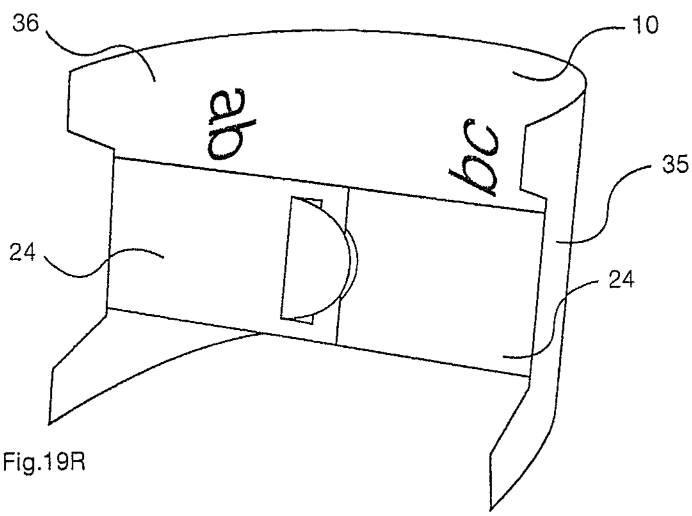

FIG. 19R is a perspective of the underside of the assembly of FIGS. 19N-Q.

Figure 19S:
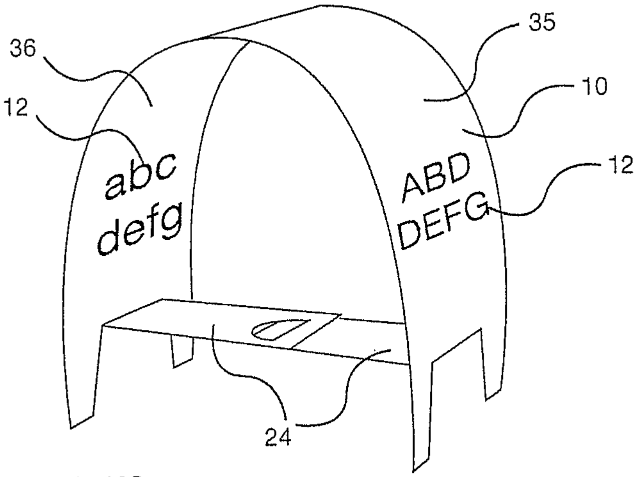

FIG. 19S is a perspective of the assembly of FIG. 19R in use.

Figure 19T:
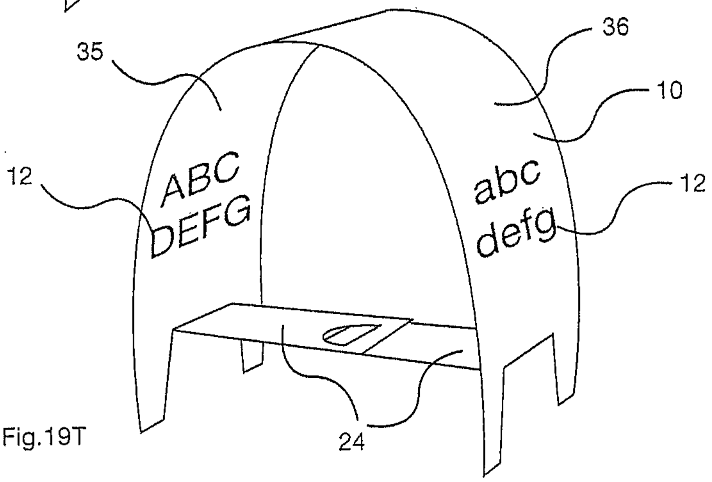

FIG. 19T is a perspective of a reverse flexed panel assembly of FIG. 19S.

Figure 19U:
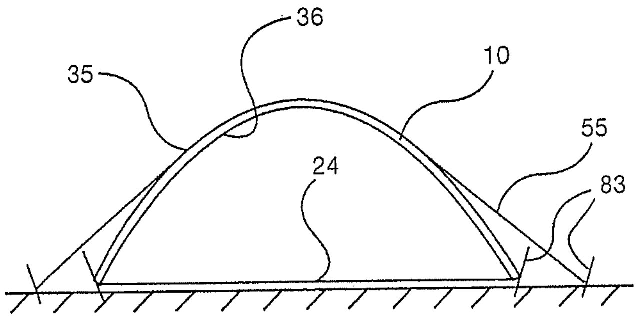

FIG. 19U is a cross-section through a tent-like shelter.

Figure 19V:
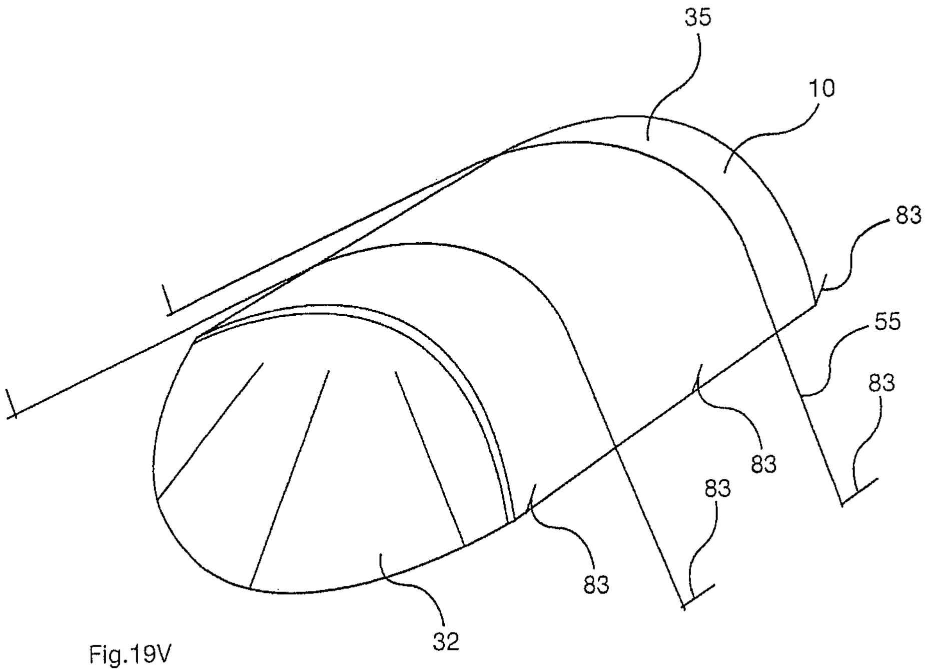

FIG. 19V is a perspective of a tent-like shelter.

Figure 20A:
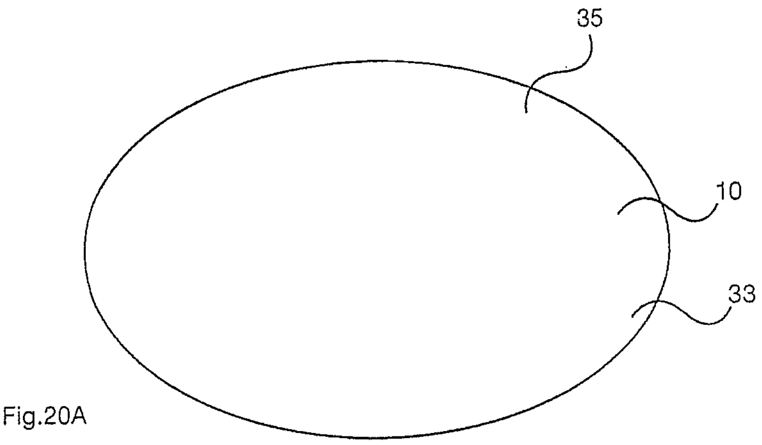

FIG. 20A is a plan of a single oval-shaped panel.

Figure 20B:
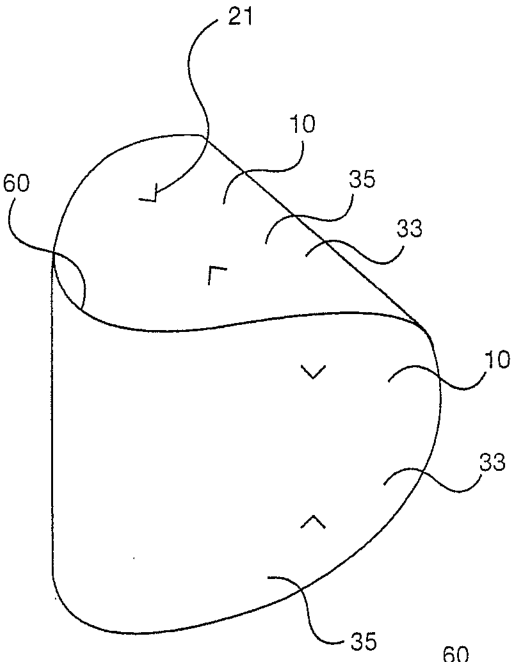

FIG. 20B is a perspective of two flexed, oval-shaped panels forming an assembly.

Figure 20C:
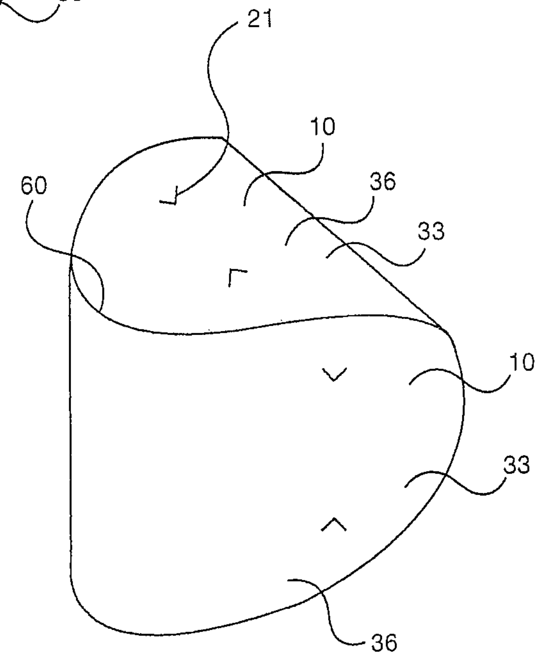

FIG. 20C is a perspective of a reverse flexed panel assembly comprising two flexed, oval-shaped panels forming an assembly.

Figure 20D:
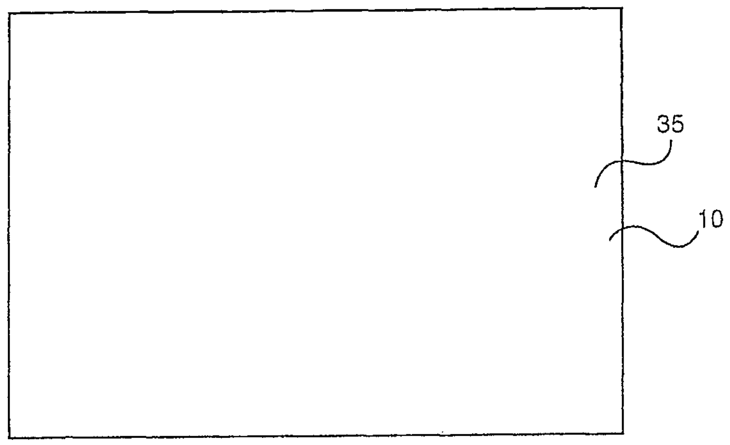

FIG. 20D is a plan of a panel.

Figure 20E:
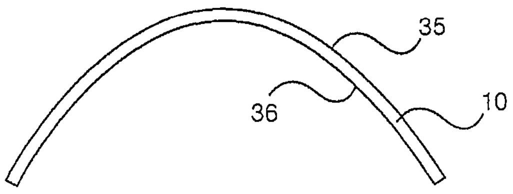

FIG. 20E is an edge elevation of a flexed panel.

Figure 20F:
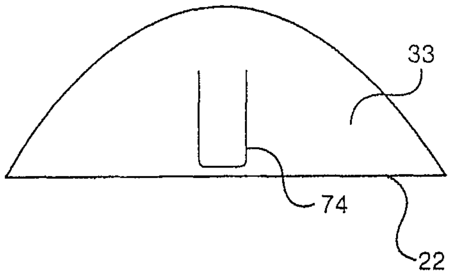

FIG. 20F is an elevation of a web tie and linear tie combined.

Figure 20G:
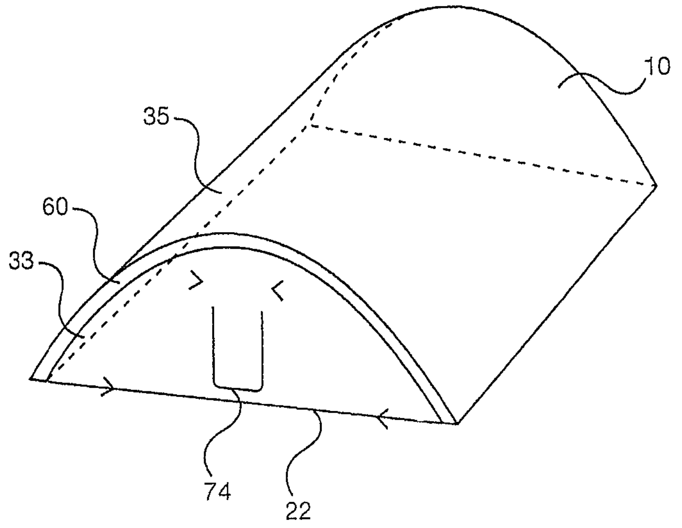

FIG. 20G is a perspective of an enclosure comprising two combined web and linear ties.

Figure 20H:
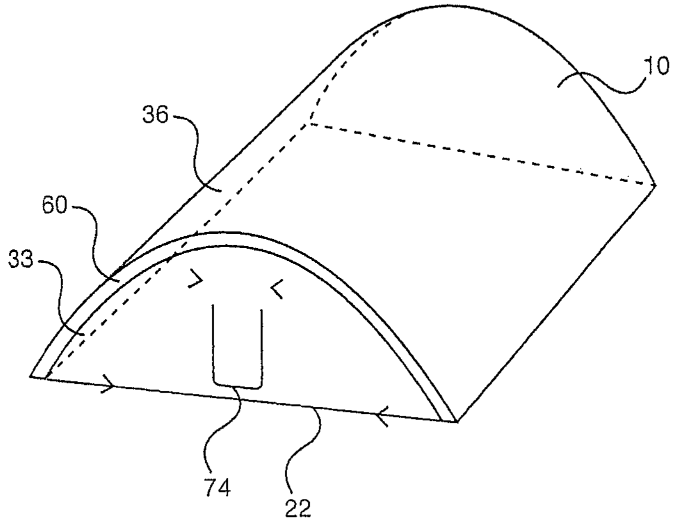
Figure 21A:
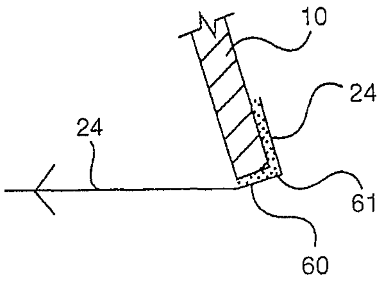
Figure 21B:
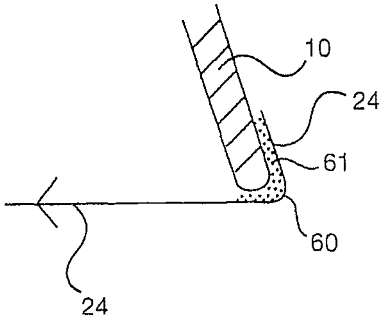
Figure 21C:
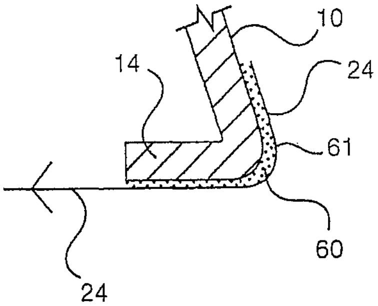
Figure 21D:
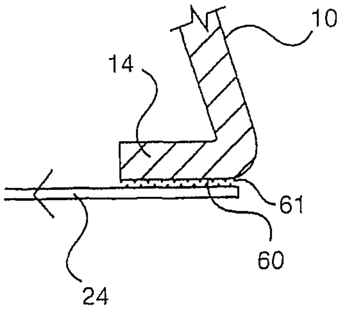

FIG. 20H is a perspective of a reverse flexed panel assembly of FIG. 20G.

FIGS. 21A-D are cross-sections through linear connectors.

Figure 22A:
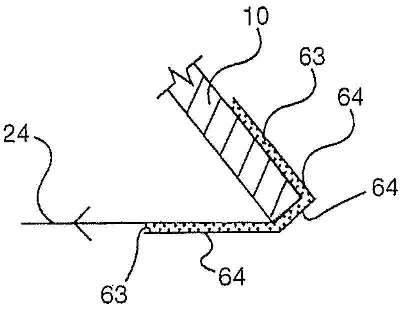
Figure 22B:
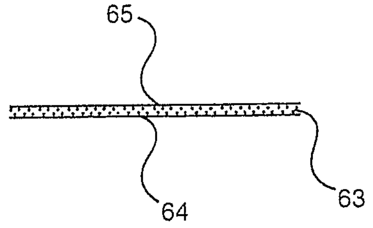

FIGS. 22A-Y are cross-sections through linear connectors.

Figure 23A:
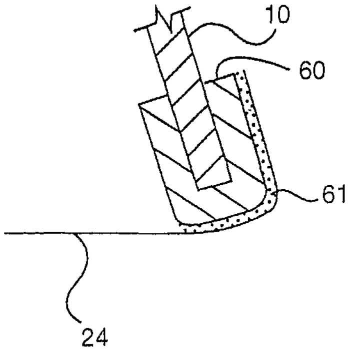
Figure 23B:
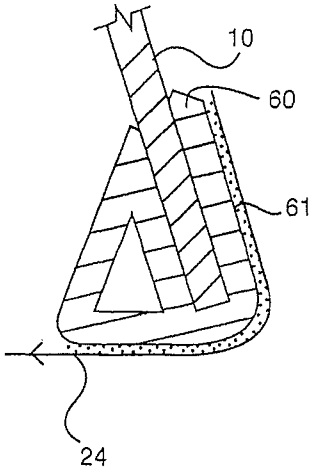
Figure 23C:
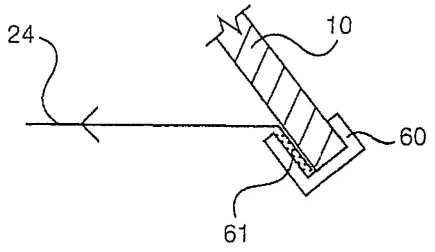
Figure 23H:
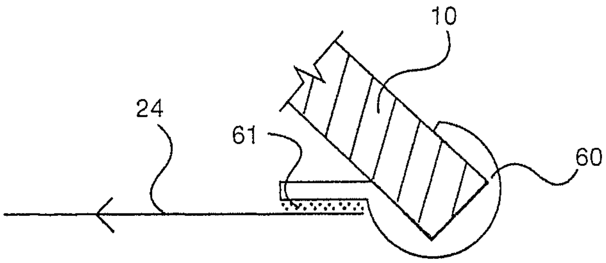
Figure 23J:
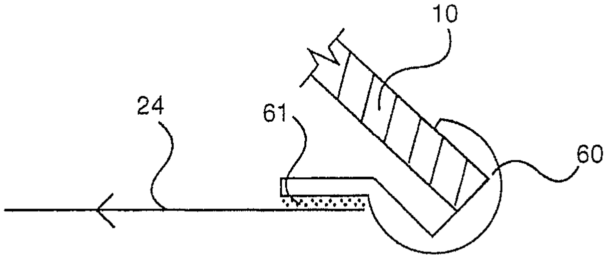
Figure 23K:
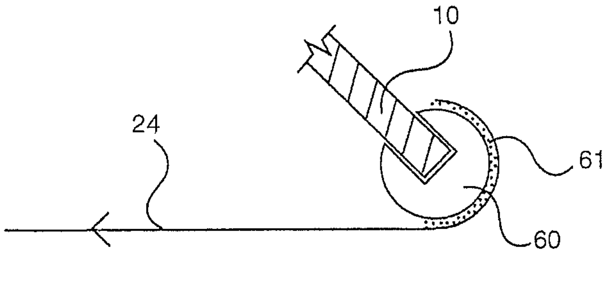
Figure 23L:
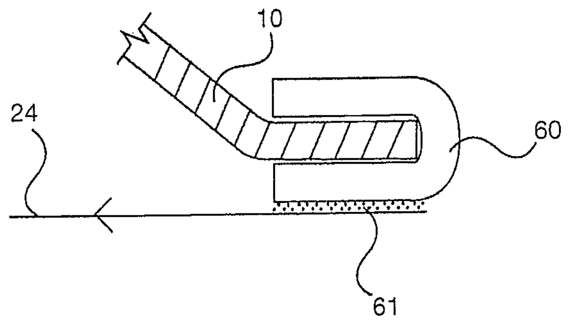
Figure 23M:
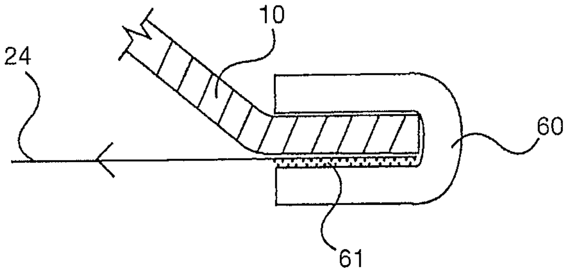
Figure 23N:
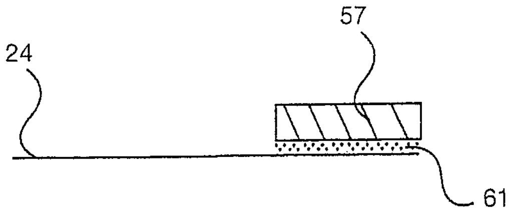
Figure 23P:
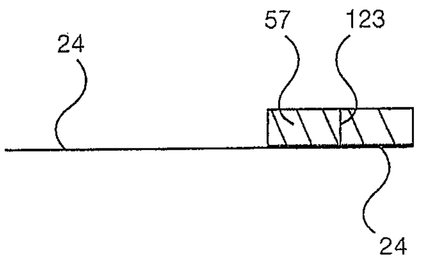
Figure 23Q:
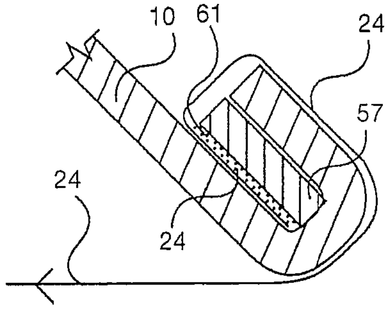
Figure 23R:
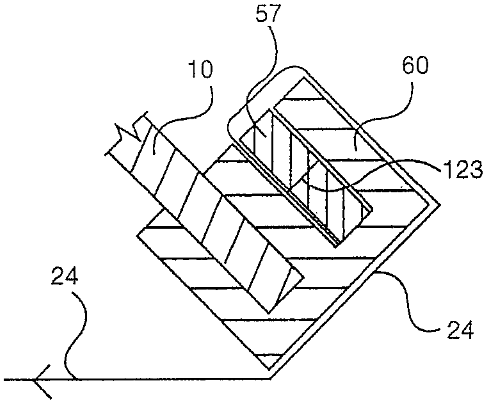
Figure 23S:
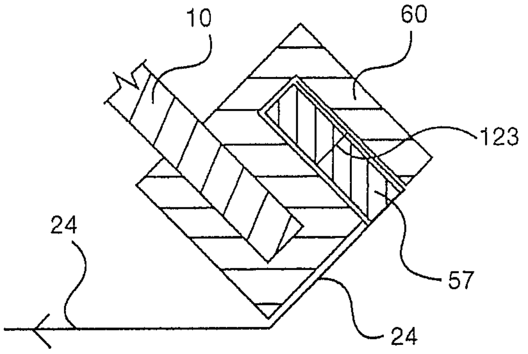
Figure 23T:
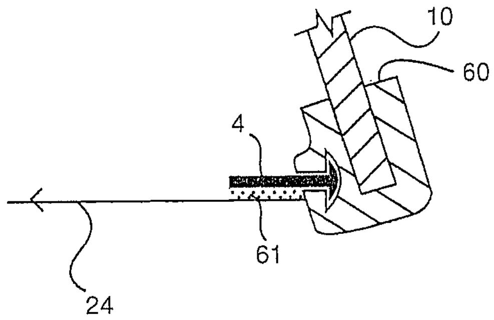
Figure 23U:
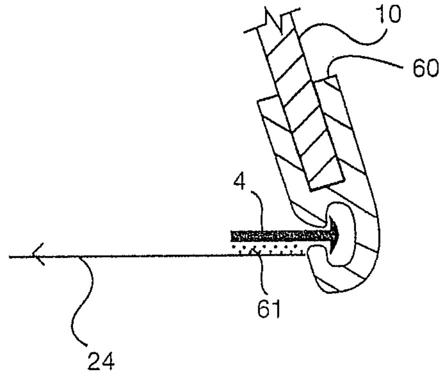
Figure 23V:
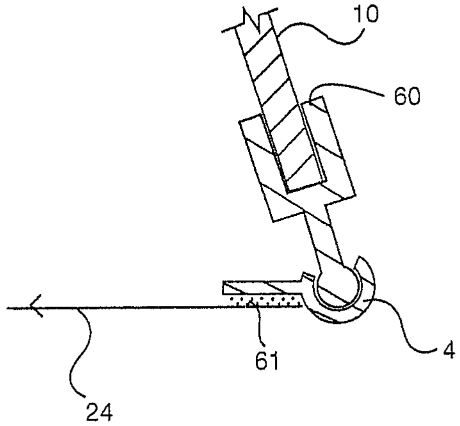
Figure 23W:
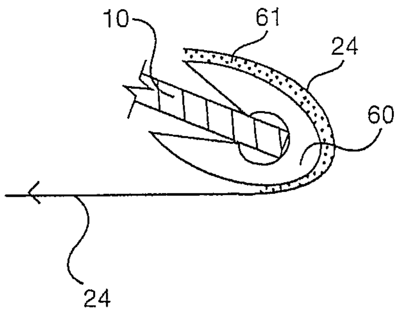
Figure 23X:
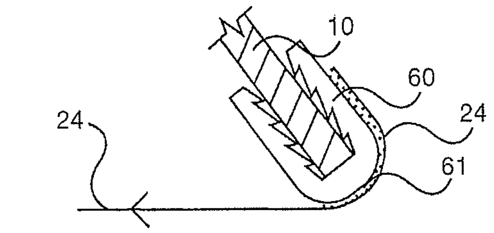
Figure 23Y:
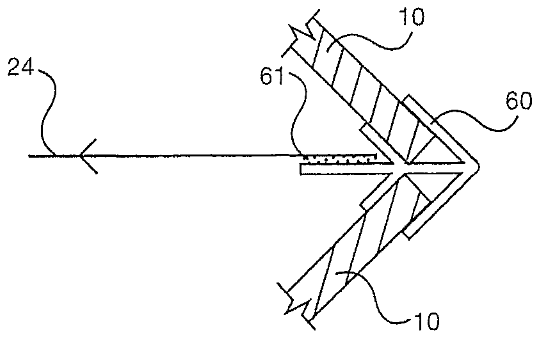
Figure 23Z:
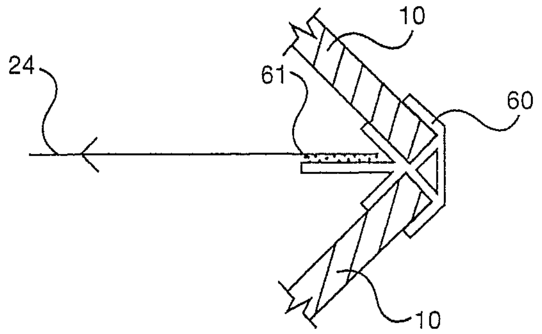

FIGS. 23A-Z are cross-sections through linear connectors.

Figure 24A:
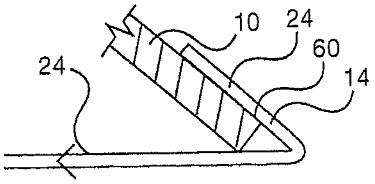
Figure 24B:
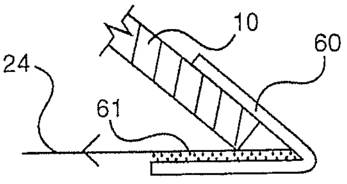
Figure 24C:
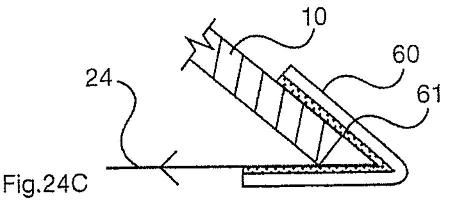
Figure 24D:
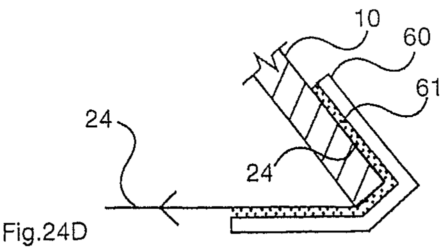
Figure 24E:
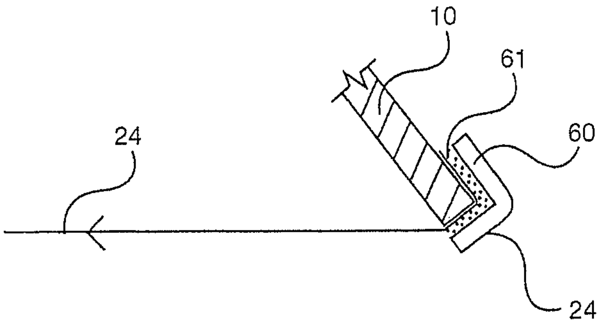
Figure 24F:
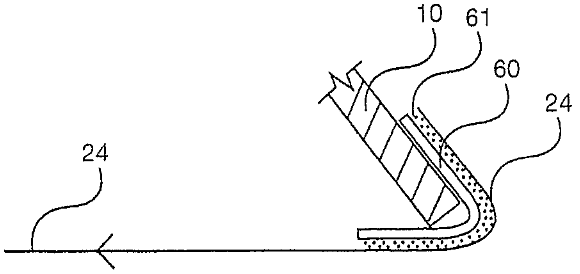
Figure 24G:
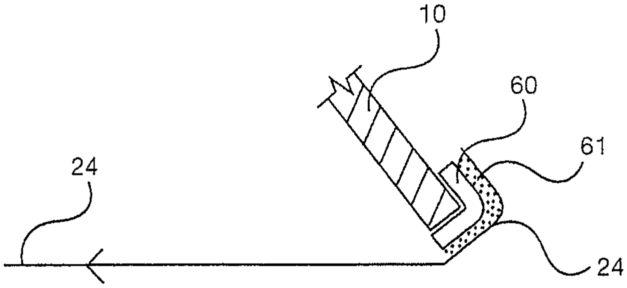
Figure 24H:
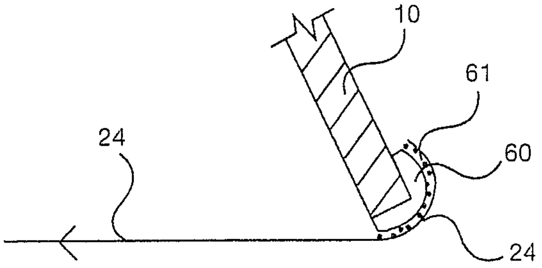
Figure 24J:
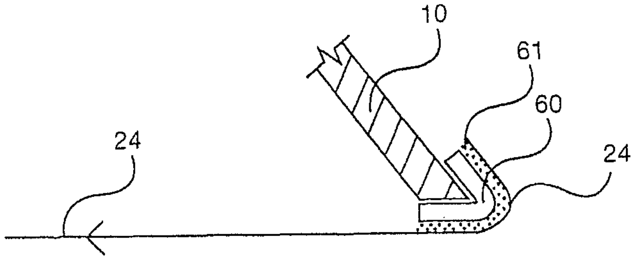
Figure 24K:
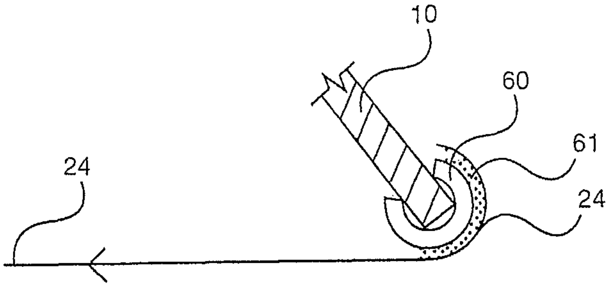
Figure 24L:
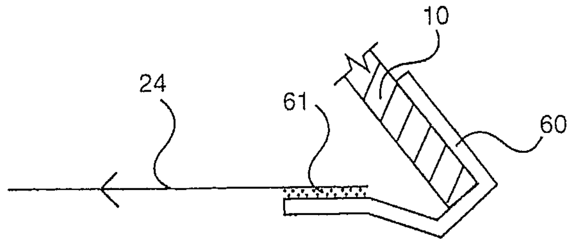
Figure 24M:
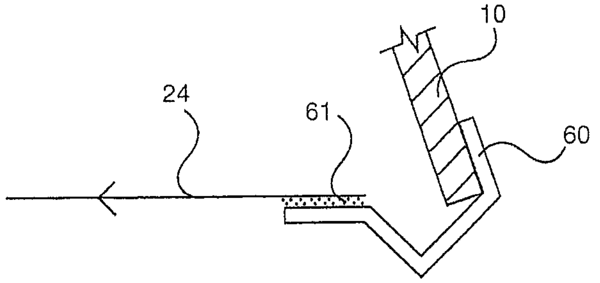
Figure 24N:
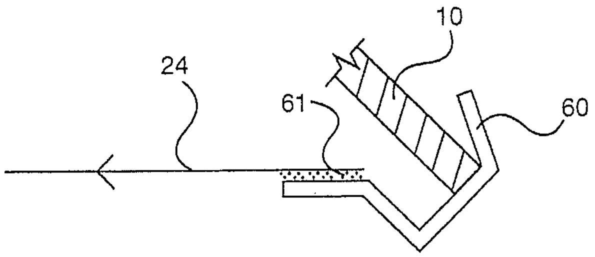
Figure 24P:
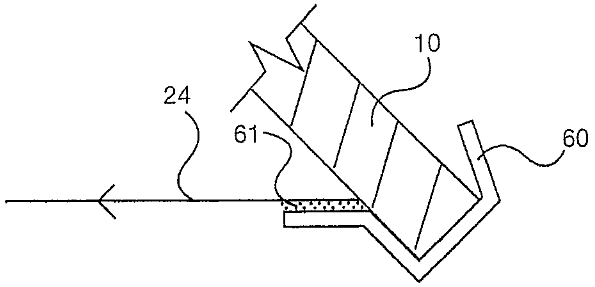
Figure 24Q:
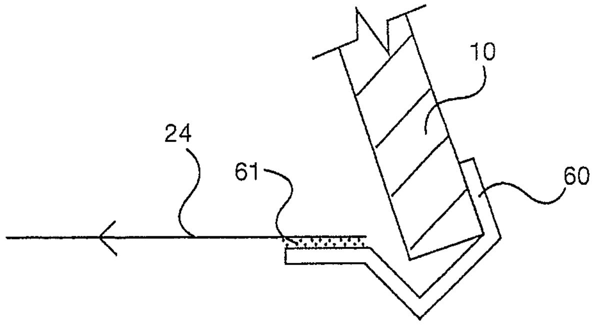
Figure 24R:
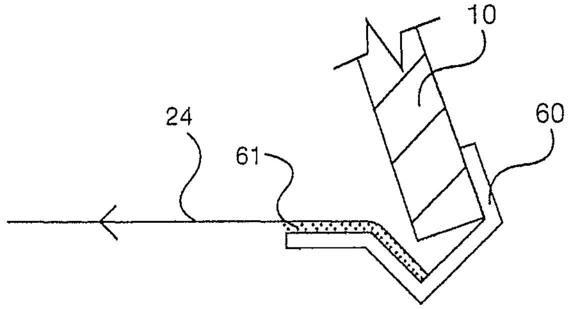

FIGS. 24A-R are cross-sections through linear connectors.

Figure 24S:
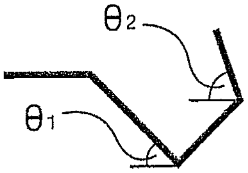

FIG. 24S is a diagrammatic cross-section of the inside surface of a linear connector.

Figure 24T:
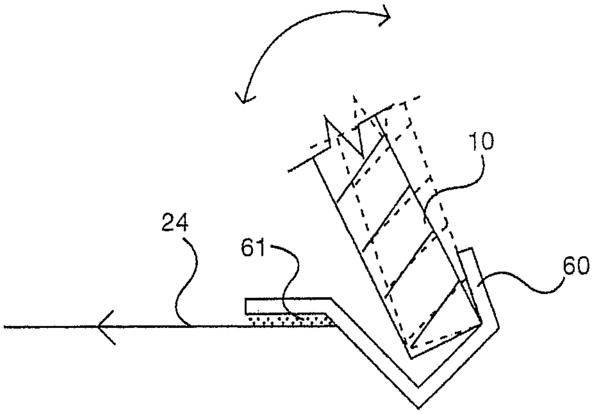

FIGS. 24T-EE are cross sections through linear connectors.

FIGS. 25A-H are cross-sections through linear connectors.

FIG. 25J is a perspective of a helical linear connector.

FIGS. 25K-N are cross-sections through linear connectors.

Figure 26A:
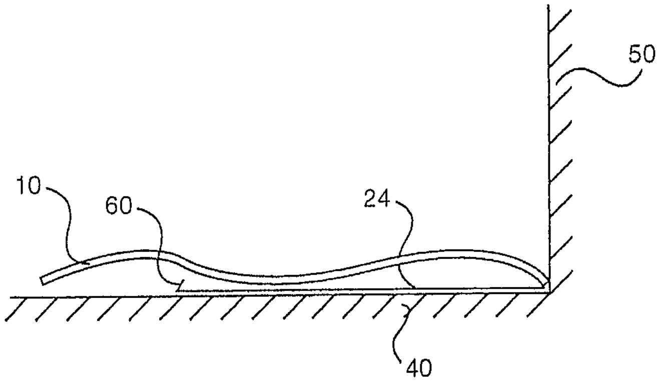
Figure 26B:
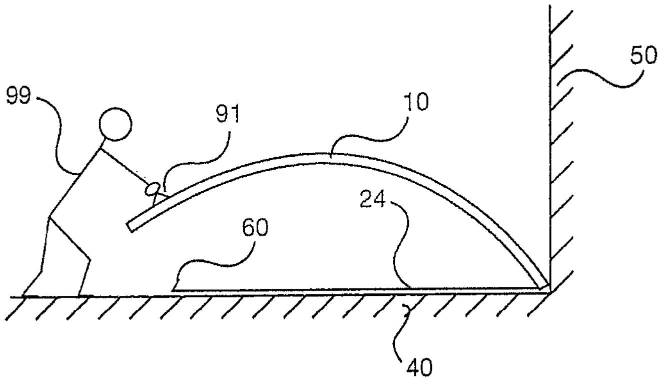
Figure 26C:
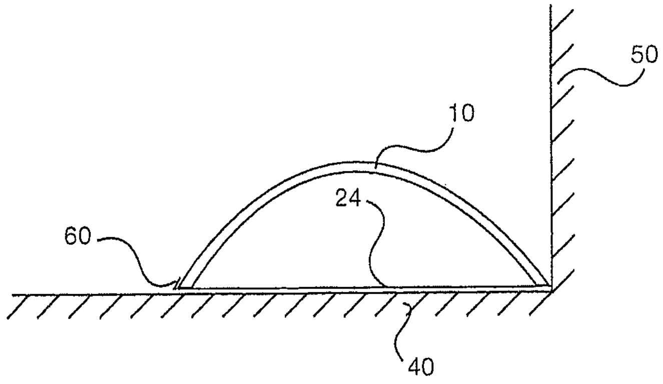

FIGS. 26A-C are cross-sections showing steps in the assembly of a tied, flexed panel structure.

Figure 26D:
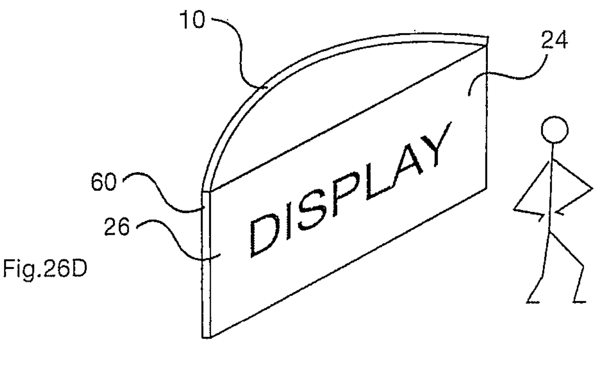

FIG. 26D is a perspective of a tied, flexed panel structure.

FIGS. 26 E and F are cross-sections through steps in the assembly of a tied, flexed panel structure.

FIGS. 26G-K are cross-sections through steps in the assembly of a tied, flexed pane structure.

Figure 26E:
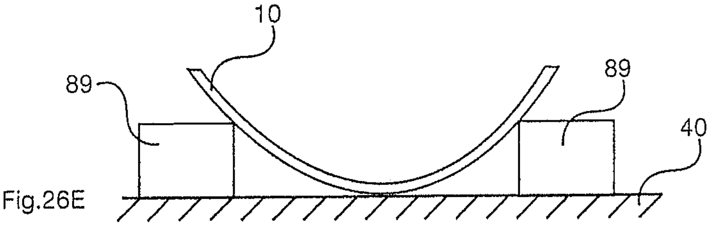
Figure 26F:
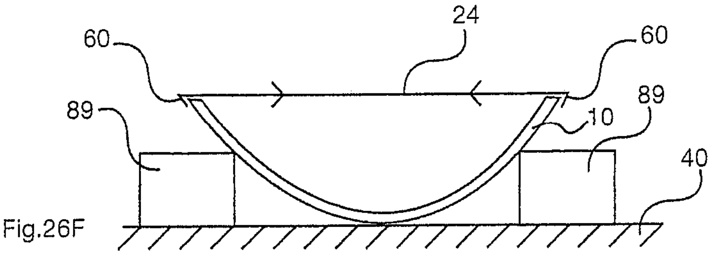
Figure 26L:
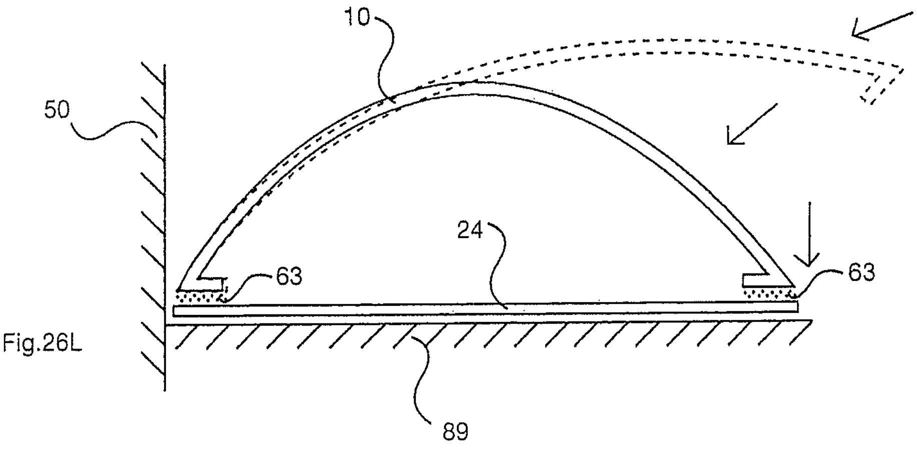

FIG. 26L is a cross-section illustrating the assembly of a tied, flexed panel structure.

Figure 26M:
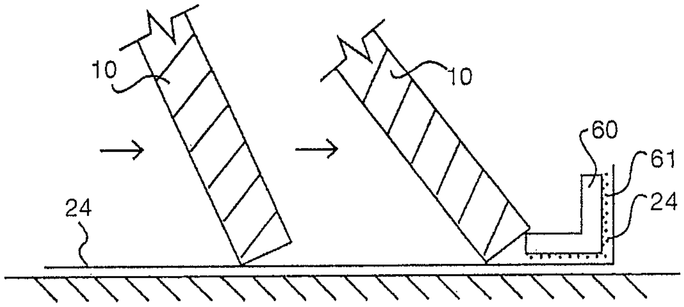

FIGS. 26M and N are cross-sections through steps in the assembly of a tied, flexed panel structure.

Figure 26N:
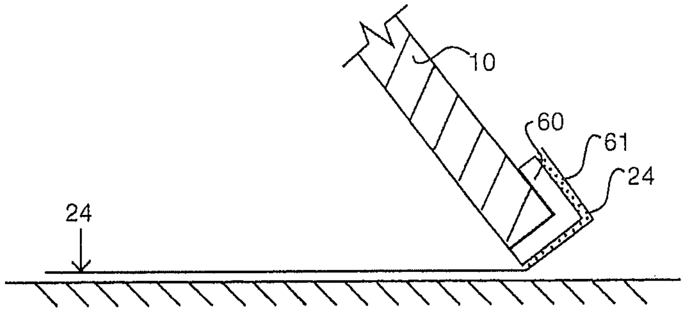
Figure 26P:
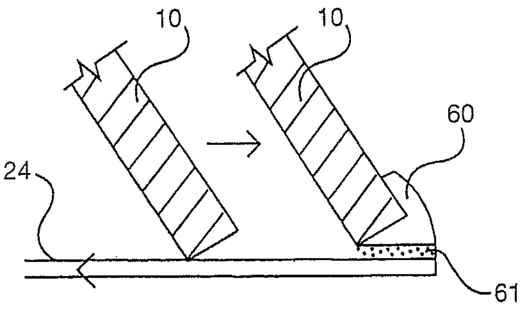

FIGS. 26P and Q are cross-sections through steps in the assembly of a tied, flexed panel structure.

Figure 27A:
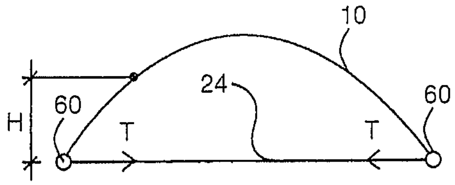

FIG. 27A is a diagrammatic cross-sectional representation of a tied, flexed panel structure.

Figure 27B:
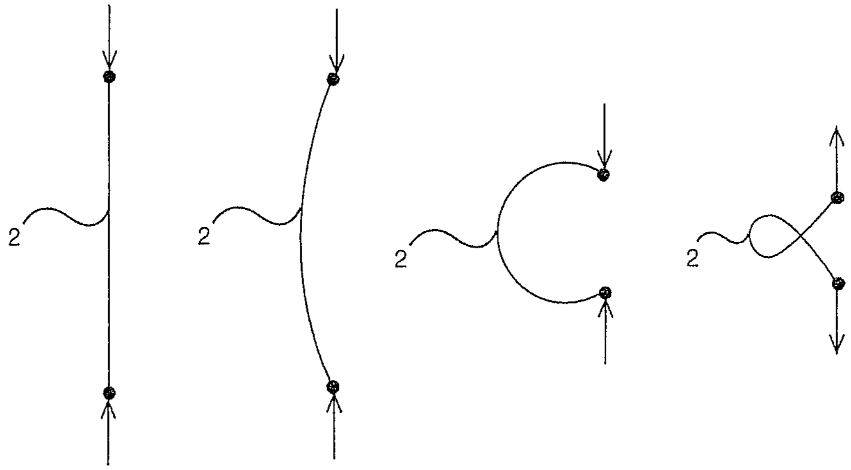

FIG. 27B comprises four stage elevations of a linear member subject to opposing end forces.

Figure 27C:
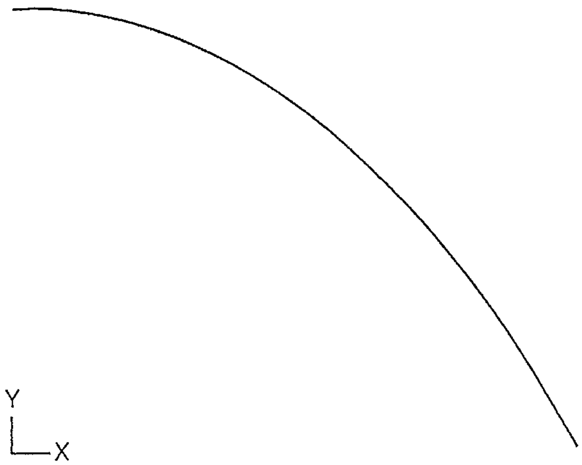

FIG. 27C is a diagrammatic cross-section through a calculated curve of half of a flexed panel.

Figure 27D:
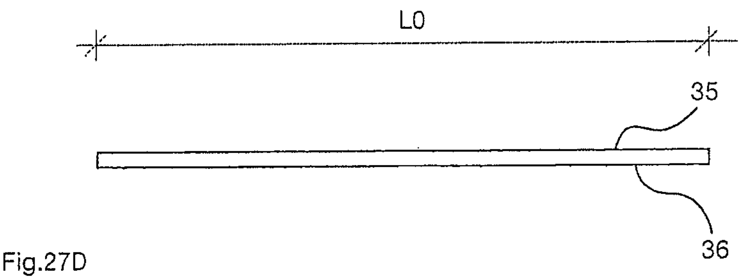

FIG. 27D is an edge elevation of a panel.

Figure 27E:
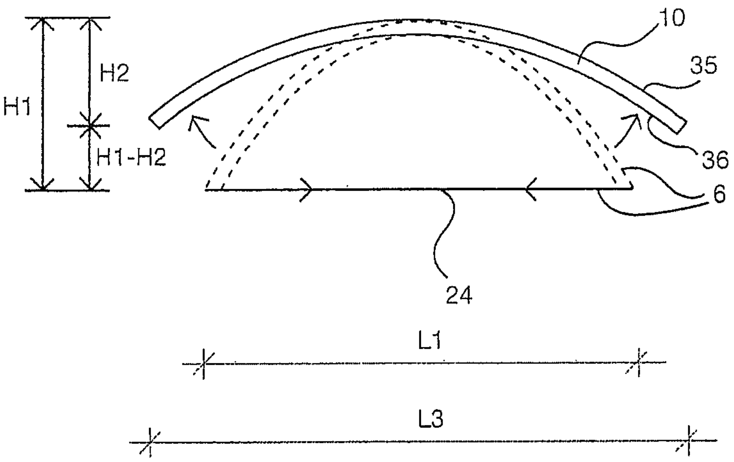

FIG. 27E is a diagrammatic cross-section through an assembly with a flexed panel (shown by dotted lines) and the same panel released in a residual panel geometry.

Figure 27F:
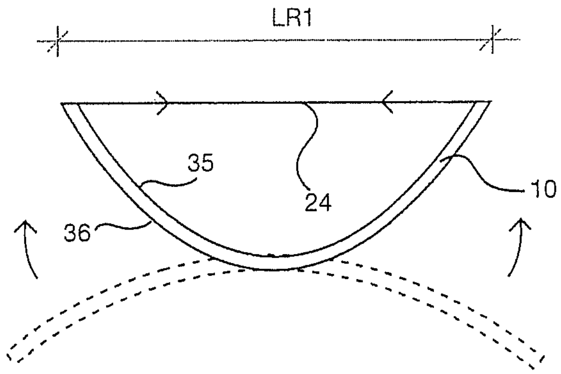

FIG. 27F is a diagrammatic cross-section showing the same panel in its residual panel geometry (shown by dotted lines) and the same panel in a reverse flexed panel assembly.

DETAILED DESCRIPTION OF EMBODIMENTS OF THE INVENTION

Figure 1A:
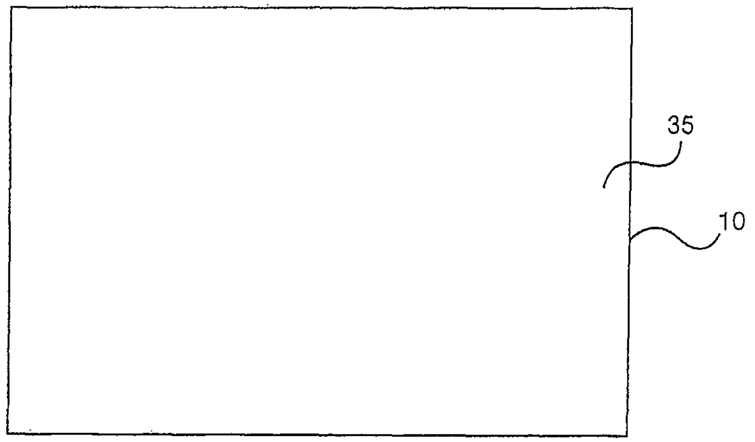
FIG. 1A is a plan of a panel.
Figure 1B:
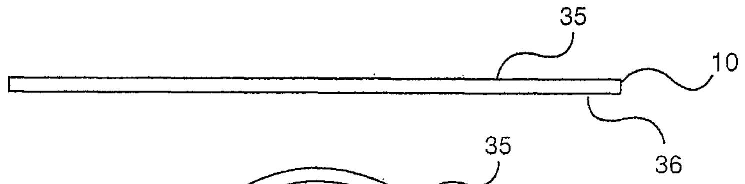
FIG. 1B is an edge elevation of a panel.
Figure 1C:
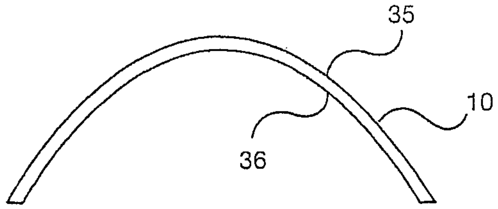
FIG. 1C is an elevation of a flexurally deformed panel.
Figure 1D:
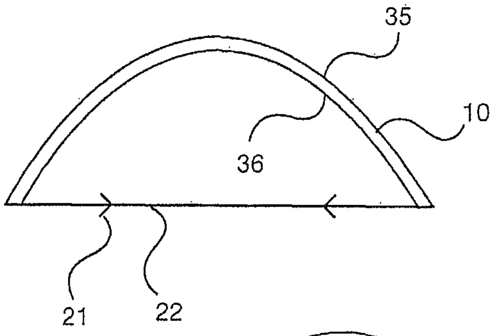
FIG. 1D is an elevation of a tied, flexurally deformed panel.
Figure 1E:
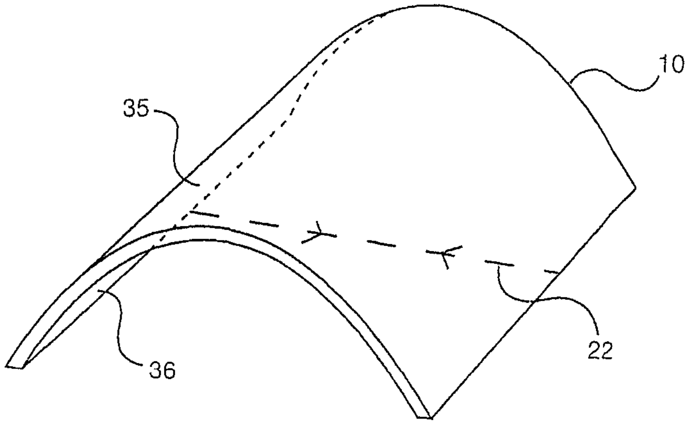
FIG. 1E is a perspective of a tied panel.
Figure 1F:
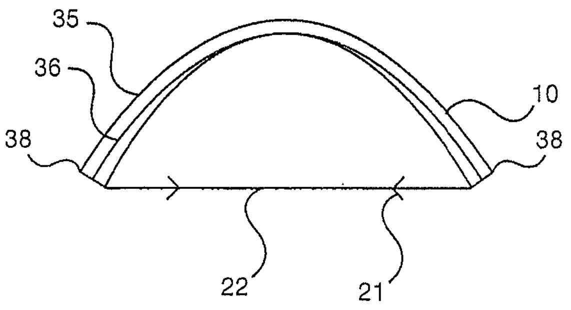
FIG. 1F is an elevation of an assembly.
Figure 1G:
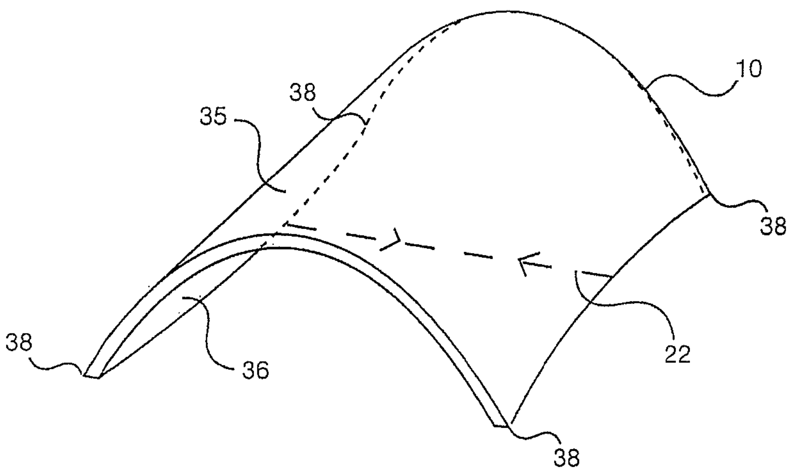
FIG. 1G is a perspective of a temporary assembly.
Figure 1H:
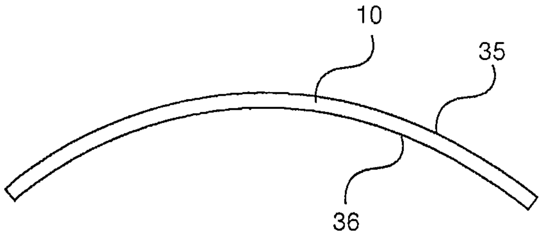
FIG. 1H is an edge elevation of a released panel showing residual curvature.
Figure 1J:
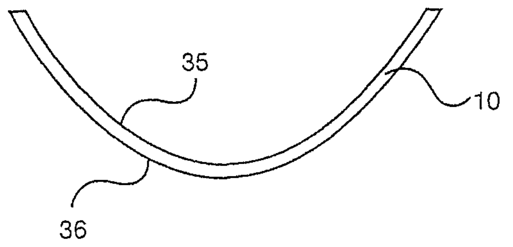
FIG. 1J is an edge elevation of a reverse flexed panel.
Figure 1K:
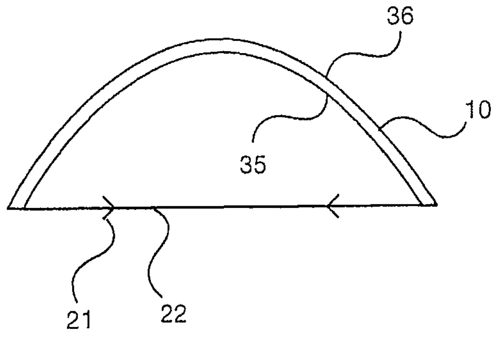
FIG. 1K is an elevation of a reverse flexed panel assembly.
Figure 1L:
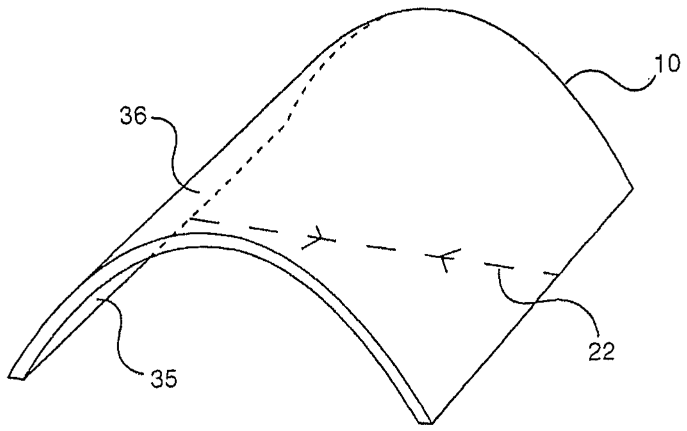
FIG. 1L is a perspective of a reverse flexed panel assembly having a single linear tie.
Figure 1M:
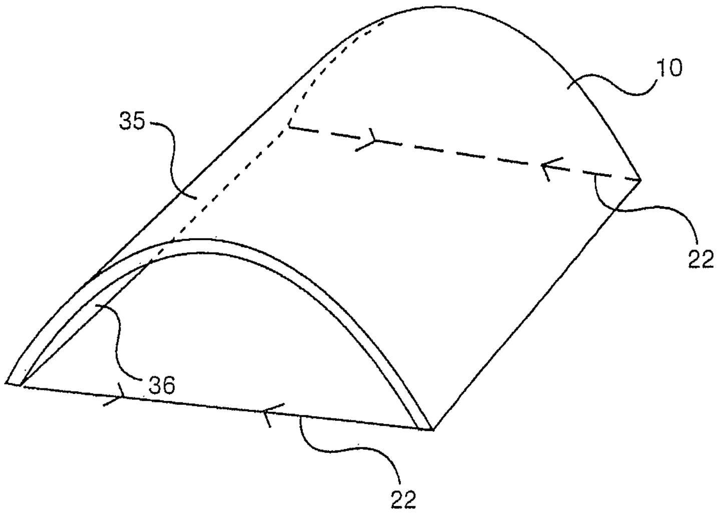
FIG. 1M is a perspective of an assembly comprising two linear ties.
Figure 1N:
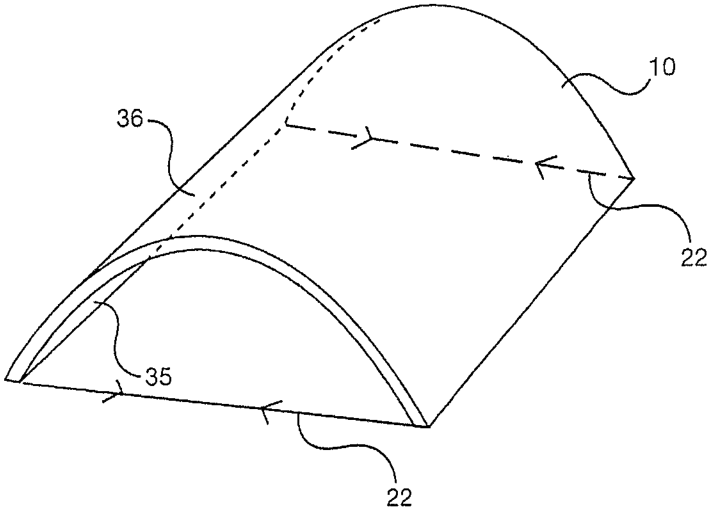
FIG. 1N is a perspective of a reverse flexed panel assembly comprising two linear ties.
Figure 1P:
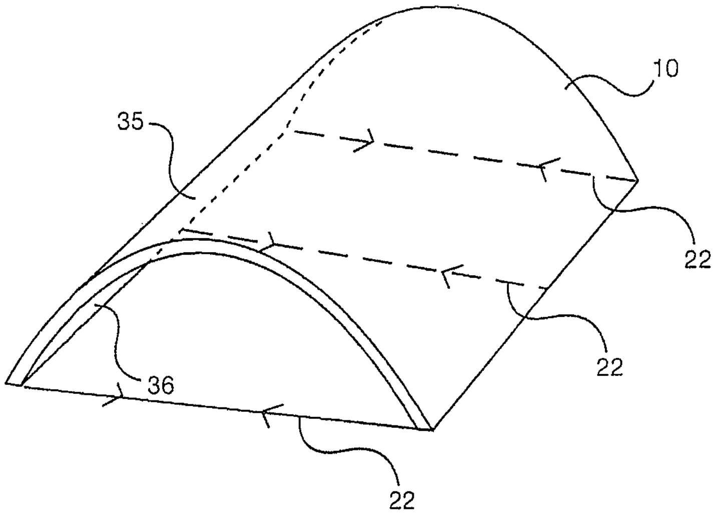
FIG. 1P is an assembly comprising three linear ties.
Figure 1Q:
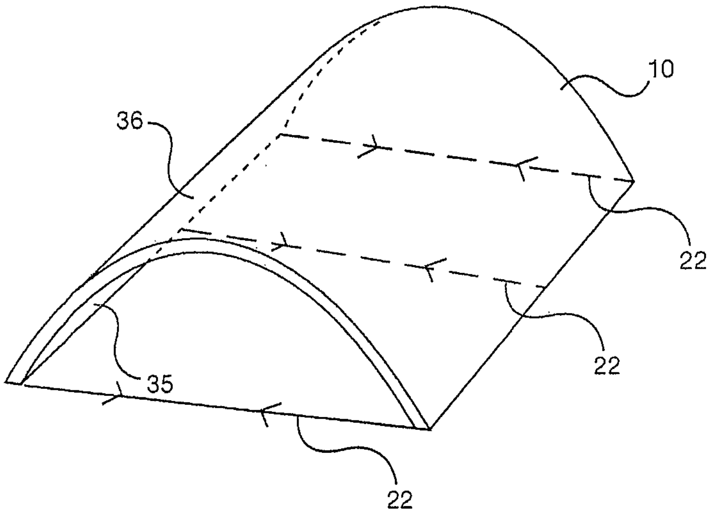
FIG. 1Q is a reverse flexed panel assembly comprising three linear ties.

FIGS. 1A-G illustrate panel 10, tied by a single tie rod 22. Panel 10 is shown on plan in FIG. 1A and in edge elevation in FIG. 1B before flexure, illustrated in FIG. 1C. FIG. 1D illustrates single linear tie rod 22, for example a rod or cable (the arrow heads 21 indicating tensile force) and a diagrammatic perspective of the resultant temporary assembly is illustrated in FIG. 1E. FIG. 1F illustrates the secondary deflection of the corners of the panel 38 in elevation, which is also shown in perspective in FIG. 1G. Such an assembly may also be used temporarily to create an "intermediate panel geometry" before attaching a membrane tie and any linear connector or connectors, or a tubular membrane tie. If a membrane tie is used, in the final "flexurally deformed geometry", this secondary deflection or out-of-alignment is eliminated. If the linear tie is released after a substantial elapsed time, the flexed panel will not revert to its initial geometry but have a residual panel geometry as illustrated in FIG. 1H. It is a typical feature of one or more embodiments of the invention that in re-using the same panel, it is typically flexurally deformed with an opposite direction of curvature as illustrated in FIG. 1J before being retied to form an assembly, as illustrated in FIG. 1K, where it can be seen that principal surfaces 35 and 36 are reversed, principal surface 35 changing from convex in FIG. 1H to concave in FIG. 1J and principal surface 36 changing from concave in FIG. 1H to convex in FIG. 1J. FIG. 1L is a perspective of the reverse flexed panel assembly of FIG. 1G. FIG. 1M is a perspective of an assembly with two linear ties and FIG. 1N is a reverse flexed panel assembly with two linear ties, as identified by the reversal of principal surfaces 35 and 36 from the initially constructed assembly of FIG. 1M. FIG. 1P is a perspective of an assembly with three linear ties and FIG. 1Q is a reverse flexed panel assembly with three linear ties.

Figure 2A:
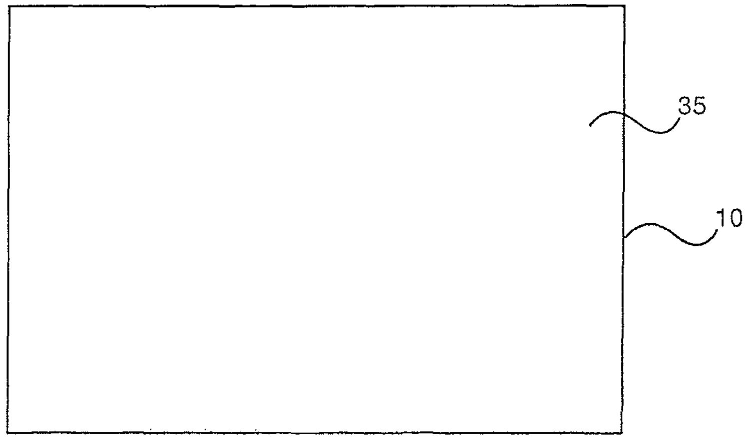
FIG. 2A is a plan of a panel.
Figure 2B:
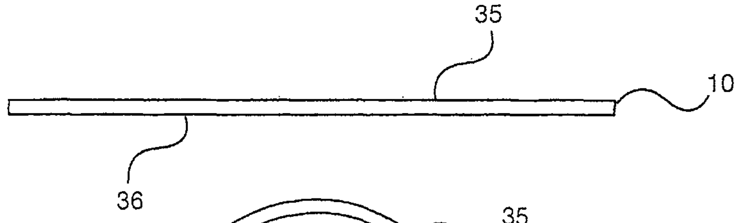
FIG. 2B is an edge elevation of a panel.
Figure 2C:
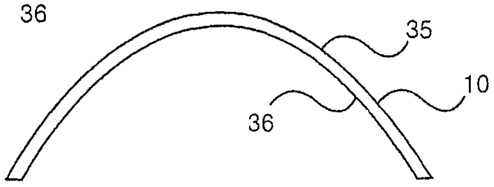
FIG. 2C is an elevation of a flexurally deformed panel.
Figure 2D:
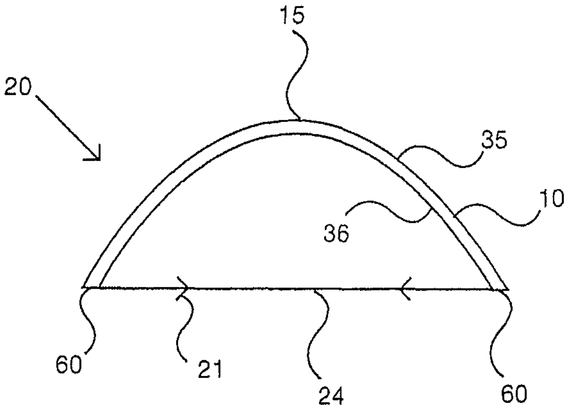
FIG. 2D is an elevation of an assembly.
Figure 2E:
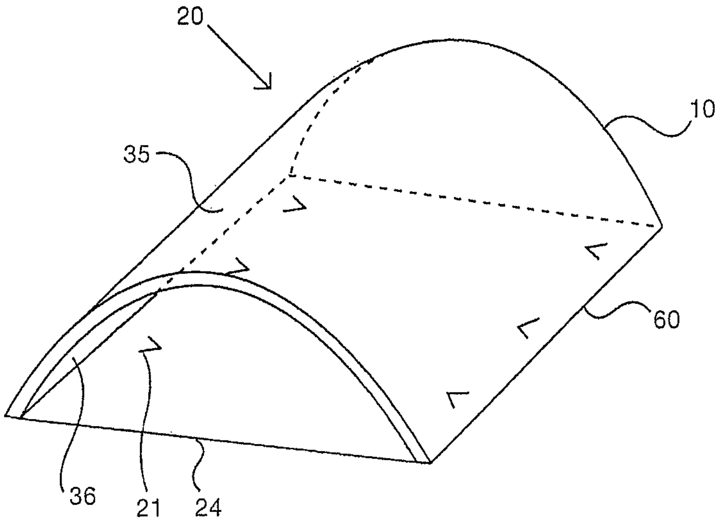
FIG. 2E is a perspective of an assembly with a horizontal membrane tie.
Figure 2F:
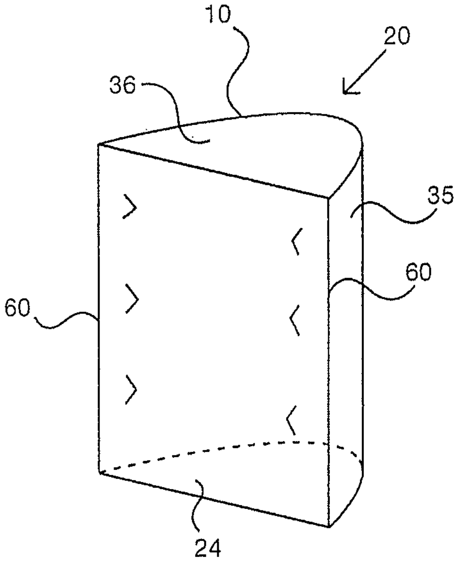
Figure 2G:
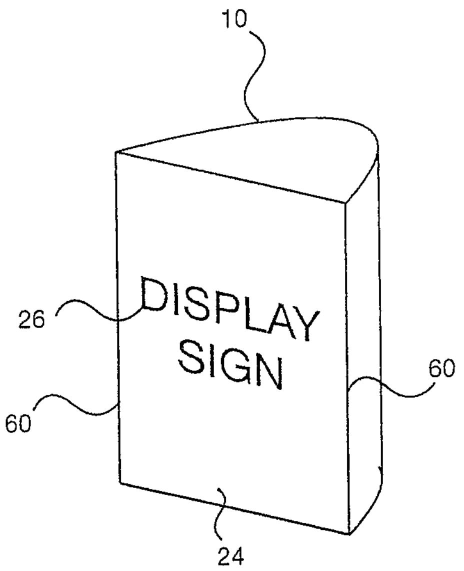
Figure 2H:
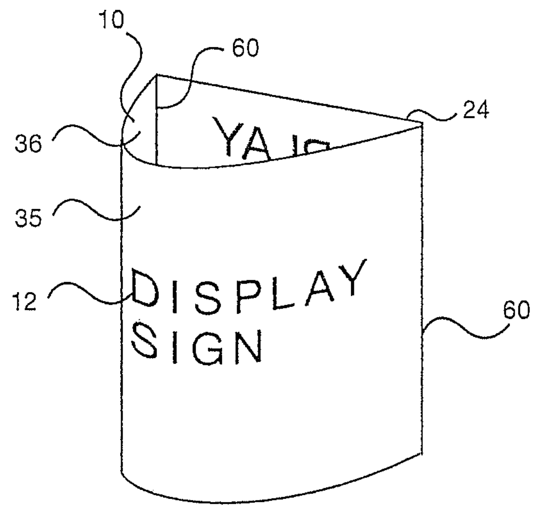
Figure 2J:
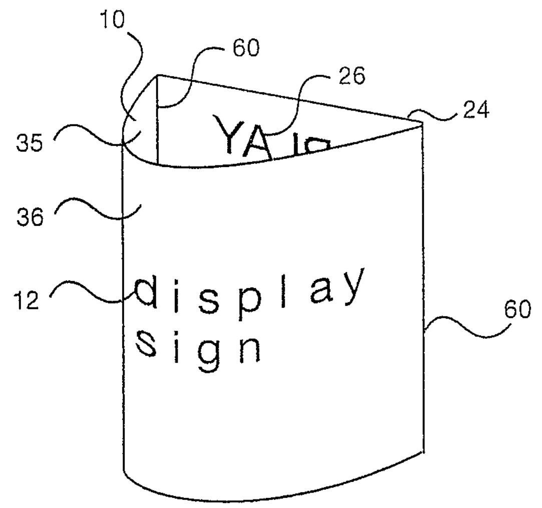
Figure 2K:
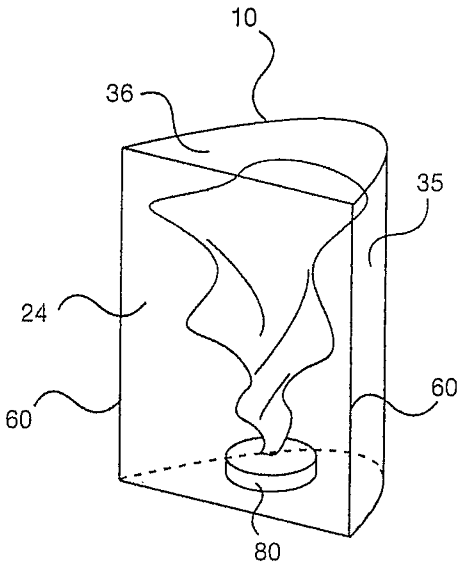
FIGS. 2K and L are perspectives of assemblies containing a displayed object.
Figure 2L:
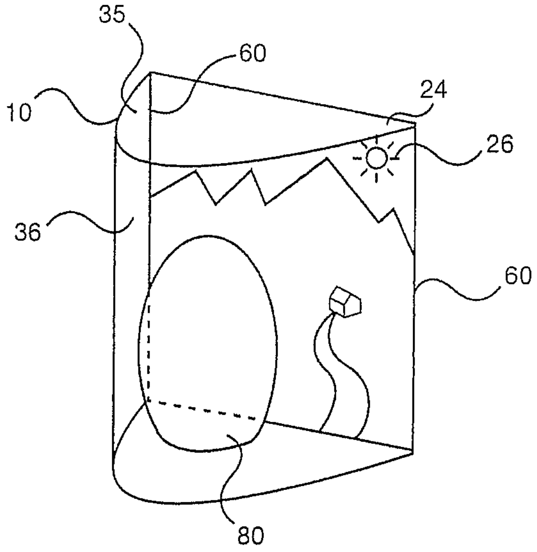
FIG. 2LL is a plan of a reverse flexed panel assembly with two removable display signs and a backing insert.
Figure 2M:
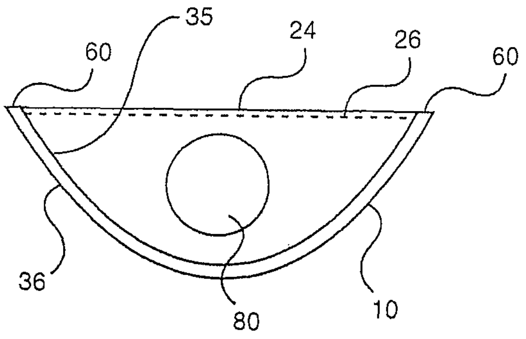
FIG. 2M is a plan of an assembly containing a displayed object.
Figure 2N:
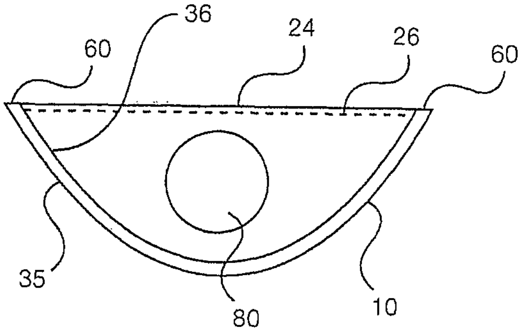
FIG. 2N is a plan of a reverse flexed panel assembly containing a displayed object.
Figure 2P:
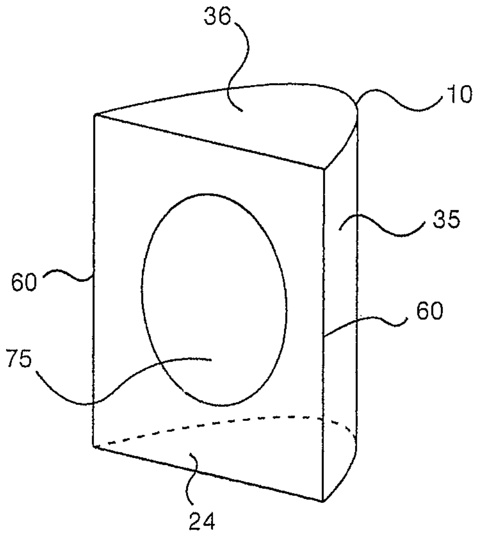
FIGS. 2P and Q are perspectives of assemblies with a membrane tie containing a hole.
Figure 2Q:
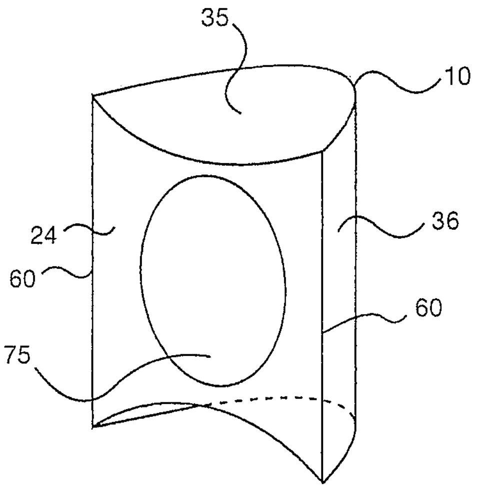
FIGS. 2QQ and 2RR are perspectives of an assembly with a membrane tie of less width than the connected edges of the panel.

FIGS. 2A-C are similar to FIGS. 1A-C and FIG. 2D illustrates a flexed, tied panel assembly 20 comprising a membrane tie 24, linear connectors 60 and panel 10, which is flexurally deformed into a shape approximating to a parabolic arch with crown 15. In FIGS. 2D and 2E, the arrow heads 21 indicate tensile force in the membrane tie 24. Such a flexed, tied panel assembly 20 is stable, as illustrated in FIG. 2E, on a plane, horizontal supporting surface or with linear supports along the edges of the panel or suitable support points along the length of the panel edges, for example at the four corners of the panel. Alternatively, the assembly 20 is stable if rotated through 90°, as illustrated in FIG. 2F, if supported on a plane, horizontal surface or suitable points of support to the lower, curved edge of the panel. Such an assembly can be used to display an advertisement, for example the membrane tie 24 being a membrane tie display sign 26, as illustrated in FIG. 2G. For example, the membrane tie is a small photograph or postcard with a clear transparent plastic panel, for example of 0.5 mm thick pvc with self-adhesive tape linear connectors to the photograph or post card. For larger displays for example up to 2.4 m height, the membrane tie is optionally a printed plastic film or fabric, for example a 200 micron print-treated polyester film, and the panel a transparent plastic sheet, for example of 6 mm acrylic or polycarbonate. Alternatively, the display sign can be printed or otherwise applied to the panel 10, for example a panel display sign 12, for example printed or otherwise applied to principal surface 35 of an acrylic sheet, as illustrated in FIG. 2H, with optional membrane tie display sign 26. FIG. 2J shows the reverse flexed panel assembly of FIG. 2H, with another panel display sign 12 printed or otherwise applied to principal surface 36. Another application of the assembly with a transparent panel 10 and/or a transparent membrane tie 24 is to exhibit and protect a display object 80, as illustrated in FIG. 2K. It is advantageous to reverse the direction of curvature of panel 10 from time to time, for example upon the change of a display panel or display object, to overcome the effects of viscoelastic relaxation of stresses and consequent loss of efficiency of the structure. The functions of the assemblies of FIGS. 2G and 2K can be combined, for example exhibiting display object 80 with a background membrane tie display sign 26, as illustrated in perspective in FIG. 2L and on plan in FIG. 2M, which show membrane tie display sign 26 applied to membrane tie 24 and panel 10 reversed in flexure. FIG. 2N shows the direction of curvature of panel 10 changed again (or re-reversed) after an elapsed time, to keep the assembly taut. Membrane ties can comprise one or more holes or voids 75, as illustrated in FIG. 2P, and/or the free sides can be curved, as illustrated in FIG. 2Q. Assemblies which may be used for display, for example those illustrated in FIGS. 2F-N, optionally comprise a panel of semi-rigid plastic material, for example of acrylic, polycarbonate or PVC, and a membrane tie comprising a plastic film, for example of polyester, polycarbonate or PVC, or a woven or non-woven fabric, typically a print-treated fabric. The linear connectors typically comprise self-adhesive tape or profiled aluminum or plastic sections or proprietary connecting systems, such as VELCRO®, a trademark of Velcro Industries B.V. or Dual Lock™ a trademark of 3M or any of the other linear connectors illustrated in FIGS. 21A-25N.

Instead of a continuous membrane, the membrane tie may be an array of linear members or a net or a perforated material. In such assemblies the linear connectors 60 may comprise a series of point connectors, discrete elements such as lacing loops attached to the panel edges or holes near the panel edges, reinforced or otherwise, which connect to the tie member or members.

Figure 2R:
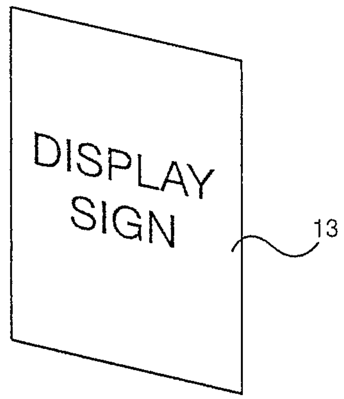
FIG. 2R is a perspective of a removable display sign.
Figure 2S:
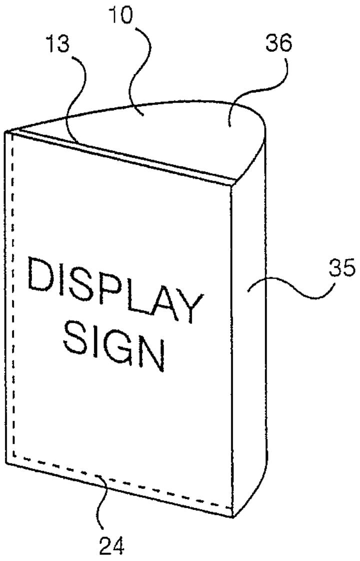
FIG. 2S is a perspective of an assembly with a removable display sign.
Figure 2T:
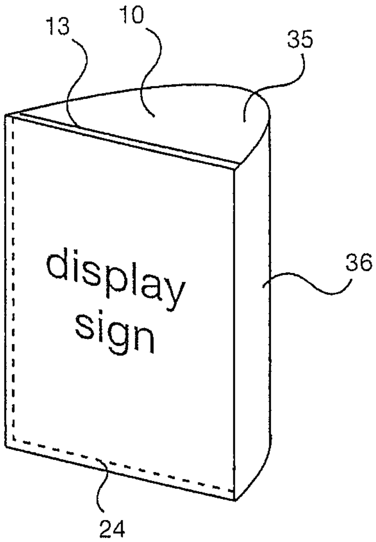
FIG. 2T is a perspective of a reverse flexed panel assembly with another removable display sign.
Figure 2U:
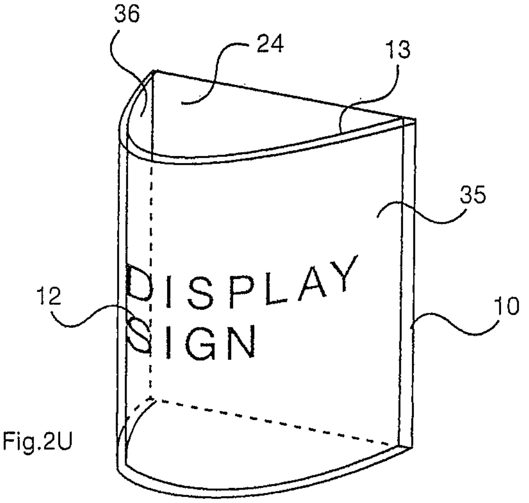
FIG. 2U is a perspective of an assembly with a removable display sign immediately behind the flexed panel.
Figure 2V:
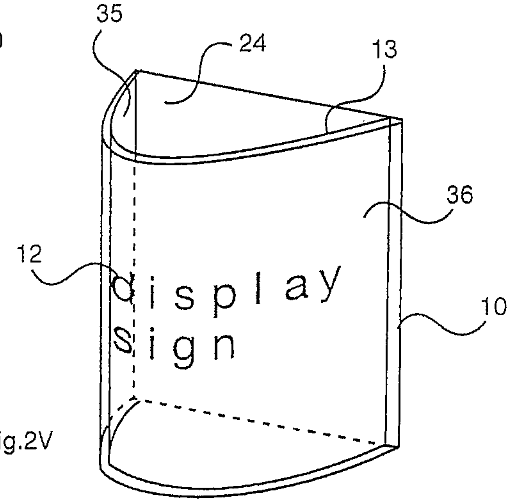
FIG. 2V is a perspective of a reverse flexed panel assembly with another display sign immediately behind the reverse flexed panel.

Display messages can be changed in other ways, for example an independent display panel 13, for example a printed piece of paper or card, as illustrated in FIG. 2R, can be inserted inside an assembly of FIG. 2F with a transparent membrane tie 24, to be protected and visible from outside the assembly 20, as illustrated in FIG. 2S. FIG. 2T illustrates a reverse flexed panel assembly (as indicated by reversed principal surfaces 35 and 36) of FIG. 2S, except that a new independent display panel 13 has been inserted behind transparent membrane tie 24. Alternatively, a suitably sized independent display panel 13 can be inserted behind and protected by a transparent, curved panel 10, as illustrated in FIG. 2U. The direction of flexure of transparent panel 10, for example of polycarbonate, acrylic or pvc thin sheet material, is repeatedly reversible to achieve a reusable, suitably flexed and tensioned display system, for example for printed paper or card, for example for use as changeable table menus, retail price display units or photographic displays, as illustrated by FIG. 2V.

Such display units according to one or more embodiments of the invention typically use much less plastic material than prior art plastic display units, for example hot wire formed acrylic display holders typically comprising a continuous piece of acrylic sheet bent to form a base portion and two vertical or sloping portions between which paper or card displays are inserted. The amount of plastic used in various embodiments of the invention can be as little as one quarter or less of that used in hot wire formed prior art units for the same size of display panel, for example as illustrated in prior art FIG. 2W, in which independent display sign 13 is inserted inside hot wire bent acrylic sheet display 39. For example, a typical prior art A4 sign of prior art FIG. 2W would use approximately 30"×8" (750 mm×200 mm) of ⅛" (3 mm) thick acrylic sheet (a total of approximately 30 $in^3$) whereas the display system of one or more embodiments of the present invention in FIG. S and/or FIG. 2U could use a pvc panel of 12"×12" (300 mm×300 mm) of 1/24" (1 mm) thickness and a 12"×8" (300 mm×200 mm) of 4/1000" (100 microns) thickness, just over 6 $in^3$, approximately ⅕ of the amount of a cheaper plastic material (pvc) than the prior art acrylic display unit.

Figure 2X:
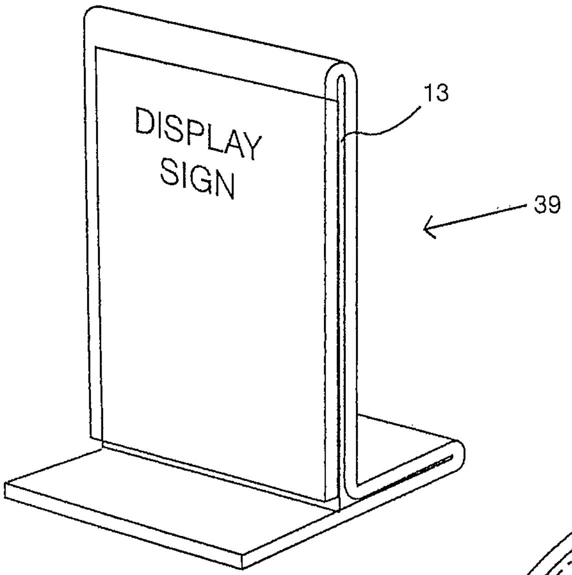
FIG. 2X is an plan of an assembly showing a removable display panel immediately behind a membrane tie and a curved removable display panel immediately behind a reversible flexed panel.
Figure 2X:
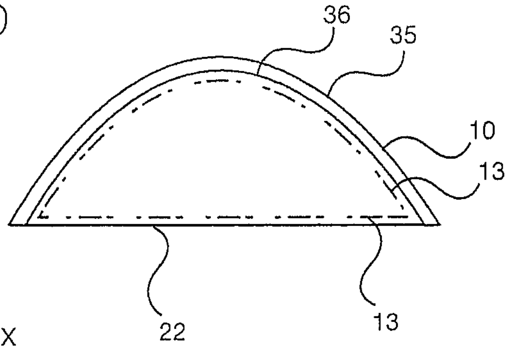
Figure 2Y:
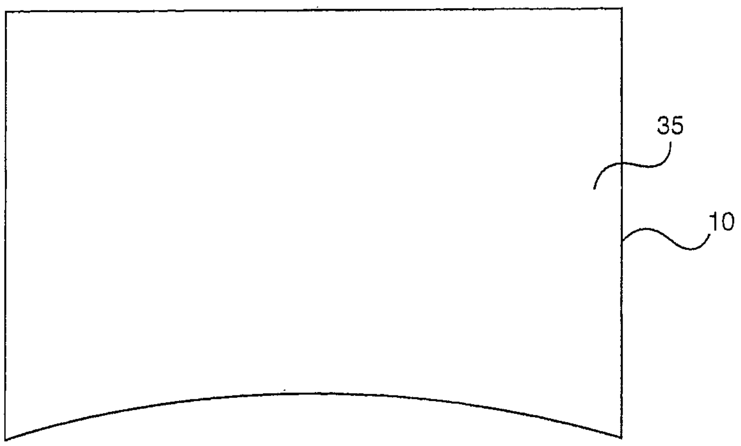
FIG. 2Y is a plan of a panel with a concave curved edge.
Figure 2Z:
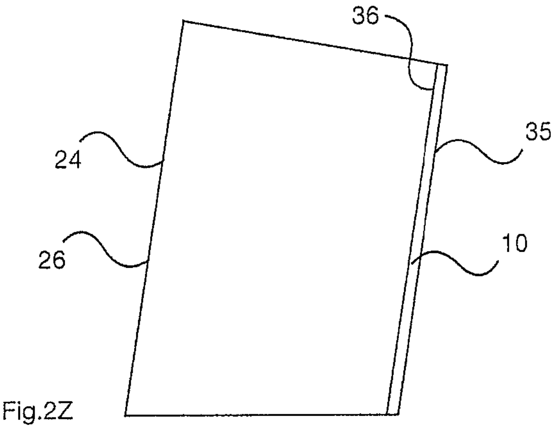
FIG. 2Z is a cross-section through an assembly comprising a flexed panel with a concave curved edge and a membrane tie display panel.
Figure 2A:
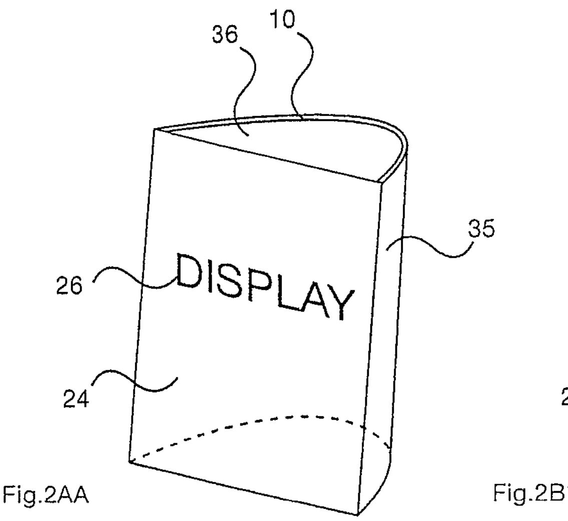
Figure 2B:
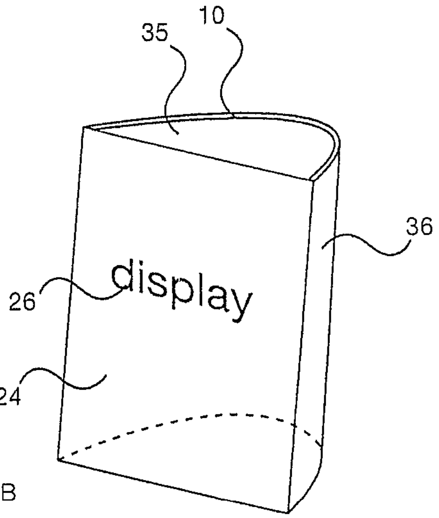
Figure 2C:
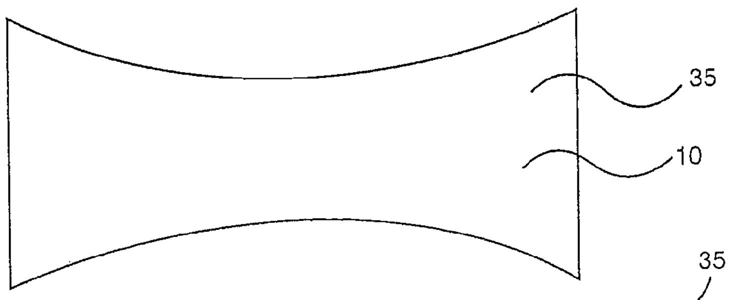
Figure 2D:
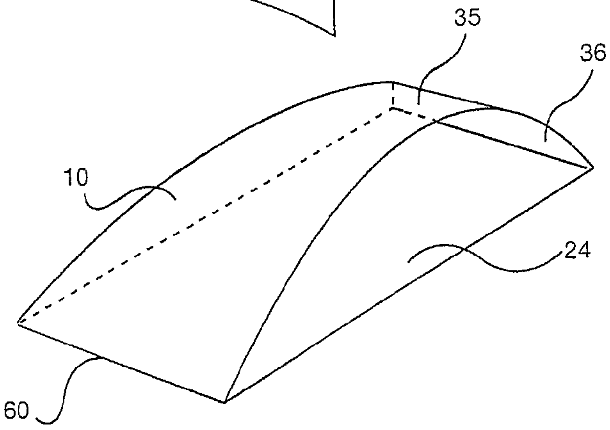
Figure 2E:
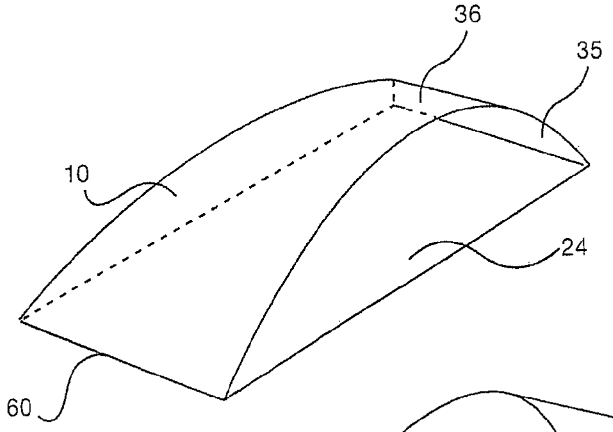
Figure 2F:
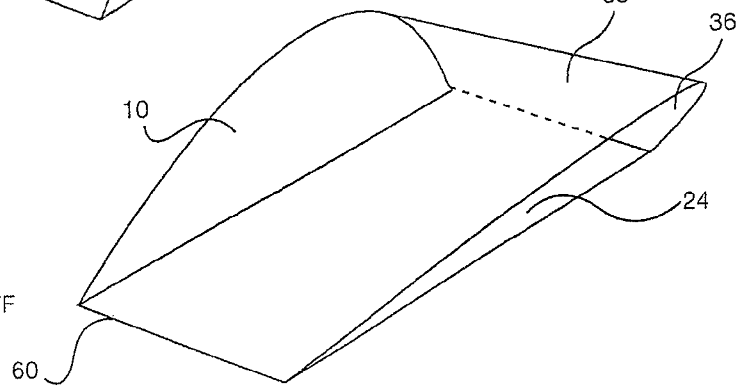
Figure 2G:
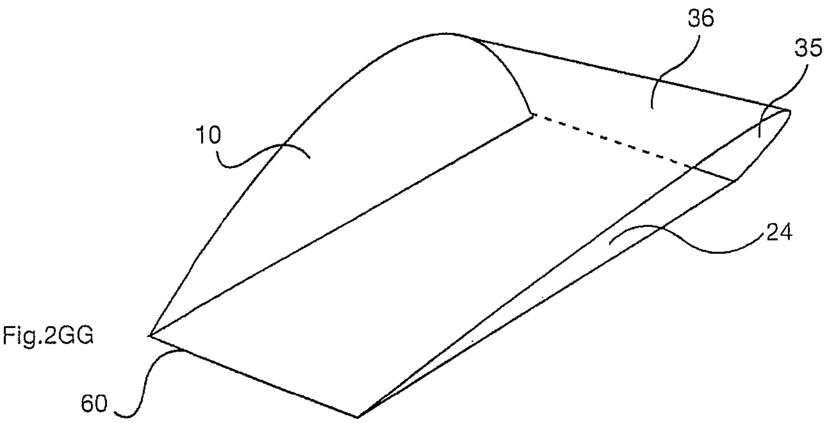
Figure 2H:
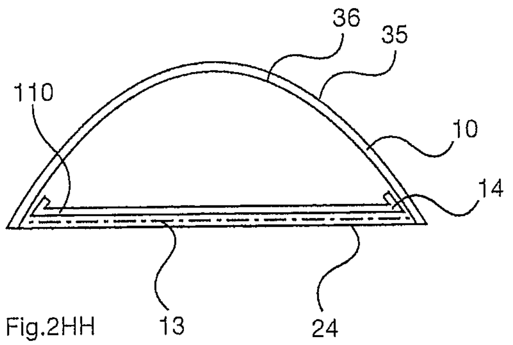
Figure 2J:
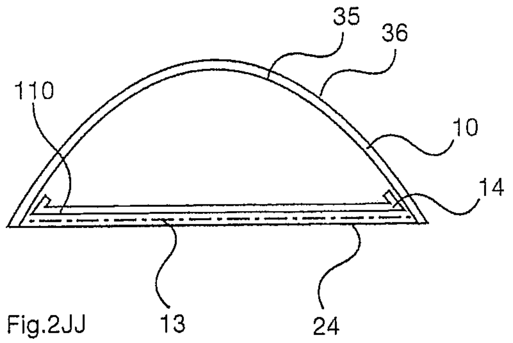
Figure 2K:
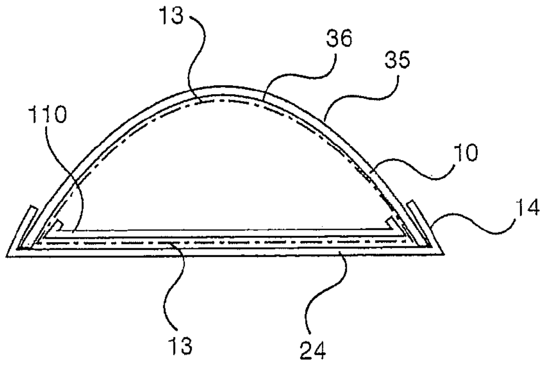
Figure 2L:
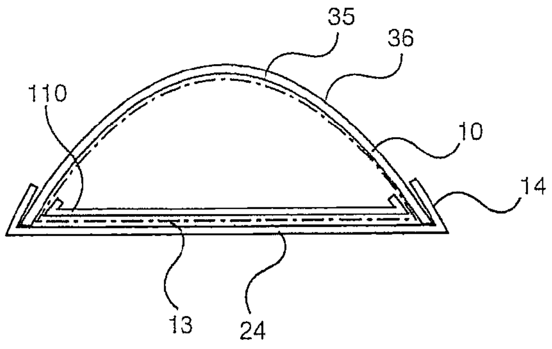
Figure 2M:
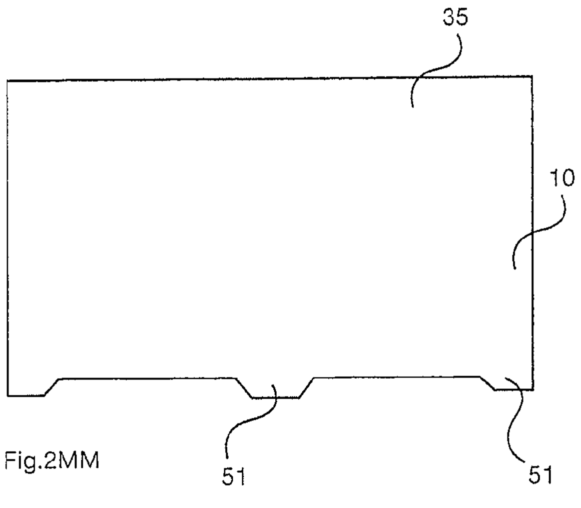
Figure 2N:
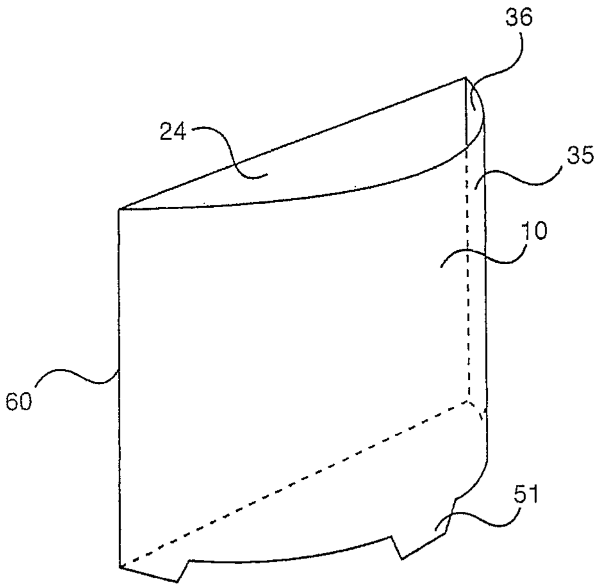
Figure 2P:
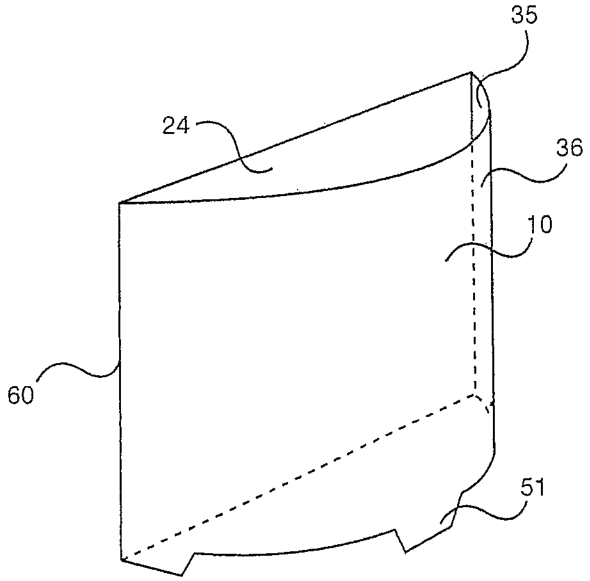
Figure 2Q:
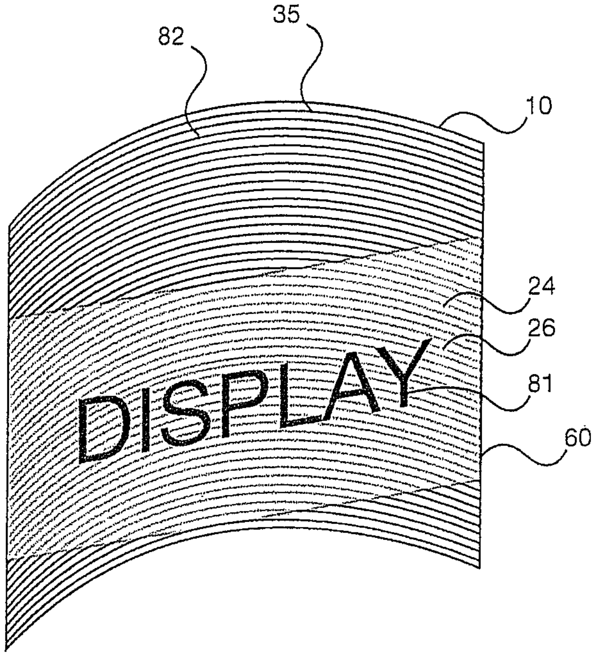
Figure 2R:
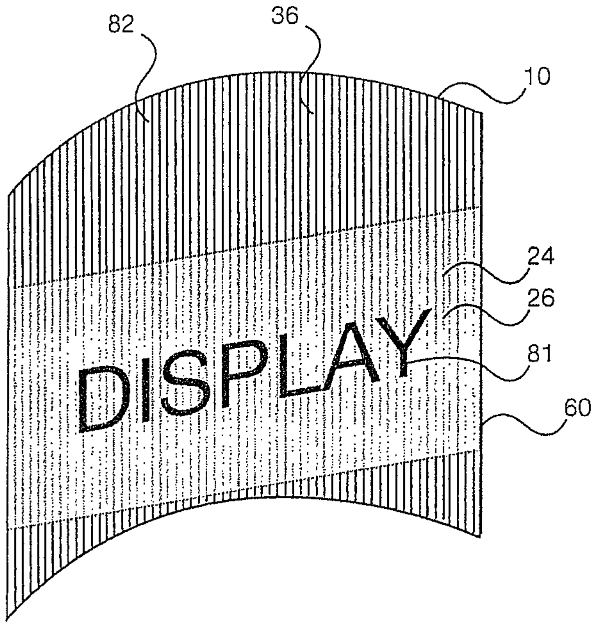

FIG. 2X illustrates a plan of an assembly with independent display sign 13 behind both the membrane tie 22 and the panel 10, which is reversible, the direction of curvature typically changed upon changing of the independent display sign 13. FIG. 2Y is a plan of a panel 10 with a concave curved edge, so shaped in order that membrane tie display sign 26 will be at a desirable sloping angle when the curved edge is resting on a plane, horizontal surface, as illustrated in FIG. 2AA. FIG. 2BB shows a reverse flexed panel assembly of FIG. 2AA with a changed membrane tie display panel 26.

FIGS. 2CC and DD illustrate an assembly comprising panel 10 which has two opposing edges curved inwards, for example to assist access to goods displayed within a retail display embodiment of the assembly, for example jewelry. FIG. 2EE is a reverse flexed panel assembly of FIG. 2DD, as indicated by the reversal of principal surfaces 35 and 36. FIG. 2FF illustrates a panel 10 in an assembly in which two opposing edges of the panel 10 are bowed outwards, for example, in a shelter embodiment to provide better rain protection over the area of the membrane tie 24, for example which also acts as a ground sheet and/or waterproof membrane for the enclosure. FIG. 2GG is the reverse flexed panel assembly of FIG. 2FF, such reversal being undertaken regularly, for example every four months for a polycarbonate panel 10, to overcome the effects of viscoelastic relaxation of the flexural stresses in panel 10 with elapsed time. FIG. 2HH illustrates changeable independent display sign 13 trapped between membrane tie 24 and backing insert 110 having stiffening edges 14 to maintain it in place. FIG. 2JJ illustrates a reverse flexed panel assembly of FIG. 2HH. FIG. 2KK illustrates another variant in which the assembly of FIG. 2HH has another independent display panel 13 inserted behind flexurally deformed panel 10 and FIG. 2LL illustrates the reverse flexed panel assembly of FIG. 2KK. FIG. 2MM illustrates a panel 10 with three feet 51 which, in the tied, flexurally deformed assembly of FIG. 2NN, assist the stability of the assembly on an uneven surface. FIG. 2PP is the reversed flexed panel assembly of FIG. 2NN.

FIG. 2QQ illustrates another example of a display in which membrane tie 24 only extends over part of the length of opposing edges to flexurally deformed panel 10, for example showing a discrete display design 81 on a transparent membrane tie 24 comprising membrane tie display sign 26 enabling a background second display design 82 to be visible through the transparent portions of membrane tie 24, for example to show a subject design 81 in a three-dimensional relationship with background design 82 or a brand logo 81 in front of a brand lifestyle image 82 on principal surface 35 of panel 10. Another brand lifestyle image 82 can be visible from the other side, principal surface 36, panel 10 being reversible as illustrated in FIG. 2RR.

Figure 3A:
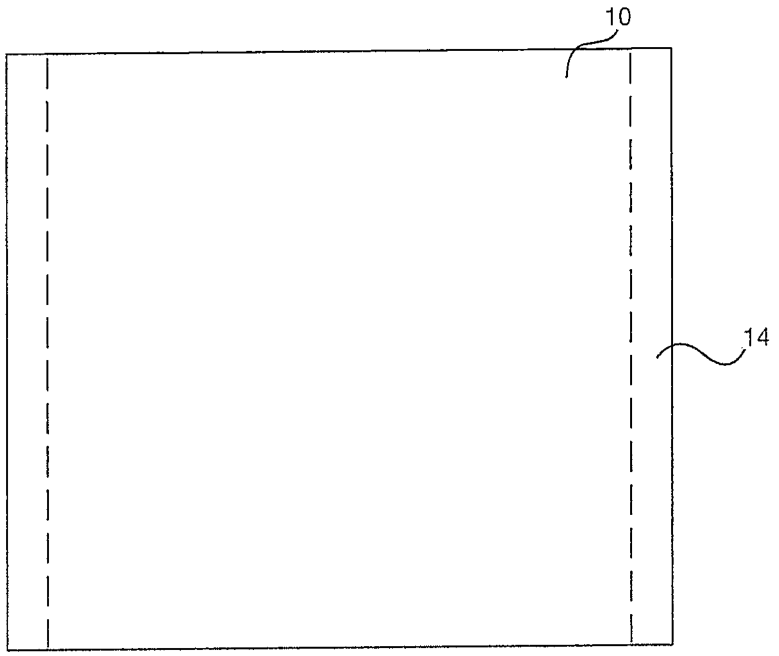
FIG. 3A is a plan of a panel with edge stiffeners.
Figure 3B:
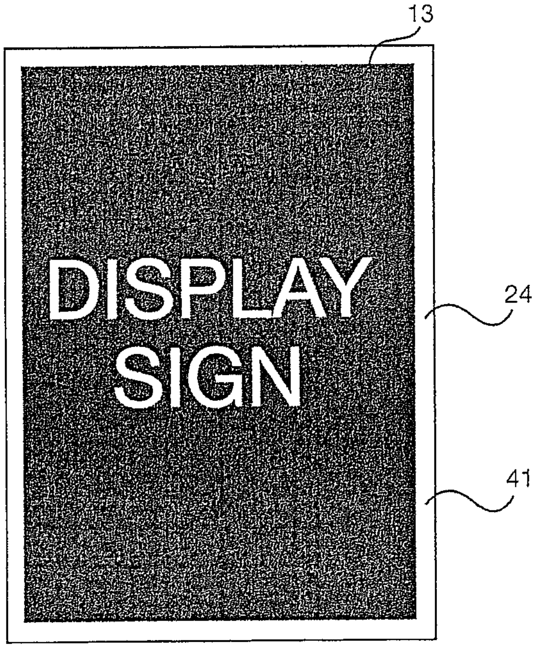
FIG. 3B is a plan of a laminated membrane tie.
Figure 3C:
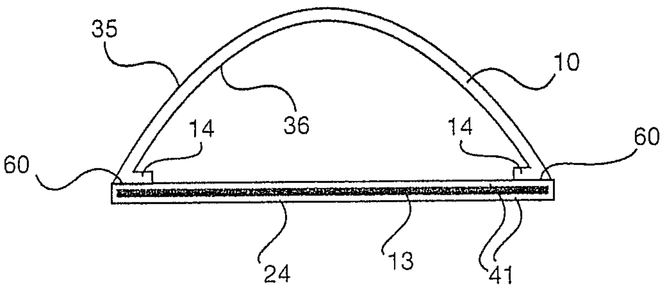
FIG. 3C is a cross-section through an assembly comprising a laminated membrane tie.
Figure 3H:
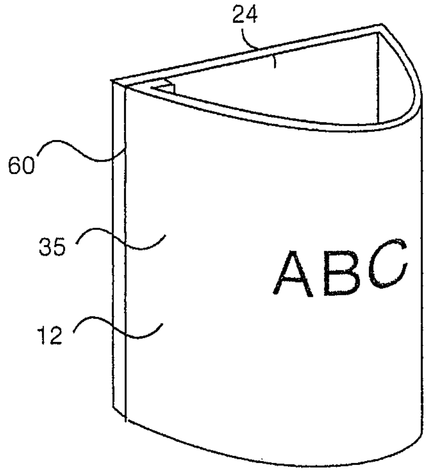
FIG. 3D is a cross-section through an assembly comprising a laminated membrane tie with a reverse flexed panel.
FIG. 3E is a cross-section through a laminated panel, a laminated membrane tie and a laminated edge stiffener, which are all connected by laminating film.
FIG. 3F is a cross-section through an assembly comprising laminated components.
FIGS. 3G and H are perspectives of an assembly comprising laminated components.
FIGS. 3J and K are perspectives through reverse flexed assemblies comprising laminated components.
FIG. 3L is a cross-section through an assembly comprising laminated components.
FIG. 3M is a cross-section through a reverse flexed assembly comprising laminated components.
FIG. 3N is a cross-section through an assembly comprising laminated components.
FIG. 3P is a cross-section through a reverse flexed assembly comprising laminated components.
FIG. 3Q is a cross-section through an assembly with a laminated membrane tie.
FIG. 3R is a cross-section through a reverse flexed panel assembly with a laminated membrane tie.
Figure 3J:
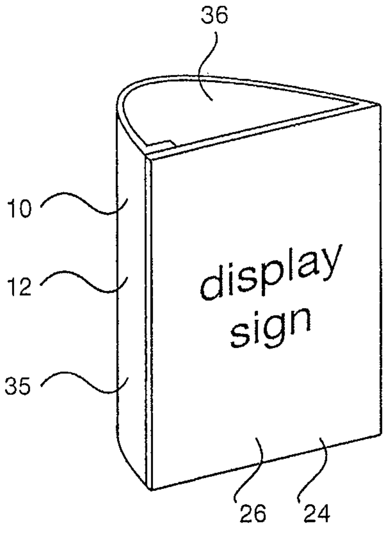
Figure 3K:
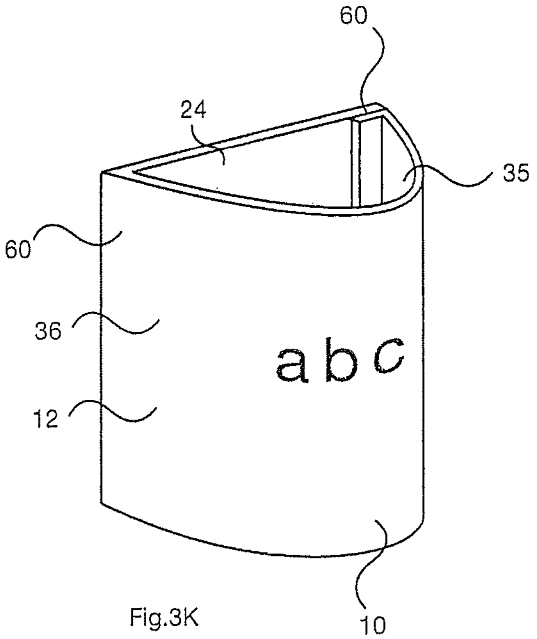
Figure 3L:
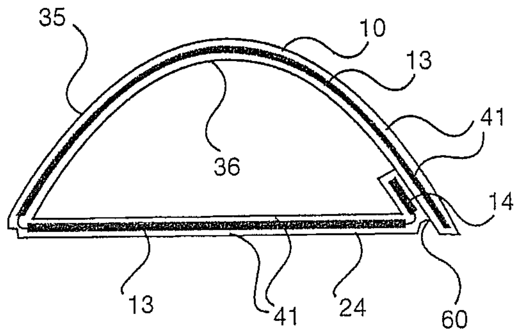
Figure 3M:
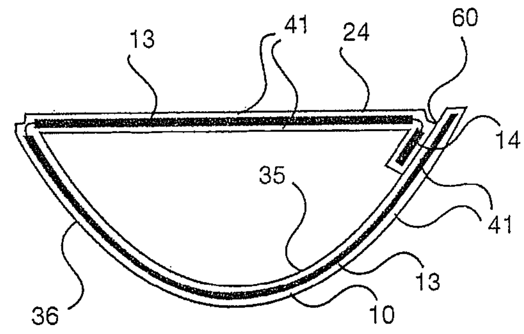
Figure 3N:
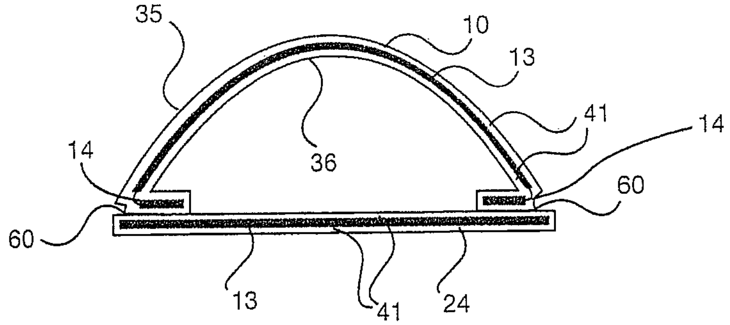
Figure 3P:
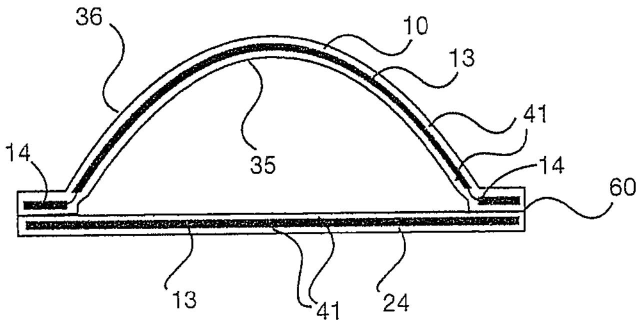
Figure 3Q:
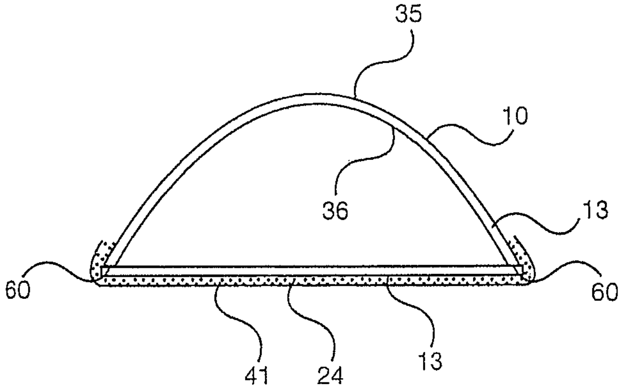
Figure 3R:
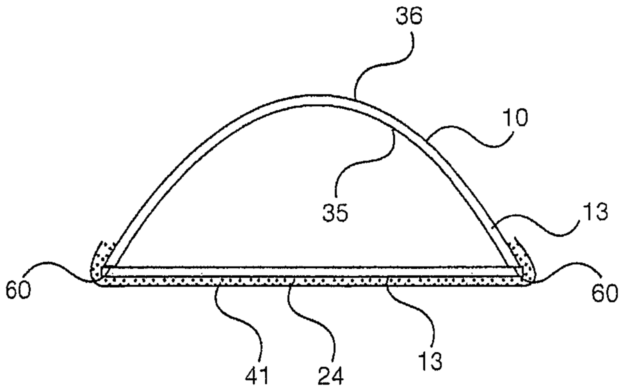

Some practical embodiments of the invention comprise panels and/or membrane ties with transparent plastic laminating film 41 to protect a paper or card display panel, laminated to one or preferably both sides of a paper or card display panel 13, as illustrated in FIGS. 3A-R. FIG. 3A shows a panel 10, optionally transparent, having edge stiffeners 14. FIG. 3B is a plan of laminated membrane tie 24 comprising display sign 13 and transparent plastic laminating film 41, shown assembled in the cross-section of FIG. 3C. Panel 10 can be reversed in curvature in the same geometry as in FIG. 3C or the edge stiffeners 14 can be arranged to extend outwards as illustrated in the reverse flexed panel assembly of FIG. 3D. In the embodiment of FIGS. 3E-J, two display panels 13 and edge stiffener 14, for example of paper or card, are encapsulated between two protective transparent plastic laminating film layers 41. As shown in FIG. 3E, the components are first assembled flat, the two paper or card display panels 13 and edge stiffener 14 being encapsulated and bonded together by two layers of laminating film 41, the gaps between the encapsulated elements comprising just two layers of laminating film 14, to act as hinges 42 in the completed assembly of FIG. 3F, in which laminated edge stiffener 14 is adhered to laminated membrane tie 24, for example by means of pressure-sensitive adhesive linear connector 60, as shown in perspective in FIG. 3G, having membrane tie display panel 26 and panel display sign 12, as also shown in FIG. 3H. A reverse flexed panel assembly can display different signs, as illustrated in FIGS. 3J and K. Laminating film 41 is typically of clear, transparent plastic, for example polyurethane, pvc, polypropylene, nylon or polyester bonded to display panel 13 by "cold lamination", typically using pressure-sensitive adhesive, or "hot lamination", typically using heat-activated adhesive. FIG. 3L shows an alternative assembly comprising laminated display panels 13 encapsulated within two sheet of laminating film 41 with edge stiffener 14, reverse flexed in FIG. 3M. FIG. 3N illustrates yet another embodiment in which a laminated panel 10 with two edge stiffeners 14 is produced independently of laminated membrane tie 24 and are connected by two adhesive linear connectors 60. This configuration is reversible to form the same geometry or with the edge stiffeners extended outwards, as illustrated in FIG. 3P. FIG. 3Q shows an assembly in which display panel 13 is laminated on one side only by transparent plastic laminate film 41 to form membrane tie 24. The transparent plastic laminating film 41 extends beyond the display panel 13 at opposing edges and these projections adhere around the edges of panel 10 to form pressure-sensitive linear connectors 60. These linear connectors 60 comprise removable pressure-sensitive adhesive, enabling the reversal of flexure of panel 10, as illustrated in FIG. 3R. Pouch laminating systems are common-place and suitable encapsulation and folding methods are disclosed in GB 2312869 "Protection of Porous Sheets"

Figure 4A:
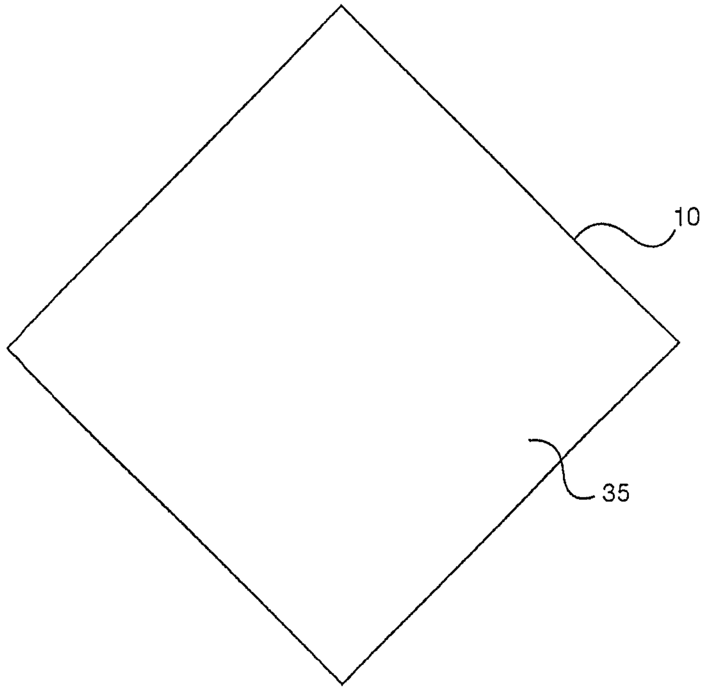
FIG. 4A is a plan of a panel.
Figure 4B:
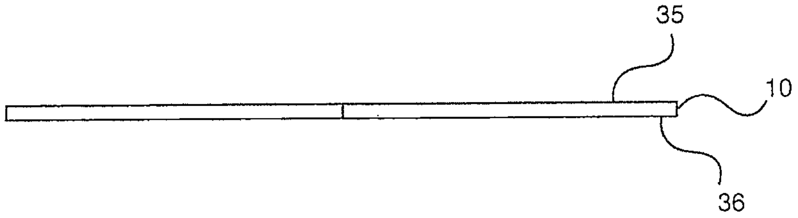
FIG. 4B is an edge elevation of a panel.
Figure 4C:
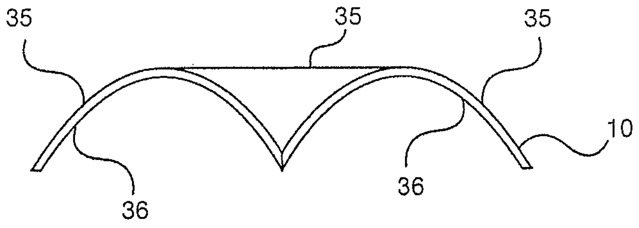
FIG. 4C is an elevation of a panel flexurally deformed in four corners.
Figure 4D:
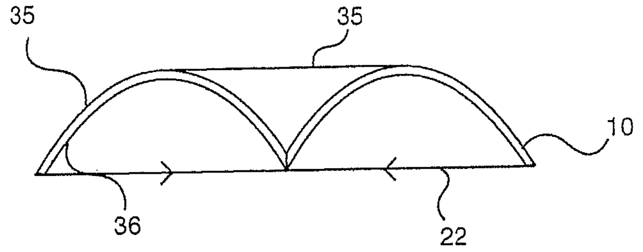
FIG. 4D is an elevation of a tied panel flexurally deformed in four corners.
Figure 4E:
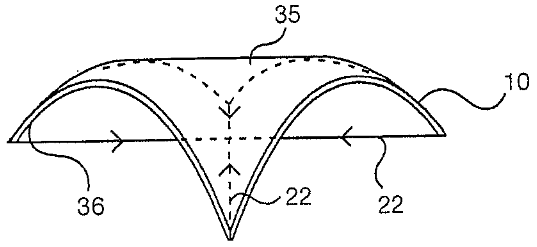
FIG. 4E is a perspective of an assembly comprising a panel flexurally deformed in four corners with linear ties.
Figure 4F:
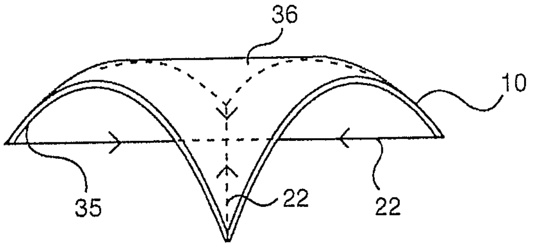
FIG. 4F is a perspective of a reverse flexed panel assembly comprising a panel flexurally deformed in four corners with linear ties.
Figure 4G:
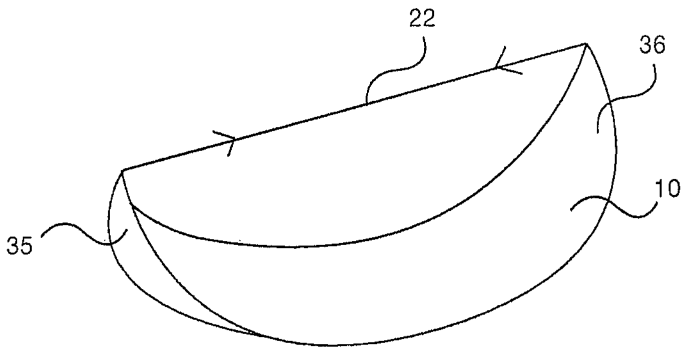
FIG. 4G is a perspective of an assembly with "eye shaped" panel and single linear tie.
Figure 5A:
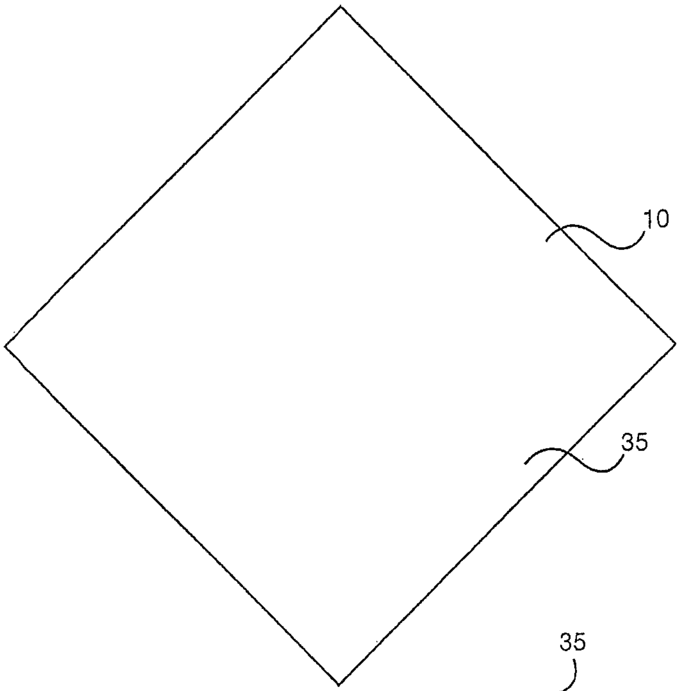
FIG. 5A is a plan of a panel.
Figure 5B:
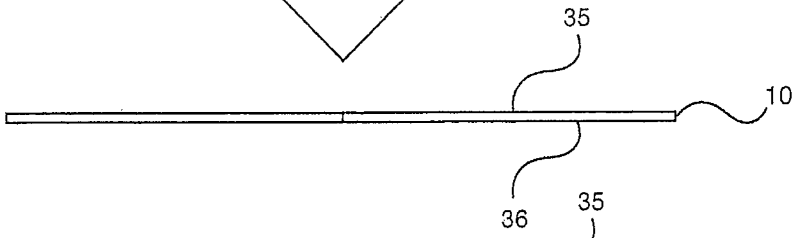
FIG. 5B is an elevation of a panel flexurally deformed in four corners.
Figure 5C:
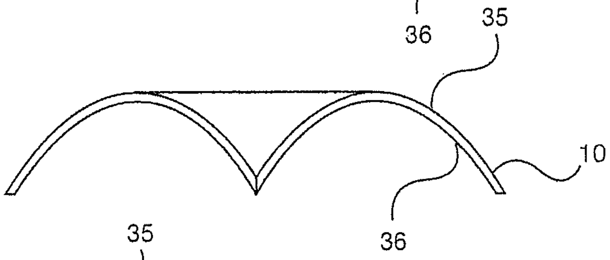
FIG. 5C is an elevation of a panel flexurally deformed in four corners.
Figure 5D:
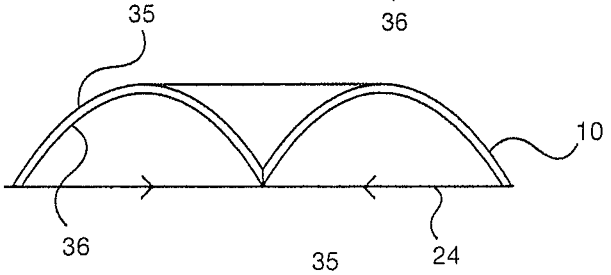
FIG. 5D is an elevation of a tied panel flexurally deformed in four corners.
Figure 5E:
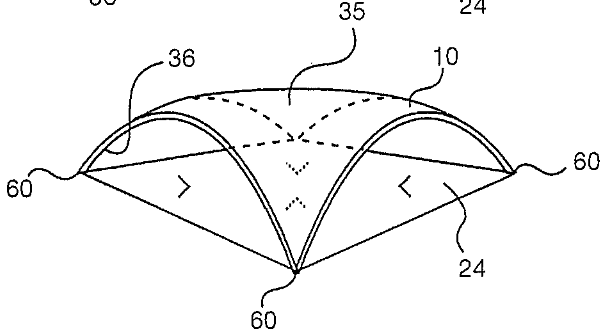
FIG. 5E is a perspective of a panel flexurally deformed in four corners with a membrane tie.

FIGS. 4A-E illustrate the production of a shell-like structure comprising two linear ties 22, for example rods or cables, connecting opposing corners of square panel 10 shown in plan in FIG. 4A, and the edge elevation in FIG. 4B, flexurally deformed in FIG. 4C, and tied in FIGS. 4D and E. This sequence is optionally used to create an "intermediate panel geometry" prior to applying a membrane tie 24 connecting the four corners of the deformed panel 10, as illustrated in FIG. 5E. FIG. 4F illustrates the reverse flexed panel assembly of FIG. 4E. FIG. 4G shows an assembly with an "eye shaped" panel 10 and a single linear tie 22. Towards the pointed ends of the panel the curvature does not decrease as with a rectangular panel. Such a structure, for example with a polycarbonate panel 10 and nylon rope linear tie 22 can rock from end to end and is useful, for example, as a lounger, which can be stored flat when not in use.

Figure 5F:
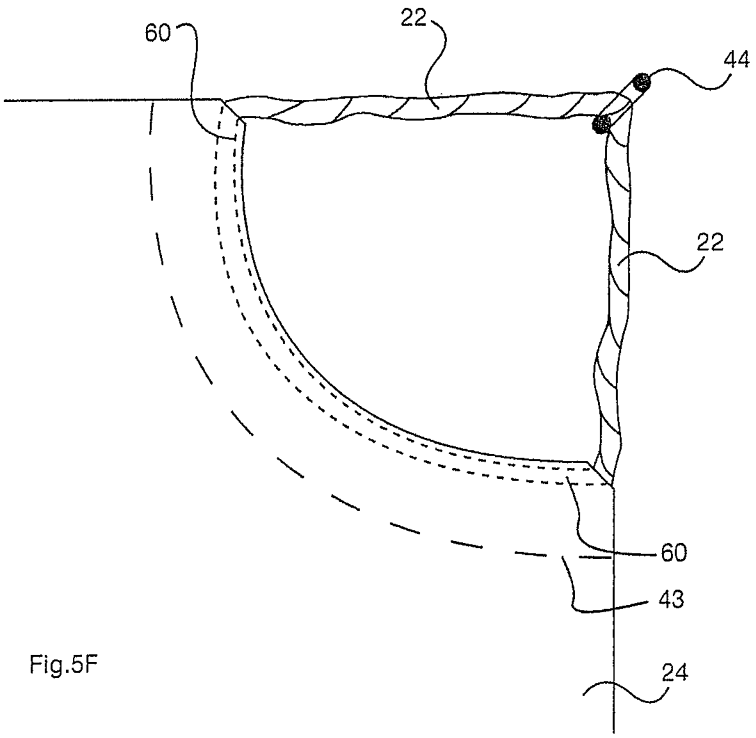
FIG. 5F is a plan of a linear connector at the corner of a membrane tie.
Figure 5G:
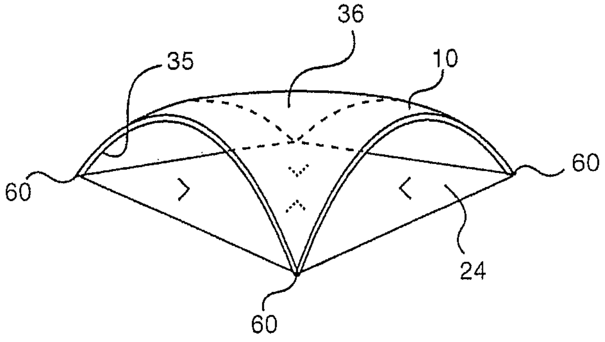
FIG. 5G is a perspective of a reverse flexed panel assembly of FIG. 5E.

FIGS. 5A-D illustrate a sequence of flexure and restraint of panel 10. The resulting vault-like structure "springs" from the four corners of membrane tie 24, illustrated in perspective in FIG. 5E. In such embodiments in which a panel 10 and a membrane tie 24 are only connected at their corners there is typically a loop or ring linear connector 60 as illustrated in FIG. 5F. The linear connector 60, is typically a cable 22 within an edge seam 43 of membrane tie 24, connected to the panel, for example by means of ring 44 passing through a hole near the corner of the panel (not shown), the hole being optionally reinforced. The ring is optionally openable to enable the reverse flexed panel assembly of FIG. 5G. Such structures are useful in forming canopies or roofs to enclosures, for example having a polycarbonate or plywood flexed panel and a Teflon or pvc-coated polyester fabric membrane tie. Such two-layer canopy or roof constructions offer environmental advantages, for example the gap between allowing cooling air to pass between the panel and membrane tie, so reducing solar heating of the protected space below. In smaller embodiments, the corners of the panel can simply be restrained within the linear connector loops at the corners of the membrane tie, for example as a protection device for objects placed on the membrane tie, for example food or fragile objects.

Figure 6A:
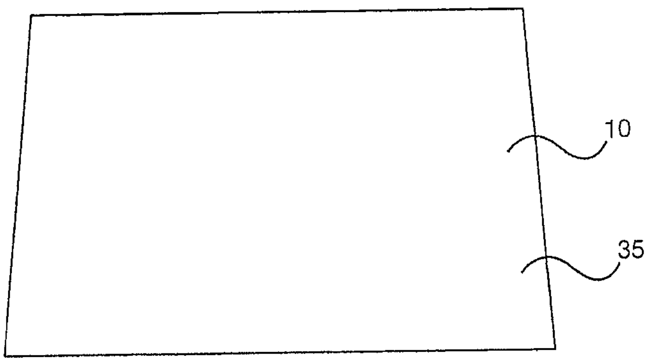
FIG. 6A is a plan of a trapezium panel with two opposing, sloping edges.
Figure 6B:
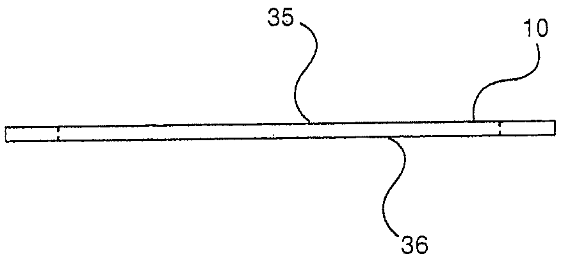
FIG. 6B is an edge elevation of the panel of FIG. 6A.
Figure 6C:
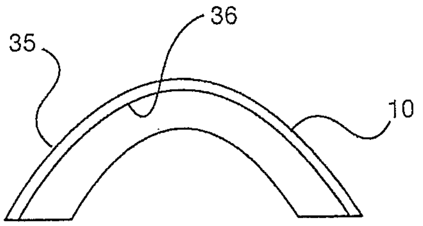
FIG. 6C is an elevation of a flexed panel of FIG. 6A.
Figure 6D:
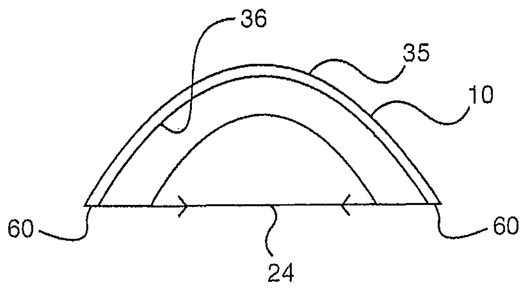
FIG. 6D is a tied, flexed panel of FIG. 6A.
Figure 6E:
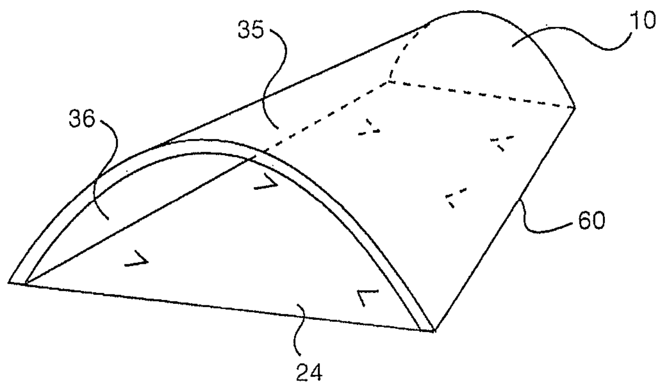
FIG. 6E is a perspective of an assembly with a trapezium panel.
Figure 6F:
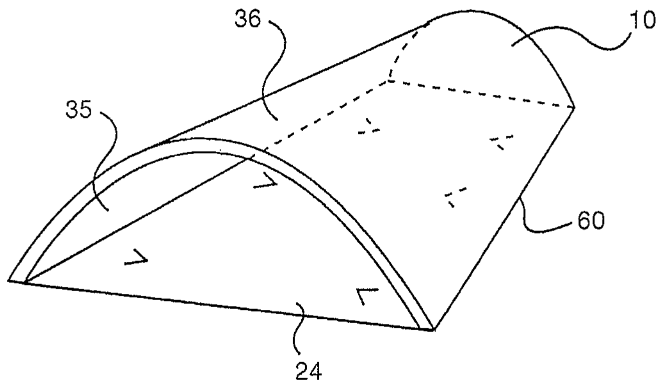
FIG. 6F is a perspective of a reverse flexed panel assembly with a trapezium panel.
Figure 6G:
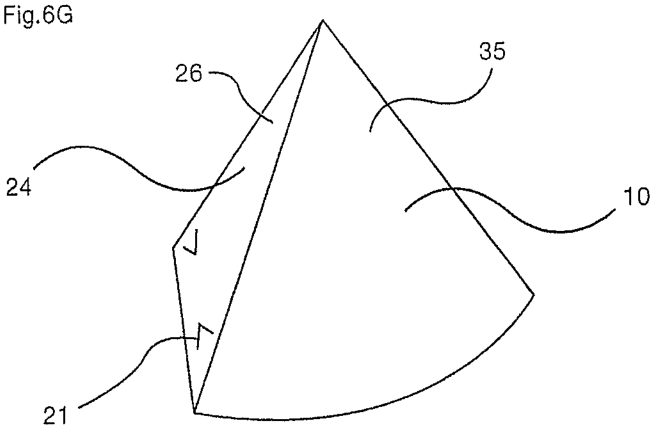
FIG. 6G is a perspective of an assembly comprising a triangular membrane tie and a conically-surfaced, flexed panel.
Figure 6H:
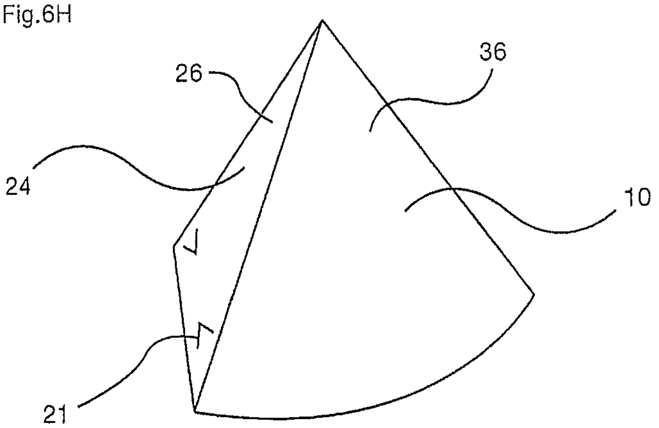
FIG. 6 H is a perspective of a reverse flexed panel assembly comprising a triangular membrane tie and a conically-surfaced, flexed panel.

FIGS. 6A-E are similar to FIGS. 2A-E except that the panel 10 is a trapezium, resulting in a conical surface to the panel and the open ends of the flexed panel being of different size, as illustrated in FIG. 6E. FIG. 6F illustrates the reverse flexed panel assembly of FIG. 6E. FIG. 6G illustrates another type of conical surfaced panel 10 combined with triangular membrane tie 24, for example typically a membrane tie display sign 26, tensioned in the direction of arrow heads 21. FIG. 6H is a reverse flexed panel assembly of FIG. 6G.

Figure 7A:
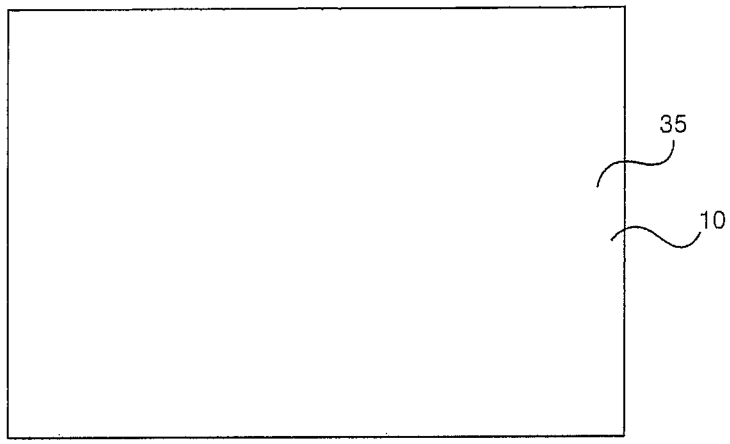
FIG. 7A is a plan of a panel.
Figure 7B:
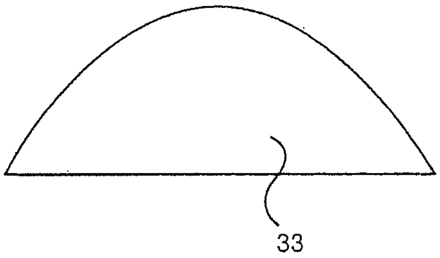
FIG. 7B is an elevation of a web tie.
Figure 7C:
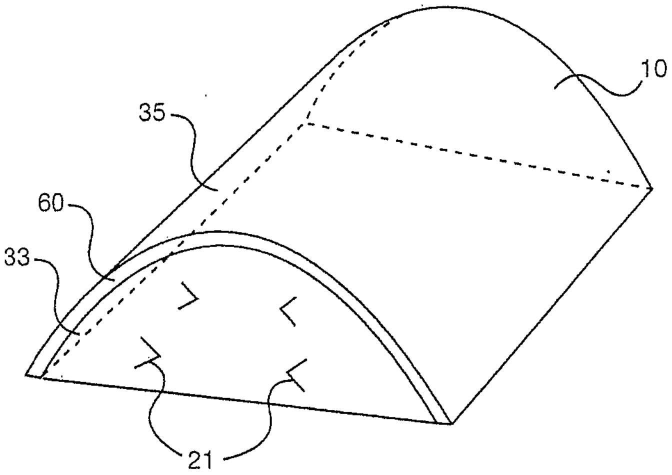
FIG. 7C is a perspective of an assembly comprising a web tie.
Figure 7D:
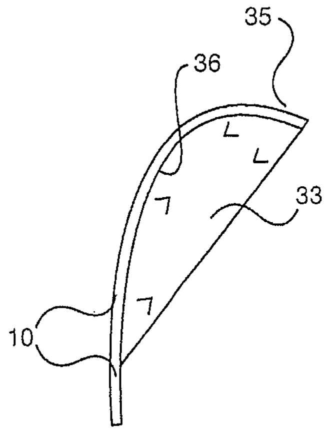
FIG. 7D is an elevation of an assembly with a web tie.
Figure 7E:
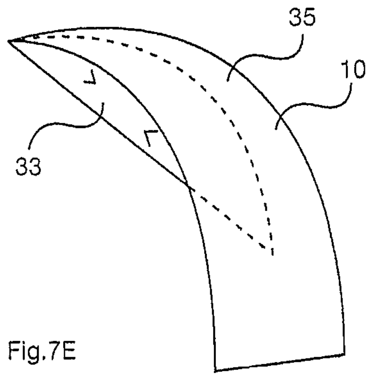
FIG. 7E is a perspective of the assembly of FIG. 7D.
Figure 7F:
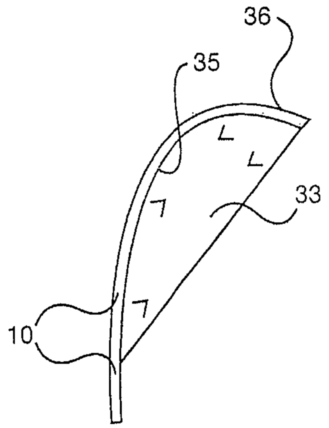
FIG. 7F is an elevation of a reverse flexed panel assembly with a web tie.
Figure 7G:
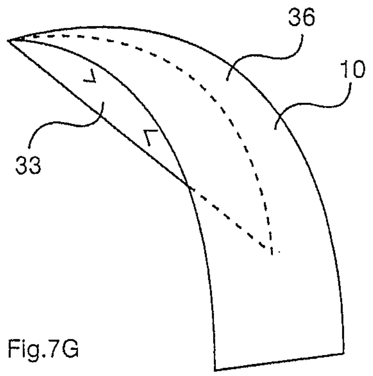
FIG. 7G is a perspective of the assembly of FIG. 7F.

FIG. 7A is a plan of a rectangular panel 10 and FIG. 7B is an elevation of a web tie 33, the curved side of which is joined by linear connector 60 to an edge of panel 10, as illustrated in the assembly of FIG. 7C, which has another web tie 33 at the opposite edge of panel 10 (not shown). Arrow heads 21 indicate the tension in the web tie, which restrains the panel in its flexurally deformed geometry. FIG. 7D illustrates flexed panel 10 restrained by web tie 33 in an assembly that would typically be supported at its base to form a display device or directional sign, shown in perspective in FIG. 7E. The direction of curvature of panel 10 is reversible, as indicated by the reversal of principal surfaces 35 and 36 in the elevation of FIG. 7F and the perspective of FIG. 7G.

Figure 8D:
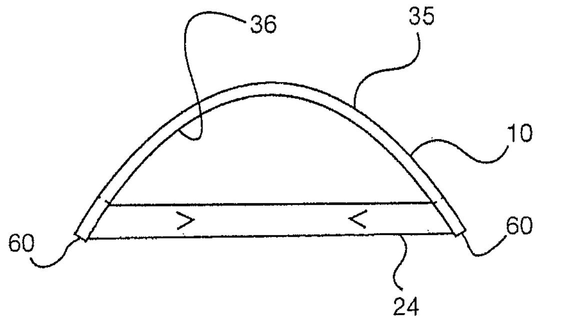
FIG. 8D is an elevation of an assembly comprising a panel with opposing curved edges.
Figure 8E:
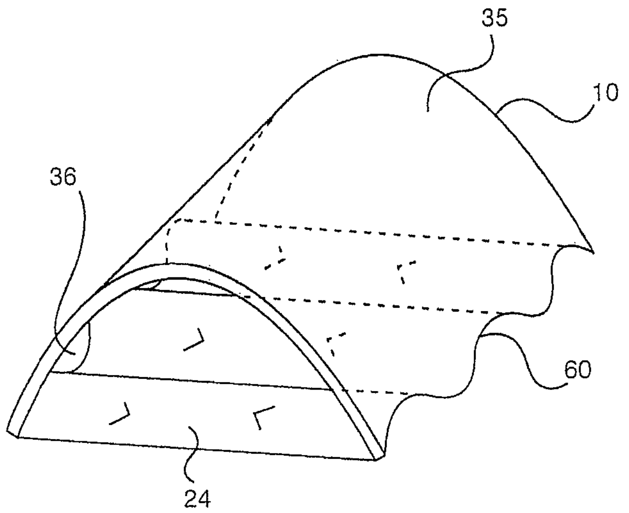
FIG. 8E is a perspective of an assembly comprising a panel with opposing curved edges.
Figure 8F:
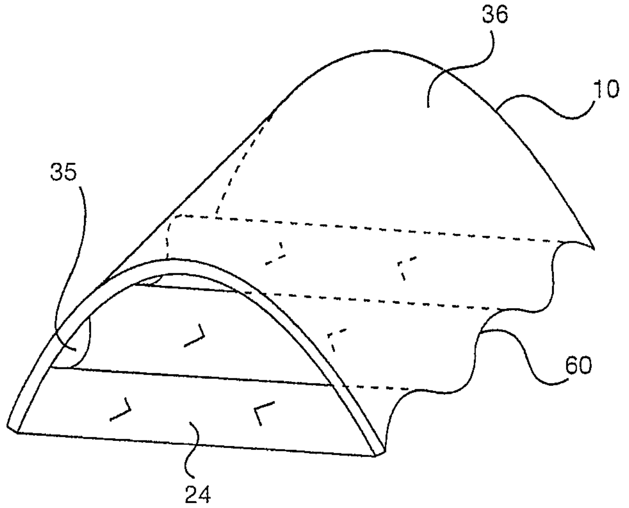
FIG. 8F is a perspective of a reverse flexed panel assembly comprising a panel with opposing curved edges.
Figure 8G:
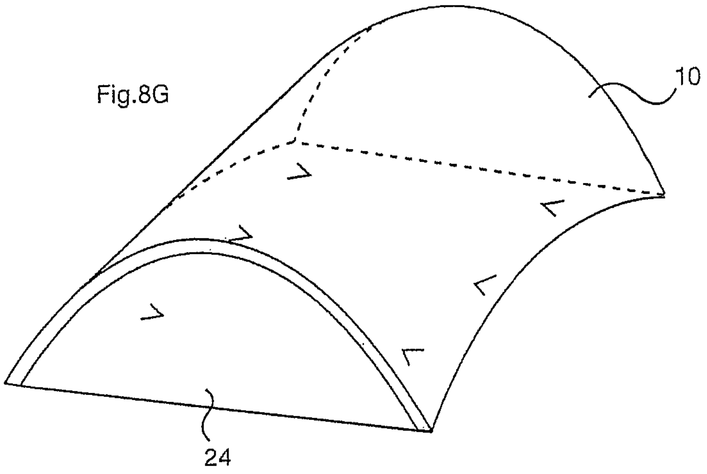
FIGS. 8G and H are perspectives of assemblies comprising a membrane tie of double curvature.
Figure 8H:
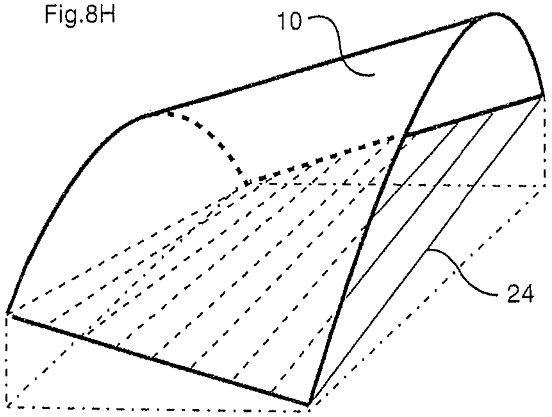
FIG. 8A is a plan of a panel with opposing curved edges.
FIG. 8B is an edge elevation of a panel with opposing curved edges.
FIG. 8C is an elevation of a flexed panel with opposing curved edges.

FIGS. 8A-E illustrate the assembly of a panel similar to FIGS. 2A-E except that opposing edges of panel 10 are curved in the form of a wave. Membrane tie 24 is also curved in an undulating, wave form, tying together the opposing curved edges of panel 10. FIG. 8F is a reverse flexed panel assembly of FIG. 8E. FIG. 8G illustrates a panel 10 with a single inward curve on opposing edges, resulting in a structure with a vaulted panel 10 curved in one direction and a vaulted membrane tie 24, curved in the perpendicular direction. Such a structure may be used as a roof. FIG. 8H illustrates a panel 10 in the form of a parallelogram flexed about an axis perpendicular to two parallel edges until it is rectangular on plan, requiring a membrane tie 24 of double curvature, for example comprising a membrane tie fabricated from strips in a cutting pattern to achieve the required double curvature. Cutting patterns to create double curvature membrane ties can be created using the same methods as prior art sail-making and tensile structure fabrication. Suitable fabric materials for larger assemblies, for example for roof systems, include pvc-coated polyester or Teflon®-coated polyester fabric. The flexed panel can be of any suitable plastic, timber, metal or composite material.

Figure 9A:
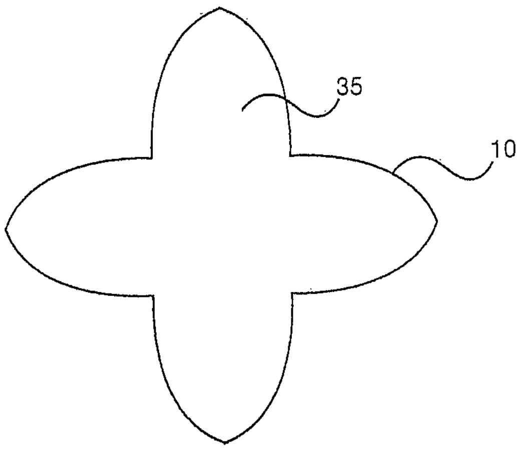
FIG. 9A is a plan of a petaloid panel.
Figure 9B:
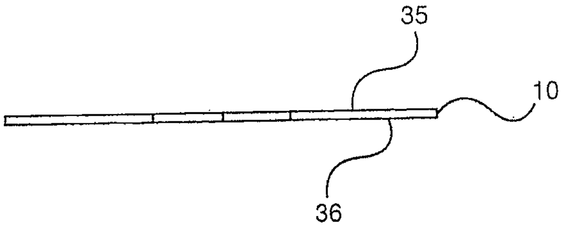
FIG. 9B is an edge elevation of a petaloid panel.
Figure 9C:
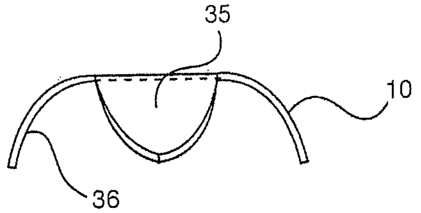
FIG. 9C is an elevation showing flexed panel "petals".
Figure 9D:
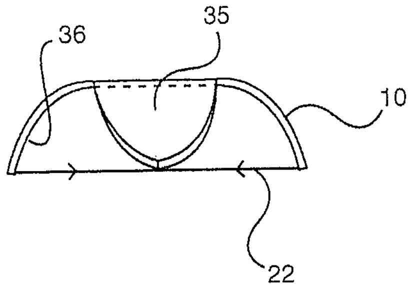
FIG. 9D is an elevation showing a flexurally deformed petaloid panel with linear ties.
Figure 9E:
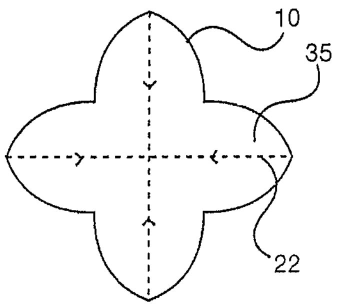
FIG. 9E is a plan of the assembly of FIG. 9D.
Figure 9F:
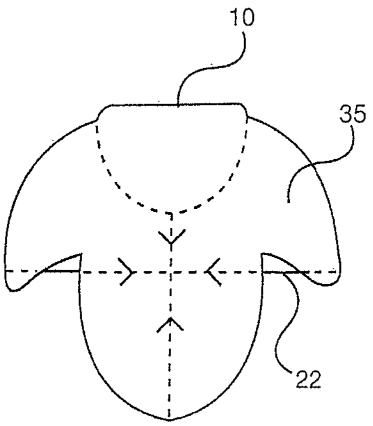
FIG. 9F is a perspective of the assembly of FIG. 9D.
Figure 9G:
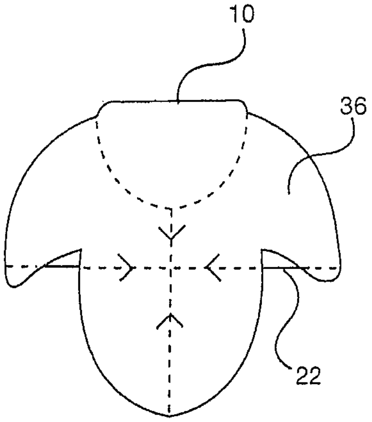
FIG. 9G is a perspective of a reverse flexed panel assembly of FIG. 9D

FIGS. 9A and 9B are a plan and edge elevation view of petaloid panel 10. FIG. 9C illustrates the "petals" of panel 10 flexurally deformed, their ends being tied with linear tie rods 22, as illustrated in FIGS. 9D-F. FIG. 9G is a reverse flexed panel assembly of FIG. 9F. Optionally such an assembly forms an intermediate panel geometry before installing a membrane tie as shown in FIG. 10D, resulting in the flexurally deformed, tied panel assembly of FIGS. 10E and F.

Figure 10A:
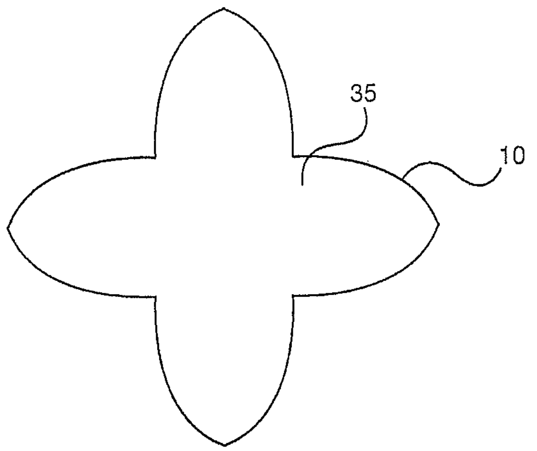
FIG. 10A is a petaloid panel.
Figure 10B:
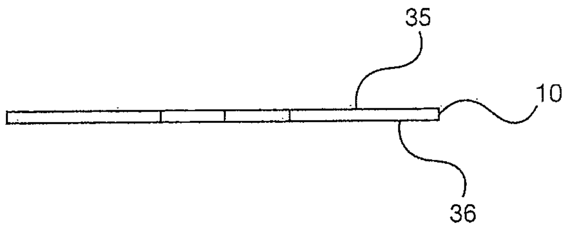
FIG. 10B is an edge elevation of a petaloid panel.
Figure 10C:
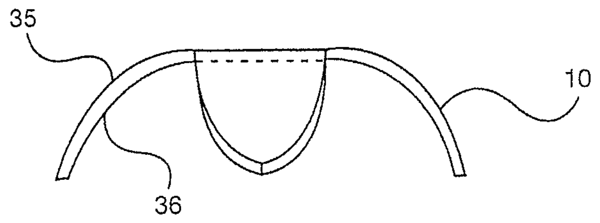
FIG. 10C is an elevation showing flexed panel "petals".
Figure 10D:
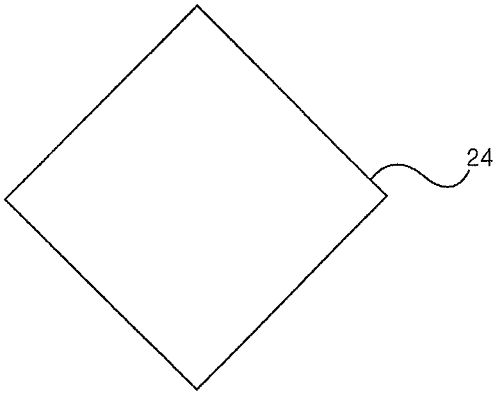
FIG. 10 D is a plan of a membrane tie.
FIG. 10G is a plan of a reverse flexed panel assembly.
Figure 10E:
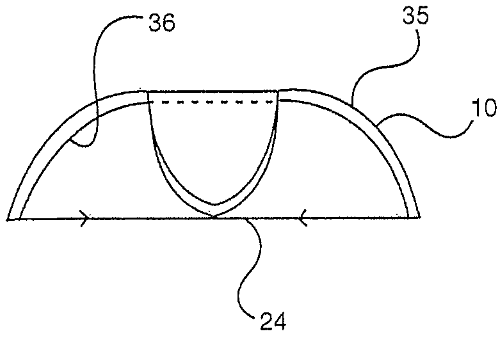
Figure 10F:
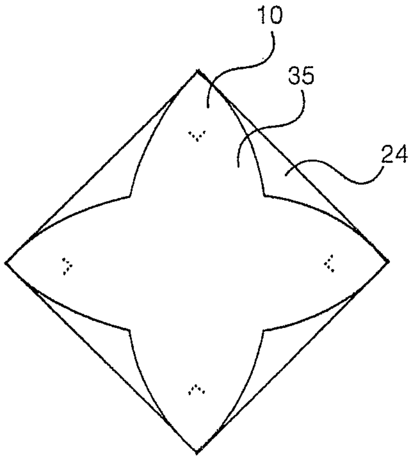
Figure 10G:
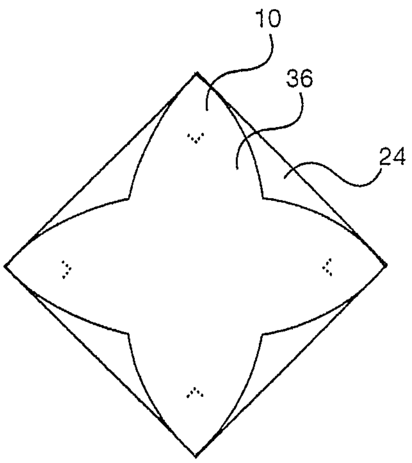

FIGS. 10A-C illustrate a similar petaloid panel 10 to FIGS. 9A-C but flexed and held without the use of linear ties before being connected by the square membrane tie 24 of FIG. 10D, as also illustrated in FIGS. 10E and F. FIG. 10G is a reverse flexed panel assembly of FIG. 10F.

Figure 11A:
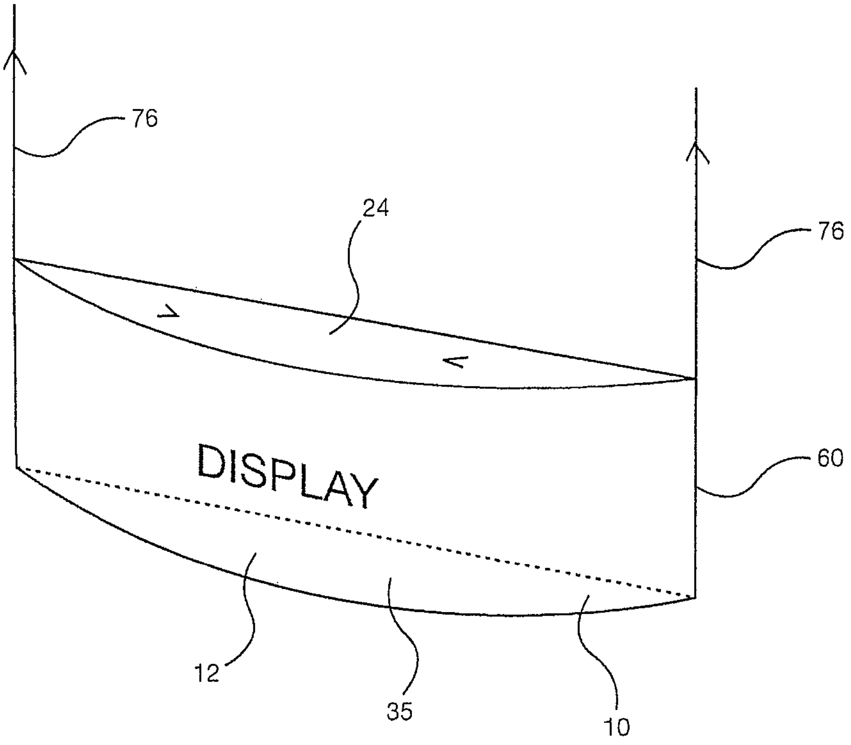
FIG. 11A is a perspective of a suspended assembly.
Figure 11B:
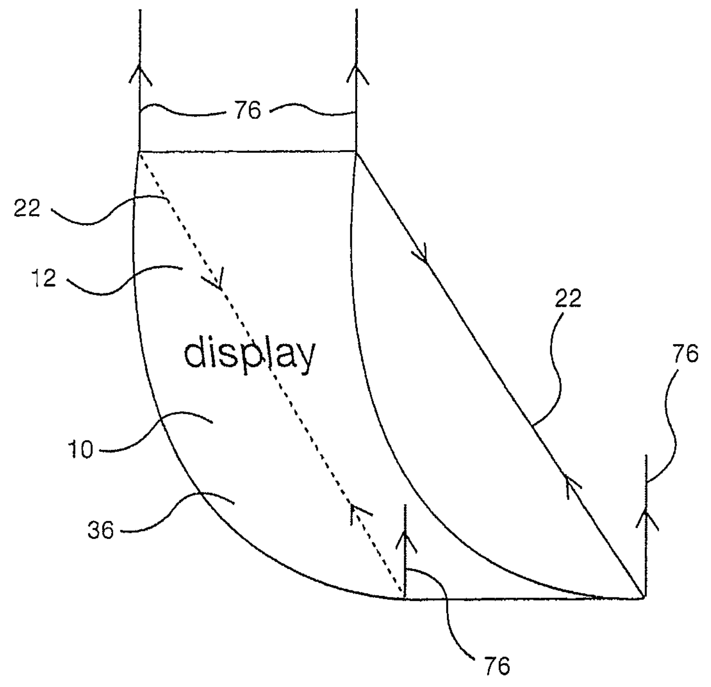
FIG. 11B is a perspective of a reverse flexed panel assembly of FIG. 11A suspended in a different manner.
Figure 11C:
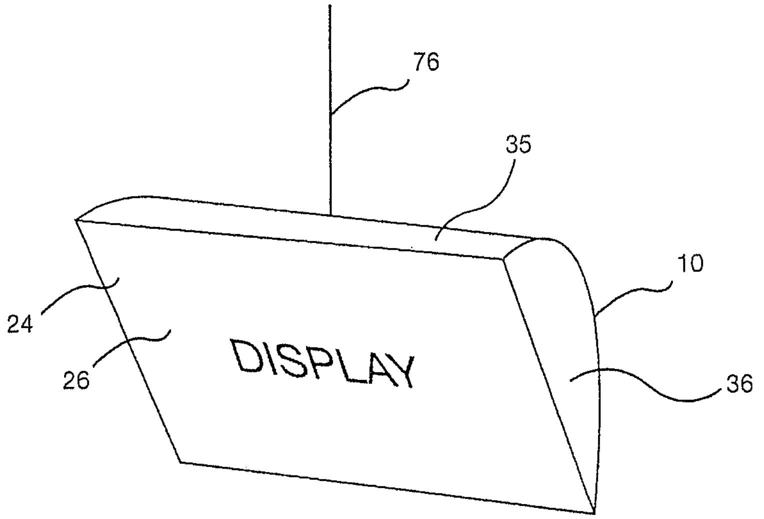
FIG. 11C is a perspective of a suspended assembly comprising a membrane tie display sign.
Figure 11D:
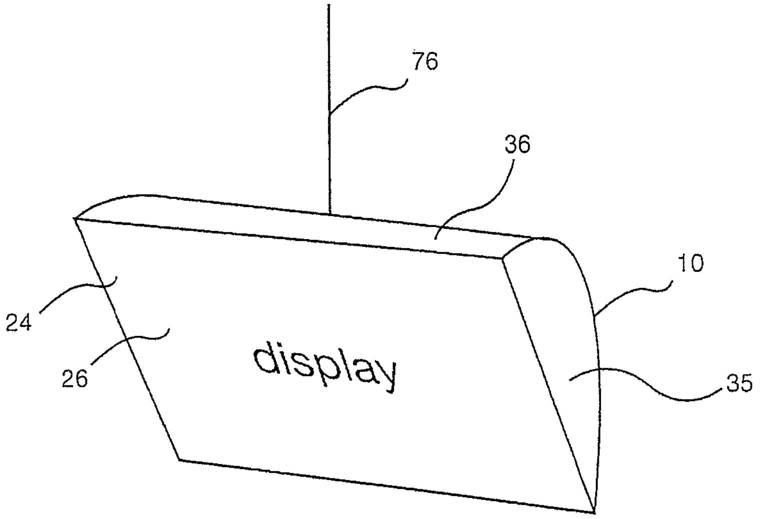
FIG. 11D is a perspective of a suspended reverse flexed panel assembly with another membrane tie display sign.
Figure 11E:
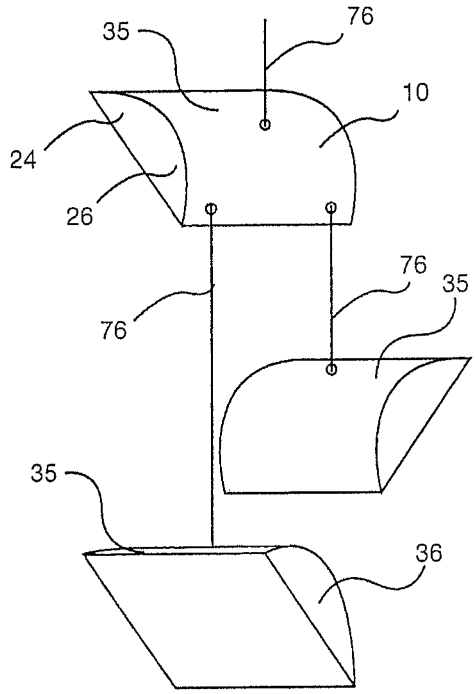
FIG. 11E is a perspective of a "mobile" comprising three assemblies.
Figure 11F:
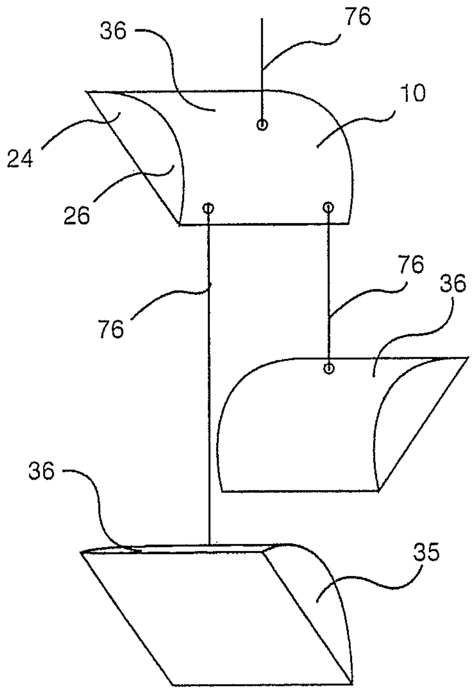

FIGS. 11A-F illustrate suspended assemblies. In FIG. 11A, an assembly comprising panel display sign 12 and membrane tie 24 is suspended by two suspension cables 76. The display is printed or otherwise applied to principal surface 35 and the panel is reversible to be used in conjunction with the same or a different membrane tie 24 or different configuration, for example with two linear ties and four suspension cables, as illustrated in FIG. 11B. Suspended membrane tie displays may be orientated to any angle to suit observers below by suitable positioning of a suspension cable 76, as illustrated in FIG. 11C. The membrane tie display sign 26 is changeable and the panel 10 reversible, as illustrated in FIG. 11D. Mobiles may be created from a plurality of suspended assemblies, a mobile comprising three assemblies and three suspension threads 76 being illustrated in FIG. 11E. The size of the mobile can be increased to say 5 or even 7 or more of such assemblies, all suspended from a single top suspension thread. Such mobiles have many potential applications, for example the membrane tie display panels may be family photographs suspended over a child's cot or a selection of postcards purchased from a museum. The flexed panels are typically transparent plastic, with or without one or two edge stiffeners, typically attached to the membrane tie 24 by one of the details illustrated in FIGS. 21D-22P.

Figure 12A:
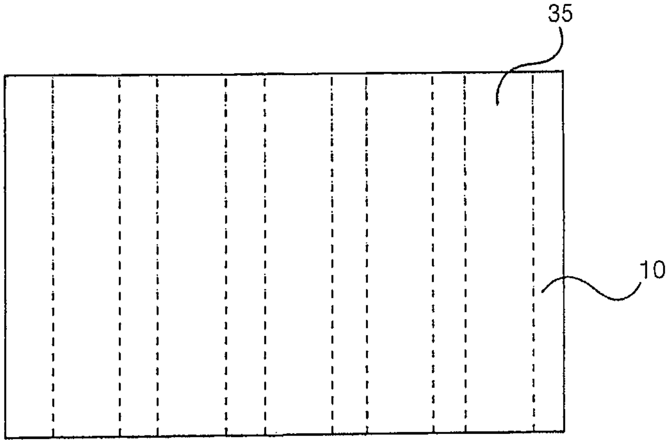
Figure 12B:
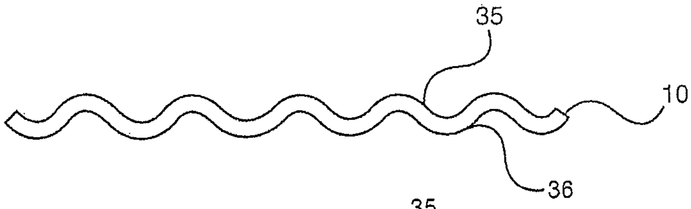
Figure 12C:
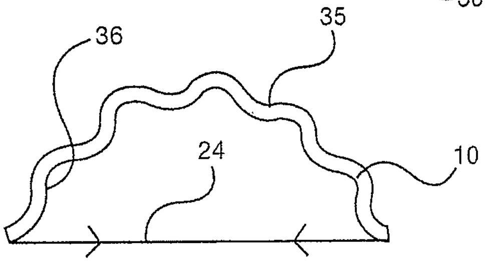
Figure 12D:
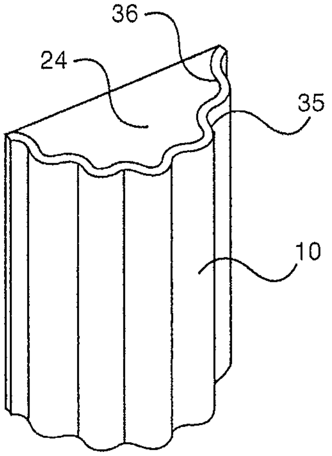
Figure 12E:
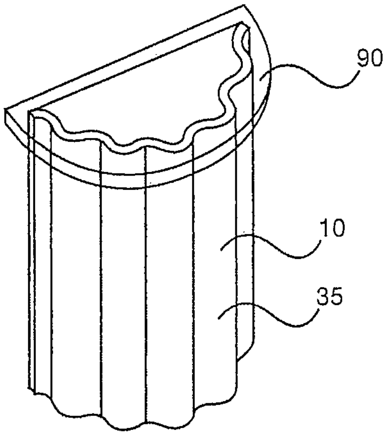
Figure 12F:
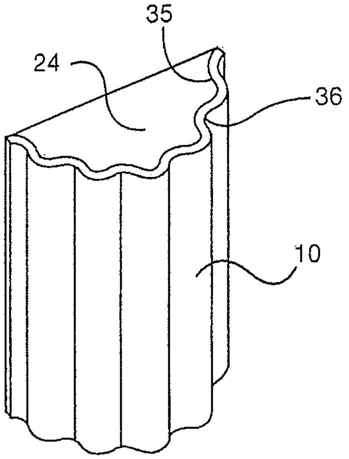
Figure 12G:
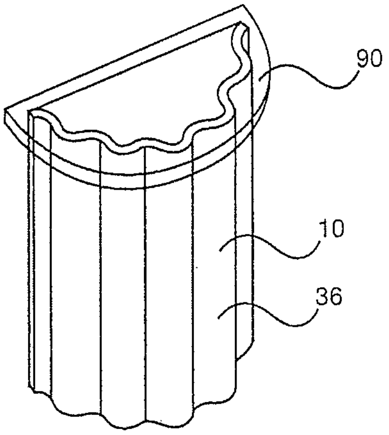

FIGS. 12A-D illustrate the use of a corrugated panel 10, flexed about an axis parallel to the direction of the corrugations, the ease of bending being similar to a plane panel of the same thickness, with membrane tie 24 restraining the flexed, corrugated panel 10. Such assemblies are particularly strong in resisting superimposed loading in the direction of the corrugations, for example gravitational loading if the assembly is orientated with the corrugations vertical, for example to form a table with top 90, as illustrated in FIG. 12 E. Corrugated panels can also be flexed about an axis perpendicular to the direction of corrugations, in which assemblies of much greater lengths of flexed panel 10 and membrane tie 21 can be achieved for a particular thickness of corrugated panel, for example in shelters such as bus shelters. The corrugated panel material is selected to suit the particular application, for example thin corrugated acrylic would be appropriate for a table application, in conjunction with an acrylic membrane tie and, for example, extruded corrugated polycarbonate would be suitable for a roof canopy of say 5 to 10 meters span. FIG. 12F is a reverse flexed panel assembly of FIG. 12D shown with table top 50 in FIG. 12G.

Another embodiment of the invention does not comprise a separate linear connector but a panel is restrained in its flexurally deformed geometry within a tubular membrane tie. The tubular membrane tie is plane and in tension between two remote edges of the panel. The term tubular membrane tie includes a tube of seamed or seamless flexible material, for example a plastic film or a fabric or a net or a perforated film material. The tubular membrane tie has two ends and preferably the panel is located entirely within the length of the tubular membrane between the two open ends of the tubular membrane. Optionally, one end of the tubular membrane is sealed to form a bag and, optionally, the other end of the tubular membrane is also sealed, for example for packaging a product. The tubular membrane or bag is sealed, for example by adhesive, hot welding or a manual or mechanical sealing device, for example InnoSeal, supplied by InnoSeal Systems, Inc. US.

Some other embodiments of the invention use flexible film bags as a tubular membrane tie. A panel is flexed to an intermediate panel geometry, to enable it to be inserted into the bag, whereupon it is released to press against the inside of the bag in its intended flexurally deformed panel geometry, maintaining the bag in an open condition, prior to any required filling and optional sealing of the bag. Preferably, part of the open end of the bag extends beyond the extremities of the panel to maintain the bag in a substantially fixed geometry and reduce the likelihood of the top of the bag slipping down the panel.

FIGS. 13A-F illustrate an embodiment in which tubular membrane tie 27 restrains flexed panel 10. The plane panel 10 of FIGS. 13A and 13B is flexurally deformed as illustrated in FIG. 13C and inserted within the flexible tubular membrane tie 27 diagrammatically represented in FIG. 13D, the intermediate flexural geometry of FIG. 28C being relaxed into the final, flexurally deformed geometry of FIG. 13E in which tubular membrane tie 27 is stretched between opposing edges of panel 10, as further illustrated diagrammatically in cross-section in FIG. 13F. In FIG. 13F, for clarity, tubular membrane tie 27 is shown separate to panel 10, whereas in reality they will be in intimate contact, as shown diagrammatically in the cross-section of FIG. 13G. In the assembly of FIG. 13G, the part of the tubular membrane tie 27 which is not plane and tensioned between two opposing edges of panel 10 transfers the tensile force in the plane portion of the tubular membrane 27 by friction to the edges and outer principal surface 35 of panel 10, as indicated by the opposing arrow signs 21. Depending on the Coefficient of Friction between the outer principal surface 35 of panel 10 and the inner surface of tubular membrane tie 27, there may be residual tension in the tubular membrane tie 27 at the crown 15 of panel 10.

These embodiments having a tubular tie have many practical applications, for example in the display system of FIG. 13H in which tubular membrane tie 27 comprises display sign 26, for example a printed fabric tube, tensioned around a flexurally deformed panel, for example of acrylic or polycarbonate. FIG. 13J is a reverse flexed panel assembly of FIG. 13H, with another tubular membrane tie 27 and another display sign 26. Typically the panel 10 would remain in one location, for example a retail store, and be reversed in its direction of curvature with each change of tubular membrane tie display sign.

The improved windsock of FIGS. 13K-N, comprising a panel 10 with tapered sides, for example of polycarbonate, as shown in FIG. 13K, and a flexible tubular membrane, for example of polyester fabric, of tapered diameter, as shown in FIG. 13L. The windsock is assembled as shown in FIG. 13M with the flexed, tapered panel 10 maintaining open the tapered tubular membrane tie, which is suspended from a pole with a projecting arm which is easily rotatable in the horizontal axis to indicate wind direction, as illustrated in FIG. 13N. The windsock is suspended such that the flexed panel is at the bottom of the stiffened tube and the strength of the wind or wind speed is indicated by the angle of the windsock, the wind gaining more "purchase" against the upper plane surface of the tube and the stable geometry providing more stable and consistent indications of wind direction and speed than prior art windsocks. The tapered panel 10 is reversed from time to time to renew the structural strength of the windsock assembly.

FIGS. 13P-R illustrate a packaging application of an assembly comprising flexurally deformed panel 10, for example, of biodegradable PLA (Polylactic Acid), semi-rigid sheet, within packaging film tubular membrane tie 27, for example of polyethylene film, which is sealed at each end by prior art "bag tie" 8. The panel 10 is re-usable after suitable cleaning and its direction of curvature in any subsequent re-use is typically opposite to the curvature of the residual panel geometry at the time of re-use.

FIG. 13S is a cross-section through an edge-lit panel display system comprising an edge-lit sign profile 102 which seals in light source 92 along one or two edges of flexurally deformed panel 10, such that the illumination emanating from light source 92 is directed into the edge or edges of panel 10, whereupon it is internally reflected along the inside of panel 10, a known phenomenon. Edge-lit sign profile 102 is optionally a symmetrical reversible panel edge stiffener. Panel 10 optionally comprises a sign, for example of routed, etched or printed indicia, which scatters intercepted internally reflected light, so that the indicia are illuminated to one or both sides of the panel. The flexed edge-lit panel 10 is optionally restrained by tubular membrane tie 27, for example of transparent plastic film, alternatively by a simple membrane tie or a plurality of linear ties, for example connecting two edge-lit sign profiles 102, for example instead of the linear connector profile 60 illustrated in FIG. 23A. Alternatively, the flexed edge-lit panel 10 provides a relatively uniform light source to illuminate optional panel display sign 12 and/or optional display sign 26. Tubular membrane tie 27 is shown diagrammatically separate to panel 10 and edge-lit profile 102, whereas in reality they would be in intimate contact as shown diagrammatically in the perspective of FIG. 13U. The direction of curvature of the flexed edge-lit panel can be reversed, as illustrated in FIG. 13T and the reverse flexed panel assembly in FIG. 13V. The display sign or signing can be periodically changed. Another type of backlit sign is illustrated in the embodiment of diagrammatic cross-section FIG. 13W, in which an internal light source 92, for example a vertical fluorescent tube, illuminates a panel display sign 12, which may be changed and the panel 10 curvature revised, as illustrated in FIG. 13X.

It is often advantageous to accurately align one position in any cross-section of a tubular membrane tie, for example a sewn seam in a fabric tube or an adhesive or welded seam in a filmic tube, to a position in the flexed panel, for example one of the opposing edges restrained by the tubular membrane tie. FIG. 13Y is a diagrammatic cross-section through the edge of a flexed panel 10, showing a rectangular or "flat" section 57, for example of plastic or rubber, fixed to a tubular membrane tie 27, for example at a sewn seam by means of thread 123. Thus, for example, a tubular membrane tie display sign 26 can be accurately located on the desired plane surface of the assembly. A linear connector 60 can positively locate the tubular membrane tie 27, as shown diagrammatically in FIG. 13Z by a channel-shaped linear connector, for example of plastic, adhered, sewn or welded (none shown) to the tubular membrane tie, typically at a seam in the tubular membrane tie 27.

FIGS. 13AA, 13BB and 13CC illustrate example reversible panel edge stiffeners 112 which provide compressive strength along the tied edges of panel 10. Tubular membrane tie 27, for example of fabric, while tensioned perpendicular to the tied edges, may exhibit a complementary tendency to bunch up in the direction parallel to the tied edges. Optionally the membrane tie is restrained at each end of the tied edges, for example by means of discrete fixing 115, for example of two sided self-adhesive tape or a hook seen as attached to the tubular membrane tie 27 and engaged into the ends of a reversible panel edge stiffener 102, for example a split plastic tube 113, as illustrated in FIG. 13AA, or a profile stiffener 114, for example of extruded plastic or aluminum, as shown in FIG. 13BB. This arrangement stretches the fabric along the length of the tied panel edges, as illustrated in FIG. 13 CC. Optionally, one or more positions of orthogonal tensioning of a tubular membrane tie 27 can be provided along the length of the untied edges of the panel, for example by means of elastic tape 116 sewn to the top and bottom of the tubular membrane tie 27 and located and tensioned inside the panel 10, as illustrated in FIG. 13DD and FIG. 13EE. The configurations of FIGS. 13AA-EE all enable panel 10 to be reverse flexed to form a reverse flexed panel assembly of the same geometry as the initial assembly, for example each profile stiffener 114 being relocated on the opposite tied edge of panel 10 in the reverse flexed panel assembly. Optionally, a symmetrical reversible panel edge stiffener 112 can be fixed to the tied edges of panel 10, for example the split tube 113 in FIG. 13FF is shown welded or adhered by sealant or gap-filling adhesive 117 to panel 10. An advantage of the present invention is the ability to reversibly flex the panel 10 into a reverse flexed panel assembly while maintaining a display, for example an advertisement on a tubular membrane tie, facing outwards. It is thus possible to maintain a suitably high tension in a tubular membrane tie display indefinitely by repeated reversal of curvature of the panel 10. For example precalculation, testing or experience of a particular assembly construction will indicate that reversal of flexure is desirable after a particular elapsed time, for example one month or three months, and arrangements are made to reverse the flexure of the panel at such intervals, for example every one or three months, to maintain a suitably tensioned tubular membrane tie display. When a membrane tie display is changed, whether a plane membrane tie or a tubular membrane tie, the direction of curvature in the new assembly is preferably reversed from the residual panel curvature from the previous assembly. This counter-intuitive flexure of a panel is preferably advised in instructions provided on the panel itself to seek to ensure that the full benefits of the invention are realized. Where in FIGS. 13A-13FF the tubular membrane tie 27 is shown not to be in contact with the panel 10 or an edge member to the panel 10, for example a reversible panel edge stiffener 112, this is a diagrammatic representation for clarity purposes, whereas in use the tubular membrane tie is typically in direct contact with the panel 10 or the edge member.

FIGS. 14A-E illustrate a simple form of trash bin according to an embodiment of the present invention. Panel 10 in FIGS. 14A and B, preferably with rounded corners, is temporarily flexed and inserted into the plastic bag 28, optionally with flaps 30 (see FIG. 14C), as shown diagrammatically in FIG. 29L. The panel 10 is then released with the top of the bag 28 or optionally just flaps 30 placed inwards, as shown in FIG. 14E, for example creating a light, stable trash bin which is easily emptied or the bag and contents removed, preferably by taking out for optional re-use panel 10. The panel is reversible in curvature, as illustrated in FIG. 14F when inserting the panel 10 into a new bag the panel 10 is typically flexed in the opposite direction of curvature to any residual curvature at that point in time, for maximum efficiency in maintaining an open, stable assembly. A large number of such trash bins can be stored and transported flat, for example to and from sports or other entertainment events, much more effectively and less costly than prior art trash bins. For large bins or other containers according to one or more embodiments of the invention, for example large trash bins or storage containers or retail store bins containing products for sale, panel 10 is preferably a shaped panel 19, as illustrated in FIG. 14G, optionally with three projecting legs 51 for stability of the completed assembly and optionally with slots 20 to assist the initial temporary flexure of panel 10 and its insertion into bag 28, as illustrated in FIG. 14H, and the subsequent removal of panel 10 in order to replace bag 28. FIG. 14J is the reverse flexed panel assembly of FIG. 14H. The bin-bag assemblies of FIGS. 29E and H have a particular advantage over prior art trash and other bins which are circular or square or on plan in that the plane surface of tubular membrane bag 28 can be located against a wall, desk or other vertical surface, the assembly not projecting as far into otherwise useable space as much as cylindrical or cuboid prior art bins of the same height and volume. FIG. 14 illustrates bag 28 used for a packaging application, which only requires sealing at one end by "bag tie" 8. Such packaging applications, for example if transparent, allow visibility and spatial protection of the packaged goods, for example filled baguettes. Examples of tube or bag closure systems include zipper fasteners, bands or twist fasteners, clip ties, recloseable ties, drawstring closures, sealing, sewing and gluing. The panel 10, see inside optional bag 28, is re-useable and reversible in curvature.

FIGS. 15A-H illustrate embodiments comprising a plurality of panels. In FIG. 15A, panel 10 and second panel 11 are both tied by membrane tie 24, as illustrated in perspective in FIG. 15B. Such an assembly has many potential uses. For example, a building shelter in a hot climate according to FIG. 15B comprises an inner enclosure within second panel 11 and membrane tie 24 being protected from harsh sunlight by panel 10, the gap between panel 10 and membrane 11 for example remaining open, to allow ambient air movement to further mitigate solar heating of the internal enclosure between second panel 11 and planar tie 24. FIG. 15C is the reverse flexed panel assembly of FIG. 15B. FIGS. 15D and 15E illustrate an embodiment in which flexurally deformed panels 10 and 11 are deformed in an opposing relationship, both tied by membrane tie 24, for example to display and protect products on both sides of membrane tie 24. FIG. 15F is the reverse flexed panel assembly of FIG. 15E. FIG. 15 G illustrates another embodiment comprising two panels 10 and 11 which are spaced apart and both connected by a single membrane tie 24. For example such an assembly can form a sophisticated enclosure, the gap between flexurally deformed polycarbonate panels 10 and 11 forming a plenum 9 through which air can be circulated through a flexible end seal and air duct combined (not shown) which, optionally combined with solar reflective transparent panel 10 and/or 11, can achieve an environmentally controlled interior, suited for example as a garden office with membrane tie 24 acting as a ground sheet, for example with modular flooring above this waterproof membrane tie 24.

Figure 16G:
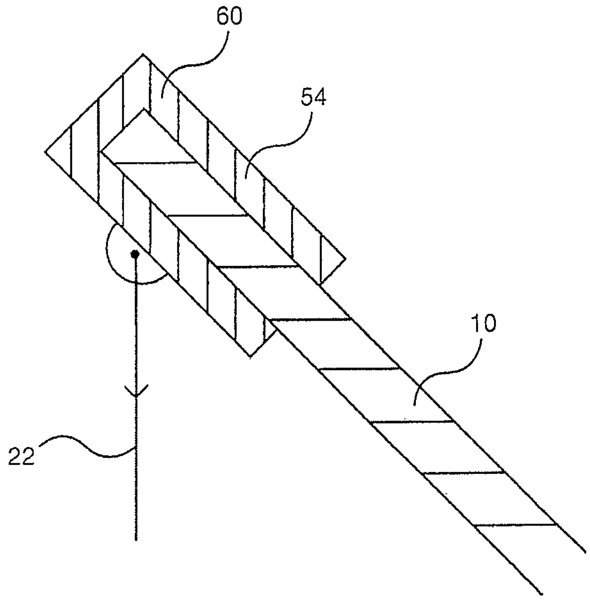
Figure 16H:
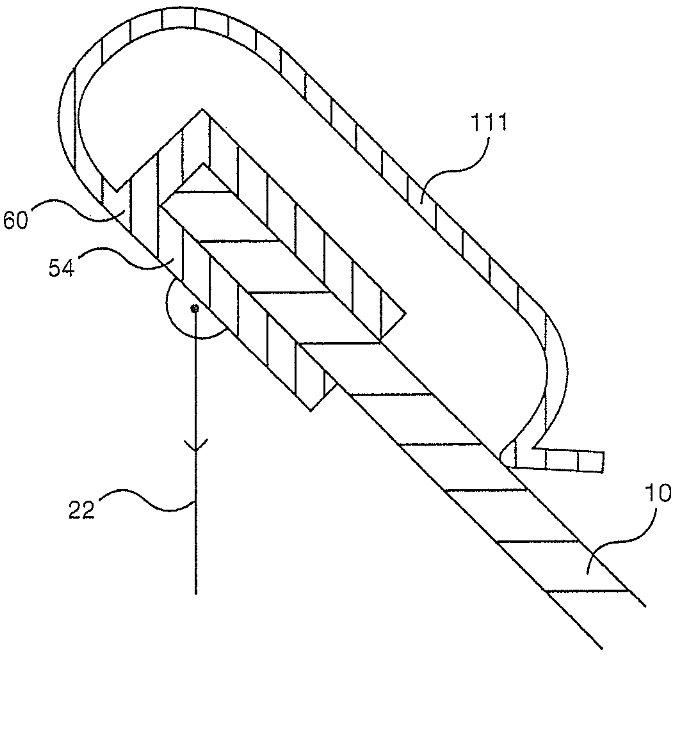
Figure 16J:
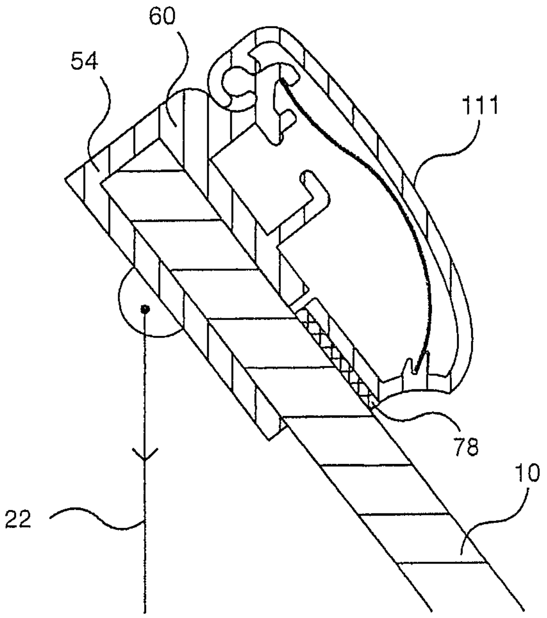
Figure 16K:
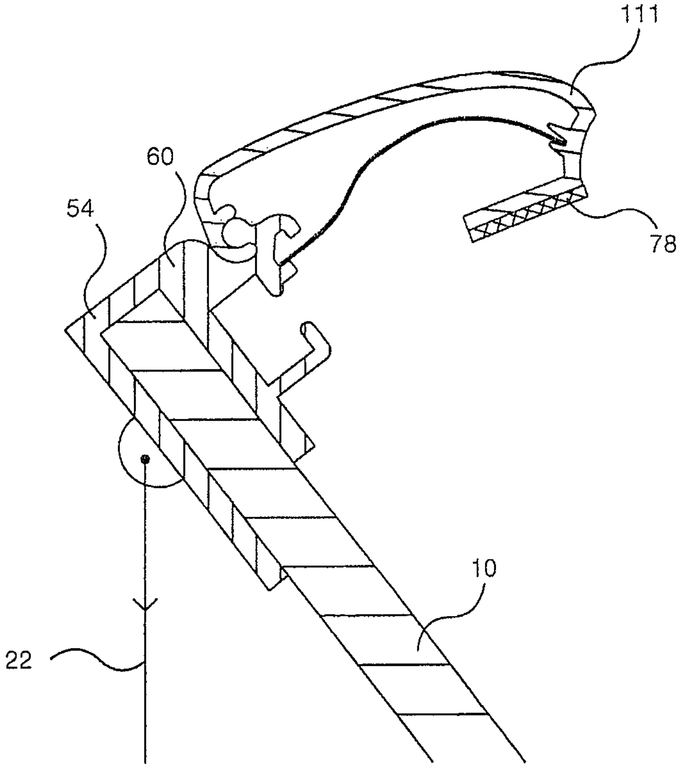

FIG. 16A is a cross-section of an assembly comprising a panel display sign 12, two linear ties and a spaced connector 49 in the form of base 18, shown in perspective in FIG. 16B. The flexed panel 10 is reversible, as shown in FIGS. 16C and D. FIG. 16E is similar to the embodiment of FIGS. 16A-D, except that there is a single tie 22 and a top member 54, the panel 10 also being reversible as illustrated in FIG. 16F. Such assemblies are appropriate, for example to hold menus or booking sheets at a restaurant or for general signage and display. Alternative forms of top member include a simple U-shaped profile, as illustrated in FIG. 16G, a U-shaped profile with a spring clip element 111 in FIG. 16H and a sprung clip 111, as illustrated in FIGS. 16J and K. Such top members would typically be principally formed of suitable aluminum profiles, the base 18 from steel, the linear tie 22 from thin wire cable and the panel of plastic, for example clear acrylic or polycarbonate sheet material.

FIGS. 17A-D illustrate related structures to FIGS. 2A-D but having a membrane tie 24 instead of a linear tie or ties. Flexurally deformed panel 10 is restrained by membrane tie 24, for example a membrane tie display sign 26, for example a printed film or fabric, which is tensioned between the linear connectors 60 of top member 54 and relatively heavy base 18, which forms a spaced connector 49 and provides the overall stability to the assembly. If panel 10 is transparent, for example a clear polycarbonate sheet, this assembly provides an attractive alternative to prior art display systems, as there are no vertical, sloping or bowed opaque structure elements, which is particularly advantageous in the case of a transparent or semi-transparent membrane tie display sign 26. The initially constructed assembly of FIGS. 17A and B is capable of being changed into the reverse flexed panel assembly of FIGS. 17C and 17D. FIG. 17E illustrates a similar construction but with a narrower panel 10 than the width of the membrane tie 24, top member 54 and base 18.

FIGS. 18A-J illustrate floor-mounted signs with typically two, optionally one linear ties. FIG. 18A is a perspective of a sign with a changeable message, for example two different safety messages with two linear ties with button point connectors 124 with a panel display sign 12 on the outer principal surface 35. FIG. 18B illustrates a reverse flexed panel assembly of FIG. 18A with another panel display sign 12 on the principal surface 36. FIG. 18C is of a similar assembly but with toggle ends to the linear connectors 22. FIGS. 18D-G are sequential cross-sections showing reversal of flexure of a floor-mounted sign with two linear ties with toggle point connectors. First toggle 121 shown in FIG. 18D is pushed through hole 75, as shown in FIG. 18E and pulled towards the concave principal surface 36 of the residual panel geometry following release of toggle 121, as shown in FIG. 13F. The direction of curvature is reversed, as shown in FIG. 18G to display another panel display sign 12 on principal surface 36, as illustrated in FIG. 18H. Such signs can be stored flat, for example hung in a storage cupboard or have a blank side on display when the warning or other sign is not required, as illustrated in FIG. 18J.

A linear tie 22 is optionally in the form of a linear tie loop 132, for example in a rectangular configuration of FIG. 18K, or a triangular configuration, for example of FIG. 18L or 18M, in each arrangement the panel 10 being reversible.

FIG. 19A illustrates a floor-mounted sign with a membrane tie 24 fixed by means of edge stiffening member 14 and an interlocking fixing system 69, for example of Velcro. FIG. 19C is a reverse flexed panel assembly of FIG. 19B, with another panel display sign 12 applied to principal surface 36, as illustrated in FIG. 19D. FIG. 19E illustrates a similar floor-mounted sign to FIG. 19A except that the membrane tie 24 is raised off the floor, as also shown in FIG. 19F and is also reversible as shown in FIGS. 19G and 19H. FIG. 19J is a plan of a panel for a floor-mounted sign with an integral, interlocking membrane tie, shown assembled in FIG. 19K. FIG. 19L is a plan of the reverse side 36 of the sign, shown with reversed curvature of the panel in FIG. 19M. FIG. 19N is a plan of another floor-mounted sign with an integral membrane tie, effected by slot 73 and a flap cut 74, the reverse side of which is shown in FIG. 19P. FIG. 19Q is of the panel 10 partially flexed and FIG. 19R of the underneath of the completed assembly, shown standing on a floor in FIG. 19S and with the panel 10 reversed in FIG. 19T. Floor-mounted signs according to one or more embodiments of the invention, for example according to any of FIGS. 18A-J or FIGS. 19A-T have several advantages over prior art warning signs, including public safety. For example, prior art moulded plastic conical or pyramidal or trestle signs with indicia such as "WET FLOOR" or "OUT OF SERVICE" are relatively heavy and constitute a trip hazard, whereas floor-mounted signs according to one or more embodiments of the invention are very light in comparison and would typically slide away if walked into by a person without providing sufficient resistance to cause the person to fall over. Additionally, floor-mounted signs according to one or more embodiments of the invention can provide two different signs by reversing the direction of flexure, which is not possible with the prior art signs.

FIGS. 19U and V illustrate a flat-packed tent-like enclosure comprising a flexed panel 10, for example of polycarbonate, ground sheet membrane tie 24, for example of reinforced pvc, adhered together on one side and with a suitably profiled linear connector on the other side, for example selected from one of the options in FIGS. 23A-24R, preferably fixed to the ground by tent pegs 83 and optional guy ropes 55.

FIGS. 20A and B illustrate an embodiment in which two identical oval shaped panels 10 can both be flexed and joined by linear connector 60 to form a three dimensional enclosure according to one or more embodiments of the invention in which each flexurally deformed panel 10 also acts as web tie 33 to the other panel, as illustrated in FIG. 20. The direction of curvature of both panels 10 is reversible as illustrated in FIG. 20C. The panels are optionally of thin plastic sheet and, for example, linear connector 60 is a zip enabling the embodiment to be used as a reversible container, for example, to hold personal effects, optionally of different color on the two principal surfaces of each panel.

FIG. 20D is a plan of a panel 10, flexed in FIG. 20E. FIG. 20F is an elevation of a web tie 33 and linear tie 22 combined. FIG. 20G is a perspective of an enclosure comprising two ends with combined web and linear ties as FIG. 20G, with a cut-out access flap 74 in one end. FIG. 20H is a perspective of a reverse flexed panel assembly of FIG. 20G.

FIGS. 21 A-D illustrate linear connectors 60 comprising a direct connection between a surface or surfaces of panel 10 and membrane tie 24. In FIG. 21A, membrane tie 24 is bonded to the edge of panel 10, for example by adhesive 61, and membrane tie 24 wraps around the side of panel 10. FIG. 21B is similar to FIG. 21A but the edge of the panel is formed into a smooth curve in cross-section. The width of linear connector 60 is optionally increased by the provision of an edge return or stiffener 14, as illustrated in FIG. 21C, for example by hot wire bending of an acrylic panel 10. The adhesive 61 is selected to suit the membrane tie 24 and panel 10 components being directly connected over an area of each of their surfaces, for example an acrylic-based, pressure-sensitive adhesive 61 could be used to connect a polyester film membrane tie 24 to an acrylic panel 10. FIG. 21D shows the membrane tie only adhered to the edge stiffener 14.

Figure 22C:
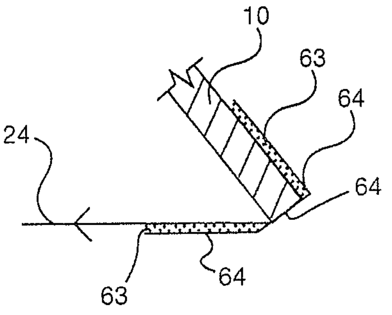
Figure 22D:
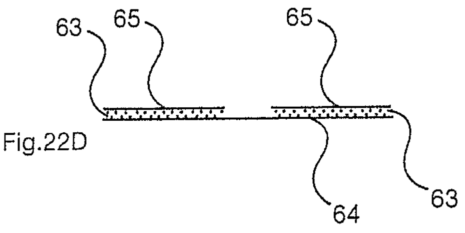
Figure 22E:
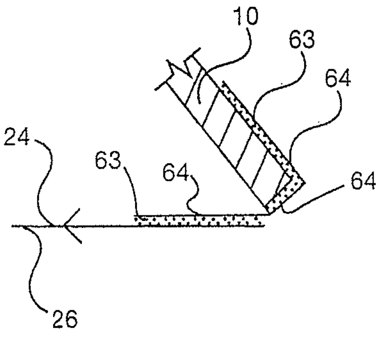
Figure 22F:
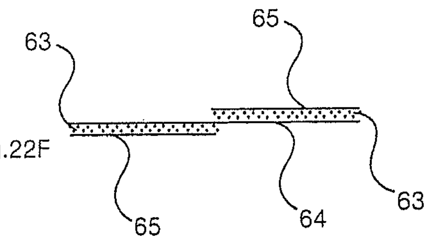
Figure 22G:
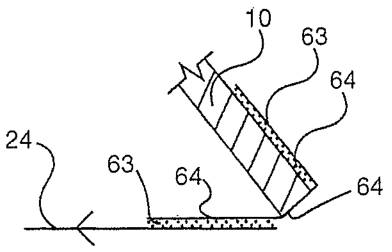
Figure 22H:
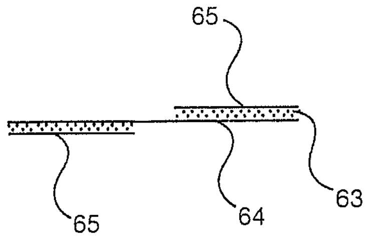
Figure 22J:
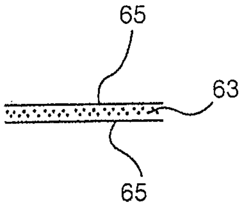
Figure 22K:
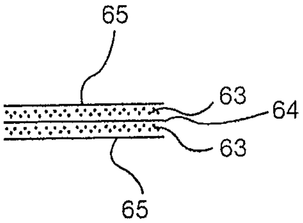
Figure 22L:
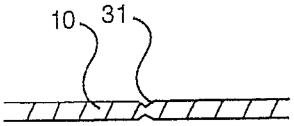
Figure 22M:
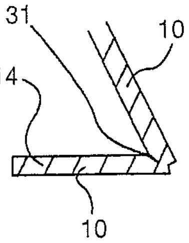
Figure 22N:
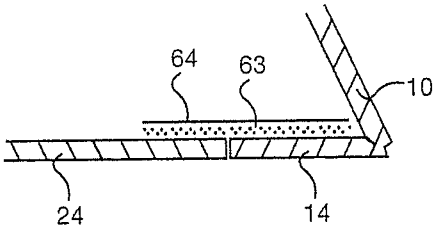
Figure 22P:
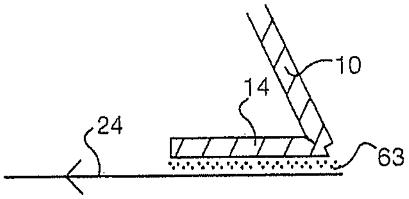
Figure 22Q:
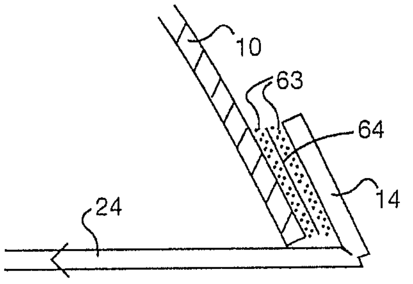
Figure 22R:
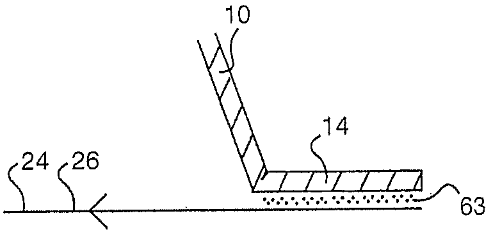
Figure 22S:
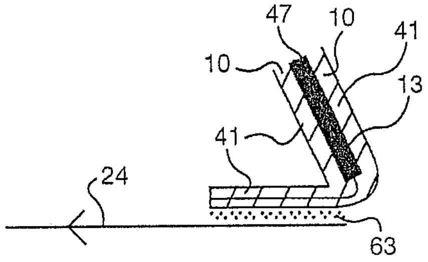
Figure 22T:
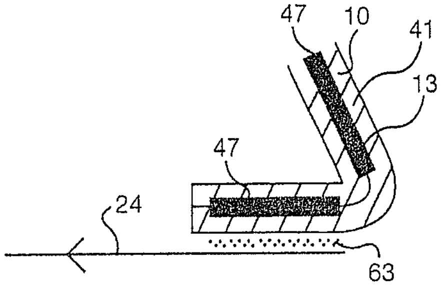
Figure 22U:
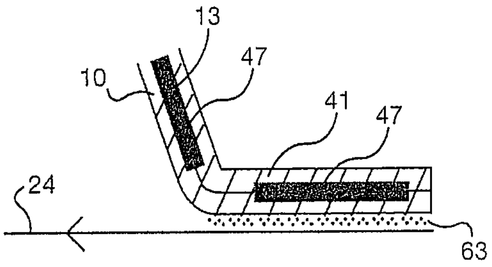

FIGS. 22A-Y illustrate embodiments in which a self-adhesive tape 64, typically in conjunction with a pressure-sensitive adhesive 63, form a linear connector 60. For example, FIG. 22A illustrates self-adhesive tape 64 wrapping around the outside of panel 10 and connecting membrane tie 24 to panel 10 by means of pressure-sensitive adhesive 63 typically following removal of release liner 65 from a self-adhesive tape illustrated in FIG. 22B. FIG. 22C is similar to FIG. 22A, except that a customised self-adhesive assembly illustrated in FIG. 22D comprises spaced apart zones of lines of pressure-sensitive adhesive 63. FIG. 22E illustrates a novel type of self-adhesive assembly devised for use as a linear connector 60 according to one or more embodiments of the present invention, in which off-set zones or lines of pressure-sensitive adhesive 63 are on opposing sides of self-adhesive tape 64, as shown in FIG. 22F. This novel arrangement enables the self-adhesive tape to obtain "purchase" from the outside of panel 10 but be located inside membrane tie 24, so as not to be visible from the front of membrane tie 24, which is especially desirable for aesthetic reasons and, for example, if membrane 24 comprises a membrane tie display sign 26. FIG. 22G is similar to FIG. 22E except that the novel self-adhesive tape of FIG. 22H comprises pressure-sensitive adhesive zones which are spaced apart as well as being on opposing surfaces of tape 64. FIG. 22J is a cross-section through so-called "transfer tape" comprising pressure-sensitive adhesive layer 63 and release liners 65 having different strengths of low adhesive connection to pressure-sensitive adhesive 63, such that one release liner 65 can be removed, the pressure-sensitive adhesive layer 63 applied to one surface, the other release liner 65 removed, enabling another surface to be adhered to pressure-sensitive adhesive 63, for example to provide a direct connection between panel 10 and return 14 of panel 10 and membrane tie 24, as illustrated in FIG. 22P. FIG. 22K illustrates so-called double-sided tape comprising pressure-sensitive adhesive 63 applied to both sides of tape 64 with release liners 65 of differential adhesion to the pressure-sensitive adhesive surfaces. This is used in a similar manner to the transfer tape of FIG. 22J but both layers of adhesive 63 and the intervening tape 64 are retained as illustrated in FIG. 22Q. Pressure-sensitive adhesive is of particular use in one or more small embodiments of the invention, for example in displaying photographs or postcards, for which packs comprising pre-formed panels, for example of transparent acetate film, pre-scored to create a plastic hinge, fold or crease 31, as illustrated in FIGS. 22L and M, for example to be connected to the photograph or postcard acting as membrane tie 24 by self-adhesive tape in FIG. 22N or transfer tape as illustrated in FIG. 22P. Alternatively, the membrane tie 24 can be creased to form an upstanding return element 14, adhered to panel 10, for example by means of double-sided self-adhesive tape, as illustrated in FIG. 22Q. FIG. 22R is a variant with stiffener 14 folded outwards, for example to create a frame effect to membrane tie display panel 26. FIGS. 22S-U illustrate linear connections to laminated film panels 10 using pressure-sensitive adhesive 63. FIG. 22V illustrates a laminated display panel 13 applied in place of a cut-out section of release liner 65, to assist easy subsequent application to panel 10 following removal of liner 65, as illustrated in FIG. 22W. FIG. 22X illustrates an adaptation of a prior art technique of forming self-adhesive tape into a "T" section to provide an effective adhesive capability to the inside surface of panel 10. FIG. 22Y illustrates the use of an intermediate triangular cross-section linear connector 60 with pressure-sensitive adhesive 63 on two surfaces in order to connect panel 10 with membrane tie 24.

FIGS. 23A-Z illustrate linear connectors 60 comprising continuous profiled sections which surround the edge and part of each side of panel 10, typically provided with a suitable dimensional tolerance to allow the insertion of panel 10 into the profiled section. FIGS. 23A-C utilise adhesive 61, for example pressure-sensitive adhesive or heat-activated adhesive to join membrane tie 24 to profiled linear connector 60. FIGS. 23D-F illustrate linear connectors 60 comprising a hinge 67 to accommodate different angles of inter-section between a panel 10 and membrane tie 24. FIGS. 23G and 23H illustrate sections in which an adhesive connection 61 between linear connector 60 and membrane tie 24 is aligned with the lateral reaction of panel 10 against linear connector 60, whether the panel is sized to fill the opening in the connector, as illustrated in FIG. 23H, or of lesser thickness, as illustrated in FIG. 23 J. Some linear connectors 60 accommodate eccentric loading induced by membrane tie 24, for example the slotted, cylindrical section of FIG. 23K acts like the end of a spanner in transmitting the purely tensile force of membrane tie 24 to panel 10, as does the u-shaped profile in FIG. 23L. However, ideally, according to one or more embodiments of the present invention the linear connector should effect a joint between the panel 10 a membrane tie 24 close to their point of intersection, as illustrated in FIG. 23M. The end of panel 10 can be formed into a u-section and an efficient means of connection, for example remote from the manufacturing location can be effected by flat section 57 adhered to membrane tie 24, as illustrated in FIG. 23N or flat section 57 can be sewn by thread 123 to membrane tie 24 as shown in FIG. 23P, either flat member to be located on site within the u-shaped return of panel 10, as illustrated in FIG. 23Q. Alternatively, flat member 57 can be located within the profiled sectors of FIG. 23R or 23S. So-called mushroom section edge details to flexible panels are commonly used, for example to reinforced films or fabrics used to decorate the sides of trucks. These are typically welded or adhered to the film or fabric 24, as indicated diagrammatically by connecting weld or adhesive 61 in FIG. 23Q, in which mushroom insert section 4 is optionally slid into profile 60 as illustrated in FIG. 23T or optionally pressed into profile 60 as illustrated in FIG. 23U. FIG. 23V illustrates an alternative edge section 4 which can be pressed onto section 60 to form a hinged linear connector. FIGS. 23W and X illustrate linear connectors 60 comprising a flexible plastic with "jaws" into which panel 10 can be squeezed. FIGS. 23Y and Z illustrate profiled sections to accommodate double panel embodiments, for example as illustrated in FIG. 15D, for example linear connector 60 being of extruded aluminum.

Figure 24U:
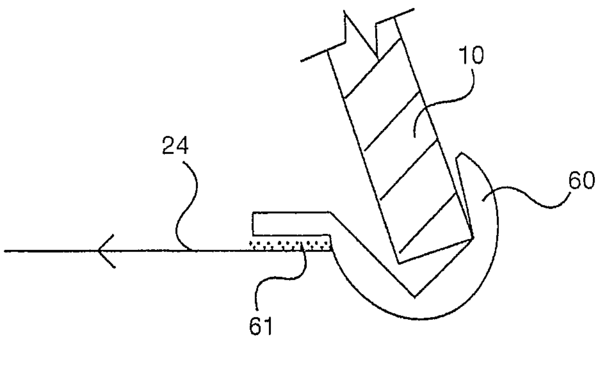
Figure 24V:
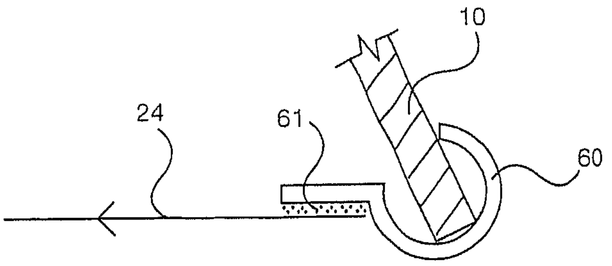
Figure 24W:
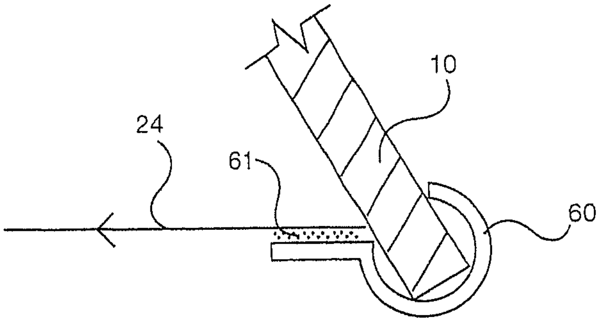

FIGS. 24A-EE illustrate linear connectors which can be referred to as "open" connectors or "hook" connectors. FIG. 24A illustrates a membrane tie 24 formed with return edge 14, for example of cold-formed steel, which is strong enough to resist the lateral loading imposed by flexurally deformed panel 10, optionally with glueline 60. FIGS. 24B-R and FIGS. 24T-Z all illustrate hook-profiled linear connectors 60 in arrangements which can easily be understood from the previous descriptions, using the same nomenclature. Of particular note are the profiled linear connectors of FIGS. 24M-R which comprise a novel hook profile of FIG. 24S devised for the purpose of one or more embodiments of this invention to provide a "universal" hook arrangement featuring an obtuse internal angle in direct line with membrane tie 24 which allows variation in both thickness and angle of panel 10 in relation to membrane tie 24, from $\theta_1$ to $\theta_2$, as further illustrated in FIG. 24T. The external surface of such "universal" hook linear connectors can be of different shape, as illustrated in FIG. 24U in which linear connector 60 has a curved external shape. These "universal" hook-profiled linear connectors provide a structural connection very similar to a "pure" pinned joint arrangement.

Figure 24X:
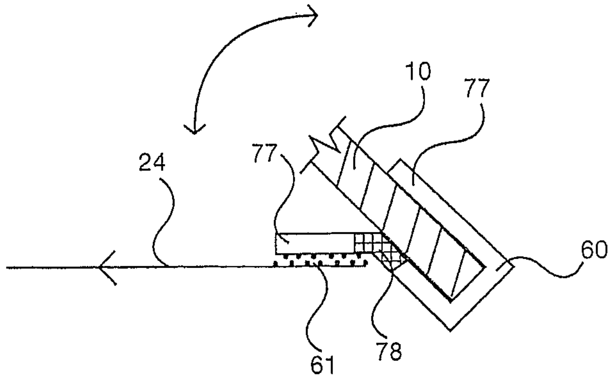
Figure 24Y:
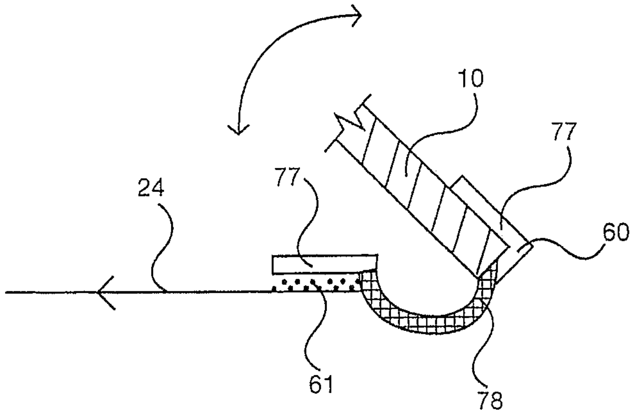
Figure 24Z:
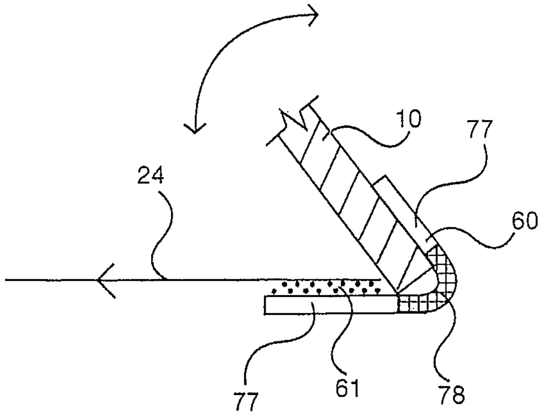
Figure 24A:
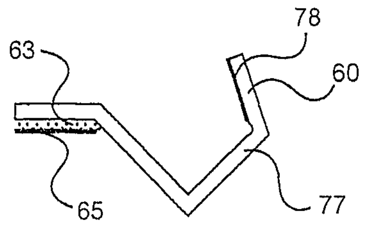
Figure 24B:
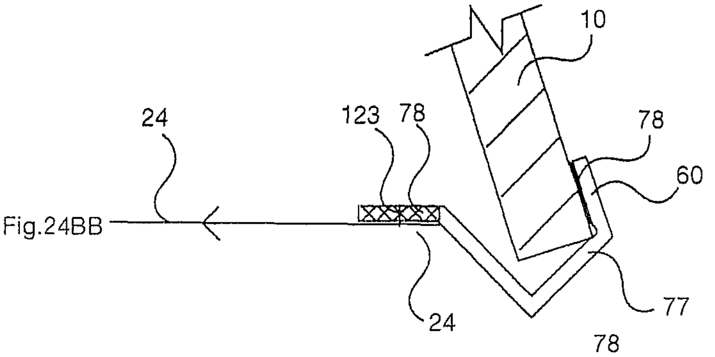
Figure 24C:
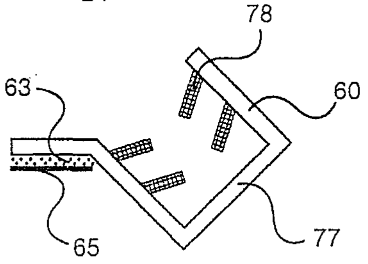
Figure 24D:
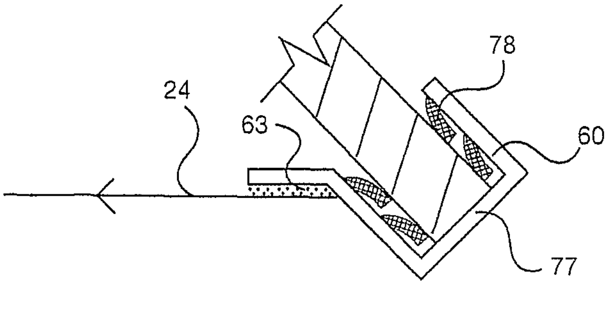
Figure 24E:
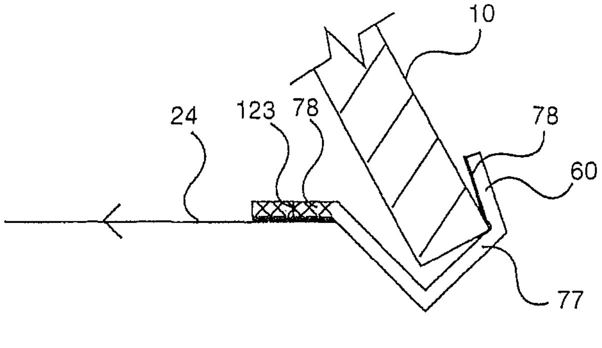

FIGS. 24X-EE show examples of plastic co-extrusions comprising a plurality of different types of plastic, for example combinations of pvc, RPVC, FPVC, ABS, HIPS, polycarbonate, TPR or acrylic, and typically dual extrusions comprising semi-rigid plastic 77, for example of RPVC or acrylic, and relatively flexible plastic 78, for example of FPVC. These or other materials combine to provide linear connectors with optionally a hinge arrangement allowing a variable angle of intersection between panel 10 and membrane tie 24 and/or frictional surfaces and/or sewable sections. FIGS. 24X, 24Y and 24Z illustrate open hook linear connector profiles comprising semi-rigid plastic 77 and flexible plastic 78, the latter forming hinge sections to accommodate different angles of intersection of the panel 10 and membrane tie 24. They are connected to the panel, for example, by adhesive 61 or by sewing extensions of the flexible section 78 to, for example, a fabric membrane tie.

FIG. 24AA illustrates a rigid or semi-rigid plastic profile section 60 with flexible plastic strip 78 to provide additional frictional resistance to the edge of a panel sliding out of the hook, for example if an assembly suffered impact, and pressure-sensitive adhesive 63 with removable protective liner 65. FIG. 24BB is a similar profile but with a flexible plastic section 78, suitable for sewing to membrane tie 24 with thread 123. FIG. 24CC illustrates a rigid or semi-rigid linear connector 60 with internal sloping flexible "barbs" or "wands" of material 78 to apply lateral pressure and a frictional force to the edge of the panel to be inserted, as illustrated in FIG. 24DD. FIG. 24EE is similar to FIG. 24BB but demonstrates the adaptability of the open linear connector to a different angle of intersection of panel 10 with membrane tie 24.

Figure 25A:
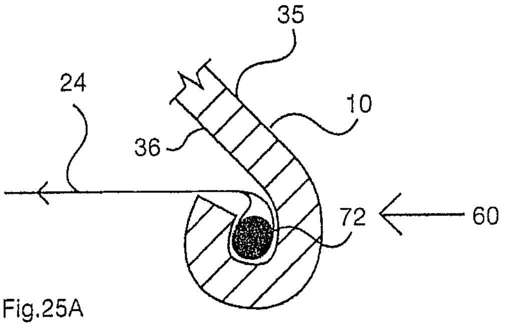
Figure 25B:
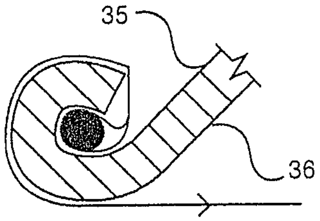
Figure 25C:
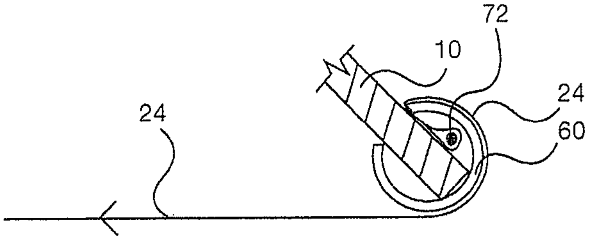
Figure 25D:
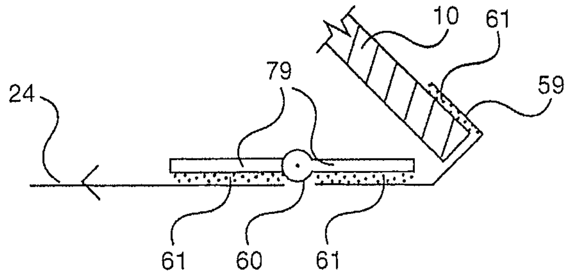
Figure 25E:
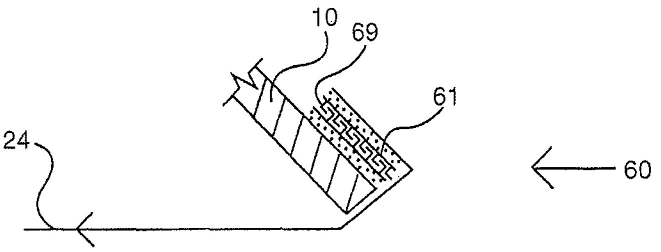
Figure 25F:
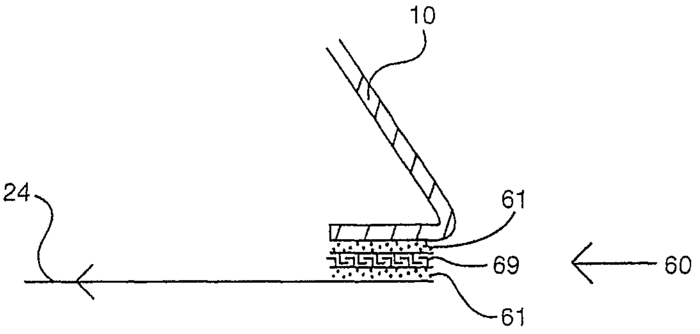
Figure 25G:
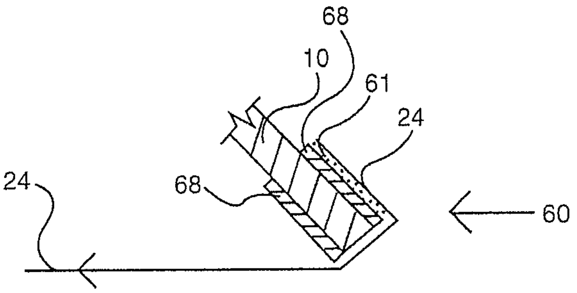
Figure 25H:
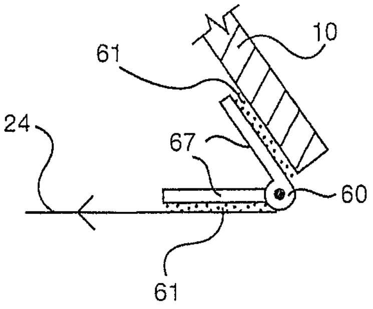

FIGS. 25A-25N illustrate miscellaneous linear connectors 60 comprising a means of inter-locking of components. In FIG. 25A, rope or cable 72 is contained within an edge seam of membrane tie 24, to be pressed into a suitable recess, for example a curved end to panel 10 as illustrated diagrammatically in FIG. 25A or a "split tube" linear connector 60, as illustrated in FIG. 25B. FIG. 25C is a diagrammatic representation of an inter-locking zip 79, typically having intervening flexible connections to panel 10 and membrane tie 24. The zip connection can optionally be provided on one side, both sides or in the centre of membrane tie 24. FIGS. 25D and E illustrate proprietary inter-locking connectors, for example interlocking closure systems, such as VELCRO®, a trademark of Velcro Industries B.V. or Dual Lock™ a trademark of 3M, and zips of any type. FIG. 25F illustrates angle profile 60 with lines of discrete fixings 48, for example bolts or rivets, through holes 75 in panel 10 and membrane tie 24. FIG. 25G illustrates a magnetic linear connector 60 in which strip magnet 68 is optionally adhered to one side of panel 10 (if panel 10 is not a suitable ferrous material), which is attracted towards magnet 68 adhered to linear tie 24 located on the other side of panel 10. FIG. 25H illustrates a hinge arrangement such as a "piano hinge" with direct surface connections to both panel 10 and membrane tie 24, for example by means of adhesive or frictional connections enabled by screws. FIGS. 25J and K illustrate a helical connector 60 threaded through holes, optionally reinforced holes 75 in panel 10 and membrane tie 24. FIG. 25L illustrates a cross-section through a cellular panel 10, typically of plastic material, for example of acrylic or polycarbonate, containing voids 75. FIG. 25M illustrates linear connector 60 with protruding sections to match the voids 75 in cellular panel 10 inserted into panel 10 and connected to membrane tie 24 by means of pressure-sensitive adhesive 63. FIG. 25N illustrates a linear connector 60 comprising an angle section connected to panel 10 and membrane tie 24 by means of bolts 48 through holes 75.

Figure 26Q:
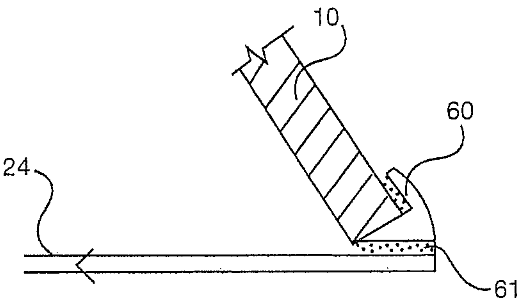

While some embodiments of the invention are easily assembled manually, others, especially larger embodiments, optionally benefit from the use of jigs and/or mechanical devices to assist assembly. For example, the sequence of assembly shown in FIGS. 26A-D utilises a wall or piece of furniture as a restraint to assist flexing of the panel. In FIG. 26A, the panel 10 and membrane tie 24 on floor 40 are connected at one end of the assembly located against wall 50. In FIG. 26B, suction pads connected by a hand bar to form suction grip 91, as used in the glazing industry, are used to lift the other end of the panel and flex it upwards and towards the wall, to be then lowered into position and secured to the other end of the membrane tie 24 by linear connector 60, as shown in FIG. 26C. The assembly can then be rotated manually through 90° and re-positioned laterally to its desired position, for example as a display comprising membrane tie display panel 26, as shown in FIG. 26D. As another example, a jig comprising two raised edges, for example parallel edges of two adjacent tables 89, as shown in FIG. 26E can be used to help flex the panel before positioning the membrane tie 24 and fixing linear connectors 60, as shown in FIG. 26F. As another example, one or more temporary tie cables 72 can be used to flex the panel, for example by means of clamps attached to edges of the panel or by forming sloping return ends 14 to the panel and a grip hoist or hoists to pull the ends of the panel together to an intermediate panel geometry 5, as shown in FIGS. 26G and H. This enables the membrane tie 24 to be positioned and linear connectors 60 effected, allowing removal of the temporary cable or cables and the panel to spread slightly, inducing tension in membrane tie 24, as shown in FIGS. 26J and K. As another example, as illustrated in FIG. 26L, a vertical restraint, for example wall 50, can be used in conjunction with a horizontal surface, for example table 89, to align and connect one end panel 10 to membrane tie 24, for example by pressure-sensitive adhesive 63, and then enable the other end of panel 10 to be pushed towards the wall until it is over and then down onto the other end of membrane tie 24 to effect their connection by means, for example, of pressure-sensitive adhesive 63. Assembly may also be assisted by multi-use of components, for example by means of a profiled linear connector 60, for example of extruded polycarbonate or aluminum, acting as a temporary stop to an edge of panel 10 which is being slid into place along the upper surface of membrane tie 24, as illustrated in both FIGS. 26M and P. The profiled linear connector 60 can then be easily rotated to engage the outside of panel 10, effecting a dimensionally stable connection with membrane tie 24, as illustrated in FIG. 26N or FIG. 26Q respectively.

Following assembly, the structural performance of particular embodiments vary depending on their component sizes, their tied, flexurally deformed geometry, their material composition and with time, unless both the panel and the membrane tie are only stressed within their elastic range and continue to be so during the serviceable life of the assembly, for example in the case of suitably stress-limited steel panels and steel membrane ties. Natural materials, such as timber or timber-based products will "creep", in other words continue to deflect under self weight or "dead loading" and "imposed loading". Elastic materials have a capacity to store mechanical energy with no dissipation of the energy. A viscous fluid has a capacity for dissipating energy and none for storing it. Viscoelastic materials, such as plastics, are between these two extremes, having a capacity to both store and dissipate mechanical energy. They typically will exhibit viscoelastic behavior of creep under sustained load and/or stress relaxation if restrained in a stressed condition under constant strain. Viscoelastic materials respond in a manner which is dependent on time, upon the magnitude of the initial stress regime and any subsequent amendment of imposed stresses, for example externally applied loading or amended internal stresses, for example by reduction in tensile force in a tie member through creep of a panel within an assembly according to one or more embodiments of the present invention. On the application of subsequent stress regimes, for example the reversal of curvature and thereby flexural stress, the material response is not only determined by the current state of stress but is also determined by past states of stress. The material can be said to have a "memory" of all past states of stress. Similarly, if a deformation is being imposed, for example by a given tie length in a reverse flexed assembly, the resultant stresses depends on the entire past history of deformation. Boltzmann's principle of superposition applies. For example, reversal of flexure from a residual flexed curvature requires greater flexure (change of curvature at all points in the panel), resulting in greater bending stresses in the panel and a greater tensile force in the tie than in the previous construction of the assembly with the same length of tie member. In assemblies which creep and/or relax, the induced bending stresses in the flexurally deformed panel and the tensile force in the membrane tie will decrease. Assemblies according to one or more embodiments of the present invention typically have substantially better structural performance in the resistance of loads, for example in the resistance of vertical or lateral imposed loads, for example from accidental impact, than similar structures without pre-stress. For example, regarding the maintenance of desired geometry, for example membrane tie graphic displays which are required to be maintained in a plane (flat) state, structures according to one or more embodiments of the present invention with their pre-stressed component parts will perform this function far better than similar components preformed to the same geometry but not pre-stressed. However, these benefits of a tied, flexed panel assembly reduce with creep or relaxation of any plastic components. The extent of such creep and/or stress relaxation can be measured over time, for example by the use of prior art strain and deflection gauges. Referring to FIG. 27A, the bending stresses in the panel and the tension force in the membrane tie are typically related by the formula:

$$M=T\times H$$

where M is the bending moment at any point in the panel at height H above the membrane tie and T is the tensile force in the membrane tie, providing there is an effectively pinned connection at the position of the linear connector 60 between the panel 10 and membrane tie 24, as would be provided by many of the linear connectors illustrated in FIGS. 21A-25N, or if the membrane tie 24 was of much less flexural stiffness than panel 10.

However, there is great difficulty using the currently available means for structural analysis in pre-determining the tensile force in a membrane tie and therefore the bending moments and the shape of the curve along the length of a panel of an assembly for any given sizes and material properties of a panel and membrane tie. Most theories of structural design and the resultant analysis methods and their computational means rely on assumptions developed for the design of traditional structures, for example for buildings, bridges, etc in which it is desired to restrict the amount of deflection of the overall structure and individual elements for serviceability reasons, for example which typically restrict the maximum deflection of a beam to the span divided by 250. The traditional "beam theory" for the design of conventional structures relies on a number of assumptions which are not satisfied by a typical assembly according to one or more embodiments of the present invention, in which the deflection of the panel is grossly in excess of these assumptions, even the simplest assembly comprising materials which are maintained within their elastic range.

While some methods of analysis can theoretically be applied to any structure, for example finite element analysis, there are assumptions and requirements of such methods that do not ideally lend these methods to such grossly deformed, relatively thin elements. For example, individual elements within a finite element analysis are conventionally not elongated but, for example, comprise a fine triangulated grid with individual triangles having sides of not dissimilar size. In seeking to predict the behavior of a typical panel according to one or more embodiments of the present invention, for example a panel 1 meter long by 1 mm thick, or 10 meters length by 6 mm thickness, hundreds if not thousands of elements along the length of the panel would typically be required if a sufficiently fine grid is provided across the thickness of the panel to enable adequate analysis of resultant stresses.

There is no prior art in the field of structural engineering concerning the flexure of thin panels to induce tension in another structural element, in order to produce a stable, serviceable structural assembly. There is no established means of predicting the performance of such structures, as there has been no prior requirement. One of the reasons such structures have not been devised and used in the past may be because there is no accepted means of reliably predicting their performance by calculation.

These problems of analysis and predicting the performance of assemblies of various embodiments of the invention are even more complicated when plastic materials are incorporated, for example panel sheets of acrylic, polycarbonate or pvc, and/or membrane tie films of polyester or pvc. Creep of one element is interactive with the stresses in the other element or elements of the assembly and the problems of calculation already discussed are greatly worsened by the need for successive or iterative calculations predicting the resultant stresses in any point in time in the life-span of the assembly structure, which are continually changing with time in use. As one example, the opposite edges of a flexed plastic panel which are connected by an elasticated fabric membrane tie will creep inwards, changing the geometry of the assembly and reducing the tensile force in the elasticated fabric membrane tie. For some uses of one or more embodiments of the invention, for example small displays, for example table top displays of postcards or photographs, appropriate member sizes can be relatively easily established by testing, and various embodiments of the invention have been reduced to practice in many such cases, for example as previously described in relation to FIG. 2G for the display of photographs. For larger embodiments, for example for relatively large exhibition assemblies or building enclosures, it is considered that the best approach to computation of structural performance should be based on the intelligent application of existing theories of analysis and computational methods until a reliable correlation between predicted behavior and measured structural performance enable more specific, tailored methods of analysis to be developed and proven in the future.

Perhaps the nearest practical problem in the art of structural engineering that has been considered from an analytical standpoint is the performance of thin steel plates in compression following buckling, in order to seek to establish the residual strength of a buckled plate with its subsequent gross deformation, for example in considering safety in a resultant collapse mode of a structure. However, the ultimate deflected form of such structures typically involves plastic hinge mechanisms which are not typically achieved in structures according to one or more embodiments of the invention under any anticipated loading condition, and in such prior art analyses, lateral deflection of a failed plate in compression is not important, per se, only its residual strength (for example see: "The Stability of Flat Plates", P. S Bulson. Pages 406-423). In summary, there is no proven method for reliably predicting the initial stresses within and the subsequent behavior of assemblies according to one or more embodiments of the present invention and any logical approaches to solving the problem are in the realms of very advanced theoretical structural analysis.

Adopting the following nomenclature:

| | |
|---|---|
| panel | as previously described |
| E | Elastic Modulus |
| h | width of panel |
| t | panel thickness |
| l | length of panel |
| M | Bending Moment |
| N | Normal forces per unit length |

-continued

| | |
|---|---|
| P | applied force |
| q | intensity of a distributed load |
| s | panel deflection arc length |
| w | deflection of panel in z direction |
| X, Y | Body forces in main axis directions |
| x, y, z | coordinates |
| $\epsilon$ | strain |
| $\sigma$ | stress |
| $\delta$ | deflection |
| $\phi$ | panel deflected slope angle |
| v | Poison's ratio |

Considering purely elastic behavior, looking at the bending of a rectangular panel that is subjected to a transverse load and assuming that the material stays in the elastic state for large deflections, the deflection of an element of the panel is given by a differential equation that is similar to the deflection of a bent beam. Consider a panel of uniform thickness t and take the xy plane as the middle of the panel and the width of the panel being denoted by h. As in ordinary theory of beams, it can be assumed that the cross-sections of the panel remain plane during bending, so that it undergoes only rotation with respect to the neutral axis.

The curvature of the deflection curve is given in Equation 1, assuming the deflection w is small compared to the length of the beam (which is not the case with typical panels according to one or more embodiments of the present invention).

$$-\frac{d^2w}{dx^2} \quad \text{Equation 1}$$

The lateral strain, $\epsilon_y$, must be zero in order to maintain continuity in the panel during bending, from which it follows that the elastic strain, $\epsilon_x$, and stress, $\sigma_x$, is given by Equation 2 and Equation 3.

$$\varepsilon_x = \frac{(1-v^2)\sigma_x}{E} \quad \text{Equation 2}$$

$$\sigma_x = \frac{E\varepsilon_x}{1-v^2} = -\frac{Ez}{1-v^2}\frac{d^2w}{dx^2} \quad \text{Equation 3}$$

Knowing the applied force P or bending moment M on the panel, the curvature of the bended plate is Equation 4 where EI is the flexural rigidity of the panel.

$$\frac{d^2w}{dx^2} = -\frac{M}{EI} \quad \text{Equation 4}$$

In the above, it has been assumed that the panel is bent by lateral loads only. If in addition to lateral loads there are forces acting on the middle plane of the panel, these must be considered in deriving the corresponding differential equation of the deflection surface. Timoshenko and Woinowsky proposed the differential equation in Equation 5 for the deflection of a beam where q is the intensity of a continuous distributed load and $N_x$, $N_y$ and $N_{xy}$ are the normal forces per unit length in an element of the panel. X and Y are body forces acting in the middle plane of the panel or are tangential forces distributed over the surfaces of the panel.

$$\frac{\partial^4 w}{\partial x^4} + 2\frac{\partial^4 w}{\partial x^2 \partial x^2} + \frac{\partial^4 w}{\partial y^4} = \frac{1}{EI}\left(q + N_x\frac{\partial^2 w}{\partial x^2} + N_y\frac{\partial^2 w}{\partial y^2} + 2N_{xy}\frac{\partial^2 w}{\partial x \partial y} - X\frac{\partial w}{\partial x} - Y\frac{\partial w}{\partial y}\right) \quad \text{Equation 5}$$

Equation 5 is simplified when the boundary conditions are known. Even in the simplest of cases this equation is non-linear and not easily solved. The use of numerical methods such as finite differences has been proposed to solve the non-linear differential equations.

According to "beam theory", the panel can be assumed to be a cantilever beam of length l, width h and thickness t, as proposed by Timoshenko. Using this assumption, the equations proposed by Bisshop and Drucker (Quarterly of Applied Mathematics, V 3(3), pp 272-275) for the large deflection of cantilever beams can be used to determine the curvature, deflection and horizontal displacement.

The derivation is based on the Bernoulli-Euler theorem, which states that the curvature is proportional to the bending moment (Equation 4). For wide beams, as considered in this case, the flexural rigidity is given by Equation 6.

$$B = \frac{EI}{1 - v^2} \quad \text{Equation 6}$$

The curvature of the beam is expressed in terms of the arc length s and slope angle $\phi$ in Equation 7. This equation leads to an elliptic integral that can be split up into complete and incomplete elliptic integrals of the first and second kind. In the notation of Jahnke and Emde, the relation for deflection $\delta$ and beam length l are given in Equation 8.

$$\frac{d\phi}{ds} = \sqrt{\frac{2P}{B}}(\sin\phi_0 - \sin\phi)^{1/2} \quad \text{Equation 7}$$

$$\frac{\delta}{l} = 1 - \frac{2}{\alpha}[E(k) - E(k, \theta_1)] \quad \text{Equation 8}$$

With the application of boundary conditions, the horizontal displacement of the loaded end of the beam is calculated with Equation 9 with $\phi_0$ the initial slope angle of the beam.

$$\frac{l - \Delta}{l} = \frac{\sqrt{2}}{\alpha}(\sin\phi_0)^{1/2} \quad \text{Equation 9}$$

Separately, theoretical curves of an end loaded pillar with pin-jointed ends under progressive axial loading are illustrated in FIG. 27B for which Southwell ("Theory of Elasticity" (Oxford) p. 430) proposes a compatible equation with those already considered. The solution of this equation also involves elliptic functions which is outside the realms of capability of a typical practicing structural engineer and, in any case, does not address inelastic behavior.

Considering plastic behavior, in any particular loaded beam, if the load system is increased gradually, yielding would first occur at the extreme fibres of the weakest section in relation to its resultant bending moment. These fibres are then said to be in plastic state and further increase in loading will bring about a considerable increase in strain at this weakest section of the beam, with a redistribution of stress. When the whole cross-section at any point in a structure becomes plastic, no further increase in the moment of resistance is possible without excessive strain and a "plastic hinge" has been developed. So-called "work hardening" can subsequently result in increased moment of resistance.

The main aim is to calculate the bending moment required to form a plastic hinge for any particular cross-section and to determine the distribution of bending moment along the beam at the collapse load. The assumptions made in calculations are:

1. the material exhibits a marked yield and can undergo considerable strain at yield without further increase in stress.
2. the yield stress is the same in tension and compression
3. transverse cross-sections remain plane, so that strain is proportional to the distance from the neutral to the distance from the neutral axis, though in the plastic region stress will be constant and not proportional to strain.

The fully plastic moment is calculated with Equation 10 and the moment at first yield with Equation 11

$$M_P = \frac{ht^2}{4}\sigma_y \quad \text{Equation 10}$$

$$M_y = \frac{ht}{6}\sigma_y \quad \text{Equation 11}$$

The analytical calculations of deflections within the plastic region are uncertain at this stage and the use of numerical computation is suggested to determine the deflection of beams/plates when the material is within the plastic region. Equation 10 and Equation 11 gives an indication at what magnitude of loads plasticity will occur in the material.

In numerical modelling, plasticity theory provides a mathematical relationship that characterizes the elasto-plastic response of materials. There are three ingredients in the rate-independent plasticity theory: the yield criterion, flow rule and the hardening rule.

Numerical modelling is a novel method of applying engineering calculations to almost any engineering problem, be that of a structural, thermal, fluid, electromagnetic, etc. of nature or a combination of these fields. Numerical modelling has proved to be reliable in non-linear problems where the nonlinearities are introduced due to a change of status (contact), geometry (large deflections) and material nonlinearities (stress-strain curves).

The problem of large deflection of beams/plates will include geometrical and material nonlinearities. ANSYS (computer software owned by ANSYS, Inc., a US corporation), employs the "Newton-Raphson" approach to solve nonlinear problems. In this approach, the load is subdivided into a series of load increments. The load increments can be applied over several load steps.

A square panel has been modelled using beam elements. The models looked at the deflection and stress distribution of the panel in the Elastic state and then in the Plastic state. The effect of Creep on the stress relaxation and deformation of the initial curve has also been investigated.

For an Elastic analysis the material is assumed to be pure elastic and does not go into a plastic state no matter the amount of deflection. This type of analysis tends to over-predict the stress and strain calculations when the stresses go above the yield limit of the material. An Elastic analysis is the most basic structural analysis and is good for initial models due to the relatively quick calculations.

In a Plastic analysis the yield stress limit and tangent modulus of the plastic region needs to be specified. For an elastic-perfect plastic material a tangent modulus of 0 is specified and the stress results will not exceed the yield stress. A specified tangent modulus introduces a work hardening effect into the material.

The model consists of a beam with boundary conditions applied to the ends of the beam so that the one end (End 1) is free to move in the vertical direction and the other end (End 2) is free to move in the horizontal direction. End 1 is given a very small vertical displacement to initiate the direction of the desired curvature of the beam. End 2 is then given a large horizontal displacement inwards (towards the beam). This action results in the large deflection of the beam and represents a symmetrical model of a panel that has buckled under axial loads. FIG. 27C illustrates the deflected form of the beam with an inwards displacement of the beam, produced according to this method.

Creep is simply the time-dependent deformation of solids under stress. Many equations have been proposed for the calculation of creep strain. It needs to be emphasized that all the many equations proposed for creep can only be given some justification if the right material and test conditions are selected. Creep strain equations can be temperature and stress dependent.

Finite Element Modelling is capable of dealing with creep by using a constitutive law of creep that will be in a form in which the rate of creep strain is defined as some function of stress and total creep strain, β in Equation 12. Various functions for β exist for different material types, stress values and temperature dependence. Different functions also exist for the different stages of the creep: primary and secondary stages.

$$\dot{\varepsilon} = \frac{d\varepsilon_c}{dt} = \beta(\sigma, \varepsilon_c) \qquad \text{Equation 12}$$

In conclusion, this brief survey into analytical solutions of beams and plates undergoing large strain deflections indicate that solutions do exist but require a high level of mathematical skills to calculate the deflection and curvature of a panel for given boundary conditions with any degree of accuracy acceptable for commercial use.

Numerical modelling appears to be successful in determining the deflection of the panels. It also has the advantages of calculating stresses, strain, axial forces, bending moments, etc and the application of non-linear material properties such as plasticity, creep and viscoelasticity.

Viscoelasticity is important because in any given assembly in use, although subject to creep, the relationship M=T×H will still apply and substantial deflections within the panel will not typically occur in use, other than to accommodate the reduction in length of the membrane tie owing to the reduction of T. However, plastic materials will continue to suffer substantial reduction in bending stresses with consequent reductions in T by virtue of molecular level restructuring of the plastic material as it "relaxes" under continued flexure without substantial change in overall curvature or shape.

However, one aspect of many embodiments of the present invention is that the effects of creep degradation of the structural performance can be mitigated and even taken advantage of, by reversing the direction of the panel flexure. Referring to FIG. 2G, for example, when changing a display membrane tie display sign 26, the panel 10 can be flexed in the opposite direction to compensate for any creep relaxation of the panel that will have occurred since its assembly. In this way, the creep deflection which is not overcome on release of the panel can be used to induce greater pre-stress into both the panel and membrane tie by means of the reverse direction of bending.

The direction of curvature of a plastic panel 10, shown in its initial geometry in FIG. 27D, is reversible in order to offset the effects of creep and relaxation in the plastic panel material, for example when changing a membrane tie display sign. When panel 10 is separated from membrane tie 24, as shown diagrammatically in FIG. 27E, it will change from its flexurally deformed tied panel geometry 6 (shown by dotted lines) by partially reverting towards its initial geometry, plane state, in a residual panel geometry (shown by solid lines). The amount of restitution towards its initial geometry can be quantified by measuring dimensions $H_1$ and $H_2$ in FIG. 27E and the degree of restitution is typically referred to in the art of structural engineering as:

$$\text{the Coefficient of Restitution}=(H_1-H_2)/H_1$$

where $H_1$ is the height deformation of the panel in its tied, flexurally deformed panel geometry 6, and $H_2$ is the height deformation following release after creep or viscoelastic "relaxation". This Coefficient of Restitution will be less the longer the time the assembly remains unreleased. However, a major advantage of one or more embodiments of the present invention is that the viscoelastic creep and relaxation reduction in stresses in the assembly can be countered by reversing the direction of flexure and curvature in the panel, as indicated by the reversal of first panel side 35 and second panel side 36 from the orientation shown in FIG. 27E to the reverse flexed panel of FIG. 27F. The same membrane tie 24 can be re-used or a second, replacement membrane tie 24 can be used in the reverse flexed panel assembly. Thus a single panel 10 can be re-used many times with serviceable amounts of flexure and reverse flexure in the panel and tension in the membrane tie. Typically the force in a membrane tie 24 in a reverse flexed panel assembly will initially be higher than in the original configuration because of the greater amount of flexure in panel 10 in order to overcome the residual curvature (shown by dotted lines in FIG. 27F).

Aspects of the above review of structural analysis relevant to various embodiments of the invention have been tested in a number of ways, using both elastic panel materials and homogeneous (unlaminated) and laminated viscoelastic panel materials.

The theoretical flexurally deformed geometry of FIG. 27C of a panel in its elastic range has been tested using a flexible steel rule of approximate dimensions 300 mm×32 mm×1 mm held at both ends but allowing rotational deflection at both ends. Iterative curve matching, by progressively imposing increased curvature in the steel rule and computer proportional enlargement the ANSYS theoretical curve from which FIG. 27C was derived, resulted in so accurate a correlation that the theoretical curve was located completely within curves scribed around the convex outside and concave inside of the edges of the ruler, when the coordinates of the centre and ends of the ruler matched those of the theoretical curve (and its mirror image).

A range of steel rulers and hacksaw blades representing a panel according to an embodiment of the invention have been tested with vertical, initially axial load applied at the top end, then with progressively imposed vertical and lateral deflection by applied vertical loading (representing tie tension) measured by a spring weighing machine supporting the lower end. It has been found that only a relatively small increase in load is required to achieve substantial deflection of the panel within the elastic range (full restitution being achieved upon release of the panel).

It was concluded that adoption of the Euler Buckling Load of the panel with an appropriate factor of safety for the intended use of the structure would provide a safe and pragmatic approach to design and selection of an appropriate tie member for most of the anticipated embodiments of the invention.

Viscoelastic behavior was assessed by imposing deflections on plastic panels and releasing the panels after elapsed time periods, measuring the residual panel geometry after release, calculating Coefficients of Restitution and finally assessing the implications of reversing panel curvature in reverse flexed panel assemblies. Tests were also undertaken on a laminated paper panel with an array of highly elasticated linear ties, up to a maximum of 20 of such elastic ties. These ties were calibrated so that tie forces could be reasonably accurately assessed with progressive reduction in length of the ties owing to creep deflection of the tied edges of the panel (inwards) with time, over elapsed time periods varying from 24 hours to 3 months. Tests on a laminated paper panel with a length of panel of 280 mm indicated tension forces in the range of 1-2 N (one-two Newton).

While there is potential for much further research into the structural behavior of embodiments of the invention, the following pragmatic guidelines are offered as a result of these theoretical and practical assessments.

1. The deflected form or flexurally deformed geometry of a rectangular, uniform-sectioned panel, with end conditions approximating to theoretical pinned connections, will be substantially the same for all panel sizes and panel materials maintained within their elastic range for any given length of tie member (distance between opposing edges of the panel) and crown (lateral) deflection. The geometry of any infill end panels, bases and other associated elements of actual embodiments can therefore be accurately predicted.

2. The Euler Buckling Load of the panel represents a conservative guide for the tensile load to be designed for in the tie member, while adopting an appropriate factor of safety for the intended application, for example a load factor of 1.5 for display embodiments or 3.0 for roof canopy embodiments.

3. A conservative guide for the tie load in a reverse flexed panel assembly with a viscoelastic panel is that obtained in item 2 amended proportionally to the amount of residual deflection at the time of re-assembly. From FIG. 27E, the conservative design tie load, to which an appropriate factor of safety should be applied, is:

$$\text{Euler Buckling Load} \times \frac{H1 + H2}{H1},$$

where the Euler Buckling Load is calculated using a short term Elastic Modulus of the panel material.

4. Significant, measurable structural performance benefits result in an assembly according to an embodiment of the invention by using a panel with a residual curvature from a previous assembly and flexurally deforming the panel in the opposite direction, if the residual panel geometry exhibits a Coefficient or Restitution of less than 0.9, more preferably less than 0.7, and even more preferably less than 0.5

5. With appropriate analysis and/or practical experience, it is possible to advise owners of assemblies of one or more embodiments of the invention of a recommended elapsed time when the panel should be reversed in flexure to maintain adequate structural performance for the particular embodiment. For example, an assembly could be recommended for reversal of stress after one month or, as another example, after three months from the initial assembly or any previously reverse flexed panel assembly Embodiments of one or more embodiments of the invention comprising transparent panels and/or transparent membrane ties have many advantages. For example, displays comprising a frameless, clear plastic curved panel supporting a photograph enable the photograph to be illuminated from the rear, for example if located on a window cill, which adds impact and improved perception of the image in the manner of a backlit transparency. Secondly, it is a well-known phenomenon that a conventional, prior art frame surrounding a photograph, a realistic painting or other conventional picture has a negative effect on the perception of the 3-dimensional nature of subject matter in a 2-dimensional image. So-called "cues" to perceiving depth, for example relative size (greater in the foreground), linear perspective (leading to "vanishing points"), color hue (towards the blue end of the spectrum) in the distance) and intensity (stronger in the foreground) are all over-ridden or diminished by a frame which the brain "interprets" as the perimeter of a plane or 2-dimensional image. Prior art transparent framing systems have been developed to overcome this phenomenon, having arrays of dots in two different planes, for example on the front and rear of a frame cut from acrylic sheet, the resulting interference pattern offering the visual perception or illusion of the frame being in a substantially different plane to the framed image, to allow the 3-dimensional cues to be interpreted better by the observer's brain. An observer of a photograph or other image displayed by means of one or more embodiments of the present invention, without a frame and with only transparent means of support behind it, is able to interpret all such 3-dimensional cues without any prior art frame or any opaque means of support visible from any angle detracting from that perceived image. In the case of a postcard or other display with writing or other image on the reverse side, these reverse images are visible through a transparent panel and, in the case of writing or printed text, legible from the other side, which is not the case with conventional, prior art display systems providing an equivalent degree of structural stability.

The same advantages of transparent panels and/or membrane ties and/or linear connectors apply to larger displays, for example floor-mounted displays in a retail environment, as well as one or more embodiments of the invention enabling a cleaner, uncluttered, visual impression than conventional, prior art framing systems. In the case of semi-transparent displays, for example see-through graphics panels according to U.S. RE37,186 or U.S. Pat. No. 6,212,805, there is an added benefit, in that there is little or no visual obstruction to the ambience and security safety aspects of the retail, exhibition or other environment surrounding the display.

However, there is no transparent material that can be flexed to the extent required to create a stable, pre-stressed structure of one or more embodiments of the present invention that does not exhibit viscoelastic creep and/or relaxation behavior. If it is required to design an assembly of reliably predictable performance over an extended lifespan, very advanced methods of structural analysis are required, preferably including for reversible curvature of the panel where appropriate.

The foregoing description is included to illustrate the operation of the preferred embodiments and is not meant to limit the scope of the invention. To the contrary, those skilled in the art should appreciate that varieties may be constructed and employed without departing from the scope of the invention, aspects of which are recited by the claims appended hereto.

What is claimed is:

1. An assembly comprising:

a panel;

a tie; and a display sign, said display sign being applied to or forming a part of said panel and/or said tie, said display sign facing in one display direction, said panel being flexurally deformed in one direction of curvature from an initial geometry and restrained in a flexurally deformed geometry by the tie, and wherein the one direction of curvature of the panel is reversible to form a reverse flexed panel assembly such that said display sign or another display sign is facing in said one display direction, wherein said tie is a membrane tie, and wherein said assembly comprises a pull-apart linear connector comprising a substantially continuous linear connector that releasably connects the panel to the membrane tie, said pull-apart linear connector being configured to disconnect said panel from said membrane tie by only using pulling apart forces in substantially opposing directions.

2. An assembly as claimed in claim 1, wherein said tie comprises a membrane tie, and the flexural rigidity (EI) of said membrane tie is less than one hundredth of the flexural rigidity of said panel.

3. An assembly as claimed in claim 2, wherein the flexural rigidity of said membrane tie per cm width is less than one thousandth of the flexural rigidity of said panel per cm width.

4. An assembly as claimed in claim 1, wherein said panel comprises a plastic material.

5. An assembly as claimed in claim 4, wherein said plastic material is transparent.

6. The assembly as claimed in claim 1, wherein:

said display sign is applied to or forms a part of said panel and is disposed on a side of the flexurally deformed panel remote from said tie;

said flexurally deformed panel comprises flexurally curved edges, and edges which have not been flexurally curved; and said assembly can be supported on a plane horizontal supporting surface on said edges which have not been flexurally curved.

7. The assembly as claimed in claim 6, wherein the tie intersects said panel at a point spaced from the edges which have not been flexurally curved.

8. The assembly as claimed in claim 6, wherein:

the panel has two principal surfaces;

the display sign is disposed on a first of the two principal surfaces; and the assembly further comprising another display sign disposed on a second of the two principal surfaces.

9. The assembly as claimed in claim 8, wherein:

the display sign comprises two messages that are disposed upside-down relative to each other if the panel was disposed in a flat orientation; and the another display sign comprises two other messages that are disposed upside-down relative to each other if the panel was disposed in a flat orientation.

10. The assembly as claimed in claim 1, wherein:

the panel comprises outer edges; and the tie intersects said panel at a point spaced from the outer edges.

11. The assembly as claimed in claim 1, wherein:

said display sign is applied to or forms a part of said panel and is disposed on a side of the flexurally deformed panel remote from said tie; and the display sign comprises two messages that are disposed upside-down relative to each other if the panel was disposed in a flat orientation.

12. The assembly as claimed in claim 1, wherein:

said display sign is applied to or forms a part of said panel and is disposed on a side of the flexurally deformed panel remote from said tie; and the display sign comprises two messages that are disposed upside-down relative to each other if the panel was disposed in a flat orientation.

13. An assembly comprising:

a panel;

a membrane tie; and a pull-apart linear connector comprising a substantially continuous linear connector that releasably connects the panel to the membrane tie, said pull-apart linear connector being configured to disconnect said panel from said membrane tie by only using pulling apart forces in substantially opposing directions, the panel being flexurally deformed in one direction of curvature from an initial geometry and restrained in a flexurally deformed geometry by the membrane tie and the pull-apart linear connector, and wherein the one direction of curvature of the panel is reversible to form a reverse flexed panel assembly.

14. An assembly as claimed in claim 13, wherein said panel comprises a plastic material.

15. An assembly as claimed in claim 14, wherein said plastic material is transparent.

16. An assembly as claimed in claim 13, wherein said membrane tie comprises a display sign.

17. An assembly as claimed in claim 13, wherein said panel comprises a display sign.

18. An assembly as claimed in claim 13, wherein a display object is located between said panel and said membrane tie.

19. An assembly as claimed in claim 13, wherein said membrane tie comprises a fabric material.

20. An assembly as claimed in claim 13, wherein said membrane tie comprises a net.

21. An assembly as claimed in claim 13, wherein said membrane tie comprises perforations.

22. An assembly as claimed in claim 13, wherein said linear connector comprises a layer of adhesive material.

23. An assembly as claimed in claim 22, wherein said linear connector comprises a self-adhesive tape.

24. An assembly as claimed in claim 23, wherein said self-adhesive tape comprises a filmic material and a layer of pressure-sensitive adhesive material and wherein said filmic material comprises two principal surfaces and said pressure-sensitive adhesive material comprises two principal surfaces, and wherein one of said surfaces of said pressure-sensitive adhesive is adhered to one of said surfaces of said filmic material.

25. An assembly as claimed in claim 24, wherein said self-adhesive tape comprises another layer of pressure-sensitive material comprising two principal surfaces and a first of said surfaces is applied to the other side of said filmic material.

26. An assembly as claimed in claim 25, wherein said other surface of said layer of pressure-sensitive material is adhered to said panel and the second surface of said another layer of pressure-sensitive material is adhered to said membrane tie.

27. An assembly as claimed in claim 13, wherein the tensile force in said membrane tie is not less than 1N (one Newton).

28. An assembly comprising:

a panel;

a tie; and a display sign, said display sign being applied to or forming a part of said panel and/or said tie, said display sign facing in one display direction, said panel being flexurally deformed in one direction of curvature from an initial geometry and restrained in a flexurally deformed geometry by the tie, and wherein the one direction of curvature of the panel is reversible to form a reverse flexed panel assembly such that said display sign or another display sign is facing in said one display direction, wherein said tie is a membrane tie, wherein the assembly further comprises a pull-apart connector releasably connecting a portion of the panel to the membrane tie, said pull-apart connector being configured, when released, to disconnect said portion of the panel from said membrane tie, the panel being restrained in the flexurally deformed geometry by the membrane tie and the pull-apart connector, and wherein the pull-apart connector is shaped and configured such that after said disconnection, the pull-apart connector is shaped and configured to reconnect the portion of the panel to the membrane tie in a reversed flexural direction of the panel.

29. A method of making an assembly comprising a panel, a membrane tie, and a linear connector, the method comprising the steps of:

(i) flexurally deforming said panel;

(ii) providing a restraining force to the flexurally deformed panel in an intermediate panel geometry;

(iii) locating said membrane tie and said linear connector; and releasing said restraining force, thereby resulting in said membrane tie providing a tensile restraining force to the flexurally deformed panel that holds the deformed panel in a flexurally deformed, tied panel geometry, wherein the linear connector comprises a pull-apart connector comprising a substantially continuous linear connector that releasably connects the panel to the membrane tie, said pull-apart linear connector being configured to disconnect said panel from said membrane tie by only using pulling apart forces in substantially opposing directions.

30. The method of claim 29, wherein said intermediate panel geometry is different than said flexurally deformed, tied panel geometry.

31. A method of reversing the curvature of a panel within an assembly, said assembly comprising a flexurally deformed panel and a tie, said method comprising the steps of:

(i) flexurally deforming said panel in one direction of curvature from an initial geometry, (ii) restraining said panel in a flexurally deformed geometry by a tie, (iii) subsequently releasing said panel by releasing said tie, said panel forming a residual panel geometry having residual curvature in said one direction of curvature, (iv) flexurally deforming said panel in the opposite direction of curvature to said one direction of curvature, and (v) restraining said panel in a reverse flexed geometry by said tie or another tie, wherein said tie is a membrane tie, wherein said assembly comprises a pull-apart linear connector comprising a substantially continuous linear connector that releasably connects the panel to the membrane tie, said pull-apart linear connector being configured to disconnect said panel from said membrane tie by only using pulling apart forces in substantially opposing directions, and wherein said releasing said panel comprises pulling apart said panel from said membrane tie in substantially opposing directions.

32. A method as claimed in claim 31, wherein said residual panel geometry has a Coefficient of Restitution from said flexurally deformed geometry towards said initial geometry of less than 0.9.

33. A method as claimed in claim 31, wherein said residual panel geometry has a Coefficient of Restitution from said flexurally deformed geometry towards said initial geometry of less than 0.5.

34. The method of claim 31, wherein:

the panel has two principal surfaces;

the display sign is disposed on a first of the two principal surfaces;

the assembly further comprising another display sign disposed on a second of the two principal surfaces;

the display sign comprises two messages that are disposed upside-down relative to each other if the panel was disposed in a flat orientation; and the another display sign comprises two other messages that are disposed upside-down relative to each other if the panel was disposed in a flat orientation.

35. A method of reversing the curvature of a panel within an assembly, said assembly comprising a flexurally deformed panel and a tie, said method comprising the steps of:

(i) flexurally deforming said panel in one direction of curvature from an initial geometry, (ii) restraining said panel in a flexurally deformed geometry by a tie, (iii) subsequently releasing said panel by releasing said tie, said panel forming a residual panel geometry having residual curvature in said one direction of curvature, (iv) flexurally deforming said panel in the opposite direction of curvature to said one direction of curvature, and (v) restraining said panel in a reverse flexed geometry by said tie or another tie wherein another tie restrains said panel in a reverse flexed geometry.

36. An assembly comprising:

a panel;

tie; and a display sign, said display sign being applied to or forming a part of said and/or said tie, said display sign facing in one display direction, said panel being flexurally deformed in one direction of curvature from an initial geometry and restrained in a flexurally deformed geometry by the tie, and wherein the one direction of curvature of the panel is reversible to form a reverse flexed panel assembly such that said display sign or another display sign is facing in said one display direction, wherein said tie is a linear tie, wherein said assembly comprises a pull-apart connector connecting the panel to the tie, wherein said pull-apart connector comprises a pull-apart point connector, and wherein said pull-apart point connector comprises a button and slot mechanism.

37. An assembly comprising:

a panel;

a tie; and a display sign, said display sign being applied to or forming a part of said panel and/or said tie, said display sign facing in one display direction, said panel being flexurally deformed in one direction of curvature from an initial geometry and restrained in a flexurally deformed geometry by the tie, and wherein the one direction of curvature of the panel is reversible to form a reverse flexed panel assembly such that said display sign or another display sign is facing in said one display direction, wherein said tie is a linear tie, wherein said assembly comprises a pull-apart connector connecting the panel to the tie, and wherein said pull-apart connector is shaped and configured to disconnect the portion of the panel from the tie without damaging the panel, tie, or pull-apart connector.

38. An assembly comprising:

a panel;

a tie; and a display sign, said display sign being applied to or forming a part of said panel and/or said tie, said display sign facing in one display direction, said panel being flexurally deformed in one direction of curvature from an initial geometry and restrained in a flexurally deformed geometry by the tie, and wherein the one direction of curvature of the panel is reversible to form a reverse flexed panel assembly such that said display sign or another display sign is facing in said one display direction, wherein said tie is a linear tie, wherein said assembly comprises a pull-apart connector connecting the panel to the tie, wherein said pull-apart connector comprises a pull-apart point connector, and wherein said pull-apart point connector comprises a toggle.

39. An assembly comprising:

a panel;

a tie; and a display sign, said display sign being applied to or forming a part of said panel and/or said tie, said display sign facing in one display direction, said panel being flexurally deformed in one direction of curvature from an initial geometry and restrained in a flexurally deformed geometry by the tie, and wherein the one direction of curvature of the panel is reversible to form a reverse flexed panel assembly such that said display sign or another display sign is facing in said one display direction, wherein said tie is a linear tie, and wherein said linear tie comprises a linear tie loop.

40. The assembly as claimed in claim 39, wherein:

said display sign is applied to or forms a part of said panel and is disposed on a side of the flexurally deformed panel remote from said tie;

said flexurally deformed panel comprises flexurally curved edges, and edges which have not been flexurally curved; and said assembly can be supported on a plane horizontal supporting surface on said edges which have not been flexurally curved.

41. The assembly as claimed in claim 39, wherein:

the panel comprises outer edges; and the tie intersects said panel at a point spaced from the outer edges.

42. A method of reversing the curvature of a panel within an assembly, said assembly comprising a flexurally deformed panel and a tie, said method comprising the steps of:

(i) flexurally deforming said panel in one direction of curvature from an initial geometry, (ii) restraining said panel in a flexurally deformed geometry by a tie, (iii) subsequently releasing said panel by releasing said tie, said panel forming a residual panel geometry having residual curvature in said one direction of curvature, (iv) flexurally deforming said panel in the opposite direction of curvature to said one direction of curvature, and (v) restraining said panel in a reverse flexed geometry by said tie or another tie, wherein said tie comprises a linear tie, and wherein said linear tie comprises a linear tie loop.

43. The method of claim 42, wherein:

the panel has two principal surfaces;

the display sign is disposed on a first of the two principal surfaces;

the assembly further comprising another display sign disposed on a second of the two principal surfaces;

the display sign comprises two messages that are disposed upside-down relative to each other if the panel was disposed in a flat orientation; and the another display sign comprises two other messages that are disposed upside-down relative to each other if the panel was disposed in a flat orientation.

44. The method reversing the curvature of a panel within an assembly, said assembly comprising a flexurally deformed panel and a tie, said method comprising the steps of:

(i) flexurally deforming said panel in one direction of curvature from an initial geometry, (ii) restraining said panel in a flexurally deformed geometry by a tie, (iii) subsequently releasing said panel by releasing said tie, said panel forming residual panel geometry having residual curvature in said one direction of curvature, (iv) flexurally deforming said panel in the opposite direction of curvature to said one direction of curvature, and (v) restraining said panel in a reverse flexed geometry by said tie or another tie, wherein said restraining of said panel in the flexurally deformed geometry comprises restraining the panel in the flexurally deformed geometry by use of a pull-apart connector connecting the panel to the tie, wherein said pull-apart connector comprises a pull-apart point connector, and wherein said pull-apart point connector comprises a toggle, wherein step (iii) comprises rotating the toggle through an angle of up to 90 degrees.

* * * * *

UNITED STATES PATENT AND TRADEMARK OFFICE

CERTIFICATE OF CORRECTION

PATENT NO. : 8,832,980 B2
APPLICATION NO. : 12/438237
DATED : September 16, 2014
INVENTOR(S) : G. Roland Hill It is certified that error appears in the above-identified patent and that said Letters Patent is hereby corrected as shown below:

Title Page

Item (30) Foreign Application Priority Data, is missing. Item (30) should appear as follows:

--(30) Foreign Application Priority Data
Aug. 21, 2006 (IB)..................PCT/IB2006/003667--

Signed and Sealed this
Fourteenth Day of April, 2015

Michelle K. Lee
*Director of the United States Patent and Trademark Office*